(12) United States Patent
Totsuka et al.

(10) Patent No.: US 6,556,195 B1
(45) Date of Patent: Apr. 29, 2003

(54) IMAGE PROCESSING DEVICE AND IMAGE PROCESSING METHOD

(75) Inventors: Takashi Totsuka, Chiba (JP); Rui Yamada, Tokyo (JP); Mitsuharu Ohki, Tokyo (JP)

(73) Assignee: Sony Corporation, Shinagawa-ku (JP)

( * ) Notice: Subject to any disclaimer, the term of this patent is extended or adjusted under 35 U.S.C. 154(b) by 0 days.

(21) Appl. No.: 09/463,367

(22) PCT Filed: Jun. 2, 1999

(86) PCT No.: PCT/JP99/02951
§ 371 (c)(1),
(2), (4) Date: Mar. 13, 2000

(87) PCT Pub. No.: WO99/63488
PCT Pub. Date: Dec. 9, 1999

(30) Foreign Application Priority Data

Jun. 2, 1998 (JP) ............................................. 10-152821
Jun. 2, 1998 (JP) ............................................. 10-152823

(51) Int. Cl.⁷ ............................................... G06T 15/00
(52) U.S. Cl. ................................................... 345/419
(58) Field of Search ................................ 345/419, 420, 345/426, 428, 619, 620, 629

(56) References Cited

FOREIGN PATENT DOCUMENTS

| JP | 5-120439 | 5/1993 |
| JP | 5-143711 | 6/1993 |
| JP | 9-138869 | 5/1997 |
| JP | 10-248830 | 9/1998 |

OTHER PUBLICATIONS

Jain, Fundamentals of Digital Image Processing, 1986, pp. 358–359.*

* cited by examiner

*Primary Examiner*—Phu Nguyen
(74) *Attorney, Agent, or Firm*—Bell, Boyd & Lloyd LLC

(57) ABSTRACT

In the case a two-dimensional image (FIG. 11A) displaying a house-shaped three-dimensional object is stored in a noted buffer, when shape information indicating that a check-patterned wall is rectangular and the four apexes of the wall as characteristic points are designated by a user, a spread image (FIG. 11B) obtained by spreading the check-patterned wall onto a two-dimensional plane is generated on the basis of the shape information and characteristic points and is stored into a paste buffer. Then, a two-dimensional image of a column (FIG. 11C) is stored into the noted buffer. When shape information indicating the lateral side of the column and a predetermined point on the lateral side as a characteristic point are designated by the user, the image (FIG. 11B) stored in the paste buffer is pasted to the lateral side of the column in the noted buffer (FIG. 11D) on the basis of the shape information and characteristic point. Thus, the user can easily perform three-dimensional editing or the like on a two-dimensional image.

102 Claims, 39 Drawing Sheets

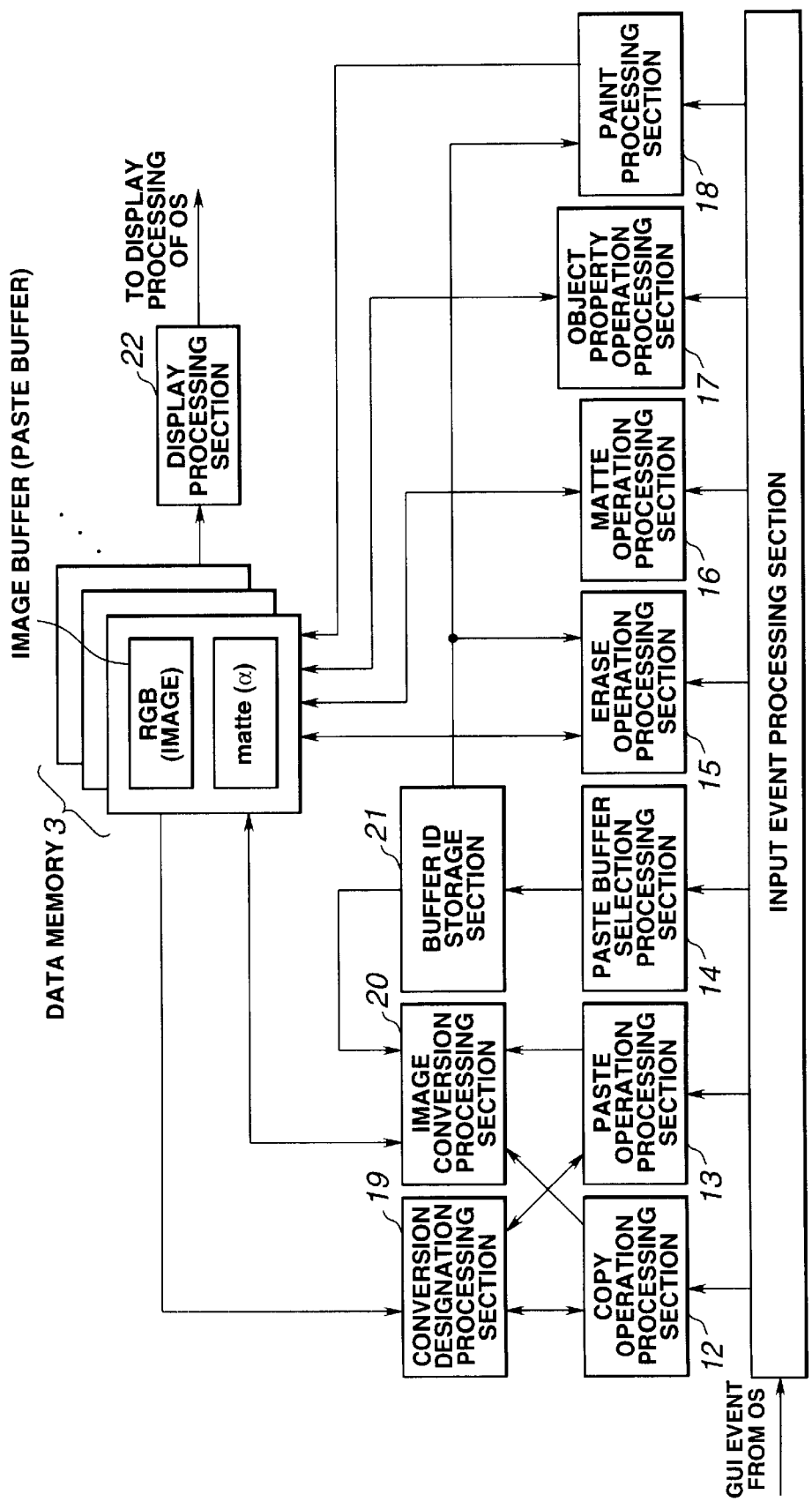

NOTED BUFFER

NOTED BUFFER
(BEFORE PASTE)

PASTE BUFFER

NOTED BUFFER
(AFTER PASTE)

COPY OPERATION

PASTE OPERATION $$D_1 = R\sin\frac{\lambda_1+\lambda_2}{2}$$

$$D_2 = R\cos\frac{\lambda_1+\lambda_2}{2}\tan\lambda_3$$

$$D_3 = \sqrt{D_1^2 - D_2^2}$$

$$= R\sqrt{\sin^2\frac{\lambda_1+\lambda_2}{2} - \cos^2\frac{\lambda_1+\lambda_2}{2}\tan^2\lambda_3}$$

$$\sin\frac{\mu}{2} = \sqrt{\sin^2\frac{\lambda_1+\lambda_2}{2} - \cos^2\frac{\lambda_1+\lambda_2}{2}\tan^2\lambda_3}$$

$$= \sqrt{\sin^2\frac{\lambda_1+\lambda_2}{2} - \cos^2\frac{\lambda_1+\lambda_2}{2}\tan^2\frac{\lambda_2-\lambda_1}{2}}$$

THREE-DIMENSIONAL OBJECT (CONE)

PROJECTION IMAGE

IMAGE BUFFER

SPREAD IMAGE

PASTE BUFFER

SPECULAR REFLECTION COMPONENTS ARE NONLINEARLY CONVERTED TO PROVIDE PARTIAL BRIGHTENING EFFECT

ENTIRE LIGHT SOURCE SIDE IS BRIGHT BECAUSE OF MANY DIFFUSED REFLECTION COMPONENTS

IMAGE PROCESSING DEVICE AND IMAGE PROCESSING METHOD

TECHNICAL FIELD

This invention relates to an image processing device, an image processing method, a medium, a contour extraction device and contour extraction method, and for example, to an image processing device, an image processing method, a medium, a contour extraction device and contour extraction method which enable easy processing such as three-dimensional editing of a two-dimensionally displayed image of a three-dimensional object.

BACKGROUND ART

Conventionally, various methods have been proposed for carrying out various processing and extracting information necessary for carrying out various processing from a two-dimensional image. Such methods are described, for example, in the following documents: James D. Foley, Andries van Dam, Steven K. Feiner, John F. Hughes, "Computer Graphics, principles and practice," ADDISON-WESLEY PUBLISHING COMPANY, 1996 (hereinafter referred to as Document 1); Paul E. Debevec, Camillo J. Taylor, Jitendra Malik, "Modeling and Rendering Architecture from Photographs: A hybrid geometry- and image-based approach," proceedings of SIGGRAPH 96, pp. 11–20 (hereinafter referred to as Document 2); Oliver Faugeras, "Three-dimensional computer version," The MIT press (hereinafter referred to as Document 3); Kenneth P. Fishkin, Brian A. Barsky, "A Family of New Algorithms for Soft Filling," proceedings of SIGGRAPH 84, pp.235–244 (hereinafter referred to as Document 4); Pat Hanrahan and Paul Haeberli, "Direct WYSIWYG Painting and Texturing on 3D Shapes," proceedings of SIGGRAPH 90, pp.215–233 (hereinafter referred to as Document 5); Youichi Horry, Ken-ichi Anjyo, Kiyoshi Arai, "Tour Into the Picture: Using a Spidery Mesh Interface to Make Animation from a Single Image," proceedings of SIGGRAPH 97, pp.255–232 (hereinafter referred to as Document 6); and Michael Gleicher, "Image Snapping," proceedings of SIGGRAPH 95, pp. 183–190 (hereinafter referred to as Document 7).

In Document 1, a image processing technique called two-dimensional paint is described in which the work similar to painting a picture on paper by a designer or the like using a paintbrush or air brush (a technique for painting a picture by scattering a powder paint) is carried out by a computer.

However, in the conventional 2D paint technique, even if a displayed image is of a three-dimensional object, the image itself is handled on a two-dimensional plane. Therefore, if any character is drawn or any pattern is added not in consideration of the direction in the three-dimensional space of the three-dimensional object displayed as a two-dimensional image, the image will be unnatural.

Specifically, in the case where a three-dimensional object imitating a house is displayed as a two-dimensional image as shown in FIG. 1A, if characters are drawn on the wall parts of the house without considering their directions, the characters do not look as if they were drawn on the walls, as shown in FIG. 1B. Similarly, if a rectangle is drawn on the wall part of the house so as to add a rectangular-parallelepiped room without considering the direction of the wall, the image will be unnatural, as shown in FIG. 1C. Moreover, in the case where a column is displayed as a two-dimensional image as shown in FIG. 2A, if characters are drawn on its lateral side ignoring the direction of the lateral side, the characters do not look as if they were drawn on the lateral side of the column, as shown in FIG. 2B.

Therefore, in order to prevent an image from being unnatural in carrying out 2D paint, it is necessary to draw characters or pattern while transforming the characters or pattern in accordance with the direction of a three-dimensional object displayed as a two-dimensional image. However, the operation for such drawing requires some skills.

Thus, there is proposed a method for inputting the inclination or the like of the three-dimensional object displayed as a two-dimensional image by a user using a ten-key pad or a GUI (graphic user interface) and transforming characters or pattern to be newly drawn on the basis of the input by a computer. In this method, however, the user needs to adjust the inclination of the three-dimensional object to be inputted to the computer while watching the drawing result so as not to make the image unnatural, and this adjustment also requires certain skills.

As described above, if the user draws any character or pattern without considering the direction of the three-dimensional object displayed as a two-dimensional image, a drawing result that looks natural, that is, a drawing result that looks as if the object were shot with the character or pattern drawn thereon, cannot be obtained for the following reason. That is, there is lacked information concerning where in the three-dimensional space the three-dimensional object displayed as a two-dimensional image is positioned, and from which position the object was shot to obtain the two-dimensional image (if the two-dimensional image is obtained by shooting a picture, the position where the scenery shown in the picture was observed).

Thus, there is proposed a method for finding the position in the three-dimensional space of the three-dimensional object displayed in the two-dimensional image and the shooting position of the object, from the two-dimensional image by using an image recognition (computer vision) technique.

Specifically, Document 2 discloses a method for associating a three-dimensional object such as a rectangular-parallelepiped with a building shot into a plurality of photographs by using a GUI and then finding the size and the shooting position of the building. Document 3 discloses various other methods for finding the position of the three-dimensional object and the shooting position thereof Such methods for calculating the position of the three-dimensional object and the shooting position thereof using the image recognition technique utilizes the principle of triangulation. Therefore, a plurality of images obtained by shooting the same three-dimensional object from a plurality of shooting positions are required. However, it is not necessarily possible to prepare such plural images in carrying out 2D paint, and if the two-dimensional image is obtained by shooting a picture, a plurality of images as described above generally do not exist.

Even in the case where a plurality of images obtained by shooting the same three-dimensional object from a plurality of shooting positions can be prepared, the corresponding positions of the same three-dimensional object displayed in the plurality of images (e.g., the apex of the roof of the building as the three-dimensional object) must be designated in order to calculate the position of the three-dimensional object and the shooting position thereof from the plurality of images by a computer. Such operation for designation with respect to each of the plurality of images is troublesome and time-consuming. Moreover, in carrying out natural drawing in a three-dimensional manner on the basis of the position in the three-dimensional space of the three-dimensional object displayed as a two-dimensional image and the shooting position thereof, three-dimensional data such as three-dimensional coordinate of the three-dimensional object as viewed from the shooting position must be processed despite that the two-dimensional image is handled. Therefore, an extremely large quantity of calculation is required.

Document 4 discloses a color processing method in carrying out 2D paint.

Specifically, in 2D paint, for example, the user selects a color to be used for drawing by using a GUI and carries out drawing with the selected color. However, the color and brightness of a three-dimensional object displayed as a two-dimensional image change in accordance with the relation between the direction of the side and the position of a light source. Therefore, for example, if one side of the three-dimensional object is entirely painted with the same color (the same RGB (red, green, blue) value), the drawing result will be unnatural. To obtain a natural drawing result, it is necessary to gradually change the color to be applied in consideration of the relation between the direction of the side to be painted and the position of the light source. Particularly, in the case where the side to be painted is a curved surface, the pixel value must be continuously changed in order to obtain a natural result and therefore the color to be applied must be selected for every several pixels. Therefore, an extremely large quantity of work is required.

Thus, in Document 4, a method called a tint fill method is described, which enables change of one of two colors if the color of a pixel is obtained by mixing the two colors and the two colors are known. However, while the tint fill method can effectively cope with a portion where the foreground and the background exist in a mixed manner, it is difficult with the same method to handle the shadow of an object or reflection of illumination by the object.

Document 5 discloses a method for transforming and then pasting characters inputted by operating a tablet or a mouse, or a handwritten pattern, to follow a side (surface) of a three-dimensional object displayed as a two-dimensional image.

The method disclosed by Document 5 uses three-dimensional information (e.g., position of the three-dimensional object in the three-dimensional space, shooting position, size, inclination, etc.) concerning the three-dimensional object displayed as a two-dimensional image, and therefore it is necessary to accurately recognize the three-dimensional information by using the image recognition technique as described above. However, in the case where the three-dimensional information is recognized by using the image recognition technique, a plurality of images are needed and the quantity of calculation is increased as described above.

The method of Document 5 can also use a three-dimensional model of the three-dimensional object, produced inside a computer. However, in this case, too, three-dimensional data must be handled and an extremely large quantity of calculation is required therefor.

As a method for producing a three-dimensional model, there is proposed a method in which the schematic shape of a three-dimensional object displayed in a two-dimensional image is extracted from the two-dimensional image by using the image recognition technique and in which a shot image is pasted onto the surface of the shape (texture mapping). A technique using this method to produce a two-dimensional image viewed from a free visual point (shot from a free shooting point) is disclosed in the above-described Document 2. In this technique, however, since the schematic shape of the three-dimensional object displayed in a two-dimensional image is extracted from the two-dimensional image, a plurality of images are needed similarly to the foregoing case.

Document 6 discloses a method for producing from one two-dimensional image an image viewed from a visual point except for the shooting position. In this method, however, only an image viewed from a visual point different from the shooting position is produced, and it is assumed that the object displayed as a two-dimensional image and objects on its periphery are of an extremely simple plate-like shape. Therefore, it is not a big problem if an image viewed from a different visual point is to be proximately produced, but if any character or pattern is to be added to the two-dimensional image, it is difficult to obtain a natural drawing result. Specifically, for example, in the case where a column is displayed as a two-dimensional image, it is difficult to obtain a natural image in which any character or pattern is added to the lateral side of the column.

In carrying out processing on a two-dimensional image, the user is often requested to designate a predetermined characteristic point such as an apex of a three-dimensional object in the two-dimensional image. This designation is carried out by operating a mouse or a pen, but it is difficult to accurately designate the apex of the three-dimensional object in the two-dimensional image. Thus, Document 7 discloses a method in which an edge (portion where the brightness and color change largely) in a two-dimensional image is extracted and in which if the cursor is positioned near the edge, the cursor is shifted onto the edge. In the method of Document 7, however, since all the edges in the two-dimensional image are detected, the cursor might sensitively react to the noise and texture of the two-dimensional image and be shifted to an unwanted position.

As described above, though a number of image processing techniques have conventionally been proposed, there has been proposed no method particularly suitable to the case where editing or processing such as three-dimensional addition, deletion, shift and transformation of a character or pattern, change of a color or pattern, and change of a light source is to be performed on a two-dimensional image.

That is, in the conventional methods, certain operational skills and time are required or a plurality of images obtained by shooting the same object from different directions are necessary to perform three-dimensional editing or processing on a two-dimensional image. Also, increase in the quantity of calculation and unwanted shift of the cursor might occur. Moreover, if a three-dimensional object in a two-dimensional image is deleted, the background must be reproduced in the area after the deletion. However, with the methods described in the above-mentioned Documents 1 to 7, such reproduction of the background is difficult.

DISCLOSURE OF THE INVENTION

In view of the foregoing status of the art, it is an object of the present invention to enable easy implementation of three-dimensional editing or the like with respect to a two-dimensional image.

An image processing device according to the present invention includes: first operation means for being operated when designating first shape information concerning the shape of a side constituting a first three-dimensional object displayed in a first two-dimensional image and a first characteristic point, which is a point on the first two-dimensional image constituting the side; first calculation means for calculating a first conversion formula for converting the side constituting the first three-dimensional object in the first two-dimensional image to a spread image, which is an image spread on a two-dimensional plane, on the basis of the first shape information and the first characteristic point; first conversion means for converting the side constituting the first three-dimensional object in the first two-dimensional image to the spread image on the basis of the first conversion formula; storage means for storing the spread image; second operation means for being operated when designating second shape information concerning the shape of a side constituting a second three-dimensional object and a second characteristic point, which is a point on a second two-dimensional image constituting the side; second calculation means for calculating a second conversion formula for converting the image stored in the storage means to a projection image, which is an image obtained by projecting the side constituting the second three-dimensional object, on the basis of the second shape information and the second characteristic point; second conversion means for converting the image stored in the storage means to the projection image on the basis of the second conversion formula; and paste means for pasting the projection image to a portion specified by the second characteristic point in the second two-dimensional image.

An image processing method according to the present invention includes: a first calculation step of calculating a first conversion formula for converting a side constituting a first three-dimensional object in a first two-dimensional image to a spread image, which is an image spread on a two-dimensional plane, on the basis of first shape information and a first characteristic point; a first conversion step of converting the side constituting the first three-dimensional object in the first two-dimensional image to the spread image on the basis of the first conversion formula; a storage step of storing the spread image into storage means; a second calculation step of calculating a second conversion formula for converting the image stored in the storage means to a projection image, which is an image obtained by projecting a side constituting a second three-dimensional object, on the basis of second shape information and a second characteristic point; a second conversion step of converting the image stored in the storage means to the projection image on the basis of the second conversion formula; and a paste step of pasting the projection image to a portion specified by the second characteristic point in a second two-dimensional image.

A medium according to the present invention causes a computer to execute a computer program, the computer program including: a first calculation step of calculating a first conversion formula for converting a side constituting a first three-dimensional object in a first two-dimensional image to a spread image, which is an image spread on a two-dimensional plane, on the basis of first shape information and a first characteristic point; a first conversion step of converting the side constituting the first three-dimensional object in the first two-dimensional image to the spread image on the basis of the first conversion formula; a storage step of storing the spread image into storage means; a second calculation step of calculating a second conversion formula for converting the image stored in the storage means to a projection image, which is an image obtained by projecting a side constituting a second three-dimensional object, on the basis of second shape information and a second characteristic point; a second conversion step of converting the image stored in the storage means to the projection image on the basis of the second conversion formula; and a paste step of pasting the projection image to a portion specified by the second characteristic point in a second two-dimensional image.

An image processing device according to the present invention includes: operation means for being operated when designating shape information concerning the shape of a side constituting a three-dimensional object and a characteristic point, which is a point on a two-dimensional image constituting the side; calculation means for calculating a conversion formula for converting the side constituting the three-dimensional object in the two-dimensional image to a spread image on the basis of the shape information and the characteristic point; and conversion means for converting the side constituting the three-dimensional object in the two-dimensional image to the spread image on the basis of the conversion formula.

An image processing method according to the present invention includes: a calculation step of calculating a conversion formula for converting a side constituting a three-dimensional object in a two-dimensional image to a spread image on the basis of shape information and a characteristic point; and a conversion step of converting the side constituting the three-dimensional object in the two-dimensional image to the spread image on the basis of the conversion formula.

A medium according to the present invention causes a computer to execute a computer program, the computer program including: a calculation step of calculating a conversion formula for converting a side constituting a three-dimensional object in a two-dimensional image to a spread image on the basis of shape information and a characteristic point; and a conversion step of converting the side constituting the three-dimensional object in the two-dimensional image to the spread image on the basis of the conversion formula.

Another image processing device according to the present invention includes: operation means for being operated when designating shape information concerning the shape of a side constituting a three-dimensional object and a characteristic point, which is a point on a two-dimensional image constituting the side; calculation means for calculating a conversion formula for converting a predetermined image on a two-dimensional plane to a projection image on the basis of the shape information and the characteristic point; conversion means for converting the predetermined image to the projection image on the basis of the conversion formula; and paste means for pasting the projection image obtained from the predetermined image to a portion specified by the characteristic point in the two-dimensional image.

Another image processing method according to the present invention includes: a calculation step of calculating a conversion formula for converting a predetermined image on a two-dimensional plane to a projection image on the basis of shape information and a characteristic point; a conversion step of converting the predetermined image to the projection image on the basis of the conversion formula; and a paste step of pasting the projection image obtained from the predetermined image to a portion specified by the characteristic point in a two-dimensional image.

Another medium according to the present invention causes a computer to execute a computer program, the computer program including: a calculation step of calculating a conversion formula for converting a predetermined image on a two-dimensional plane to a projection image on the basis of shape information and a characteristic point; a conversion step of converting the predetermined image to the projection image on the basis of the conversion formula; and a paste step of pasting the projection image obtained from the predetermined image to a portion specified by the characteristic point in a two-dimensional image.

A contour extraction device according to the present invention includes: parameter calculation means for finding a parameter, of differential values of scalar quantity at a point on a formula f=0 with a function "f" represented by using one or more parameters for defining the contour of an object in a predetermined space, the parameter maximizing a normal component, which is a component in the direction of a normal vector at that point; and contour extraction means for extracting the point on the formula f=0 with the function "f" represented by using that parameter, as the contour of the object.

A contour extraction method according to the present invention includes: finding a parameter, of differential values of scalar quantity at a point on a formula f=0 with a function "f" represented by using one or more parameters for defining the contour of an object in a predetermined space, the parameter maximizing a normal component, which is a component in the direction of a normal vector at that point; and extracting the point on the formula f=0 with the function "f" represented by using that parameter, as the contour of the object.

BRIEF DESCRIPTION OF THE DRAWINGS

FIG. 4 is a block diagram showing an exemplary functional structure of the image processing device of FIG. 3.

BEST MODE FOR CARRYING OUT THE INVENTION

An image processing device, an image processing method, a medium, a contour extraction device, and a contour extraction method according to the present invention will now be described with reference to the drawings.

Figure 1A:
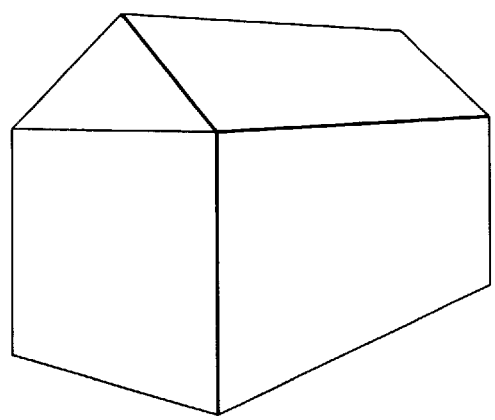
FIGS. 1A to 1C show the drawing result obtained by a conventional paint tool.
Figure 1B:
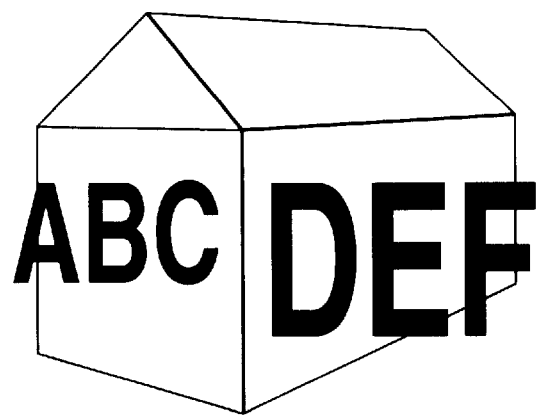
Figure 1C:
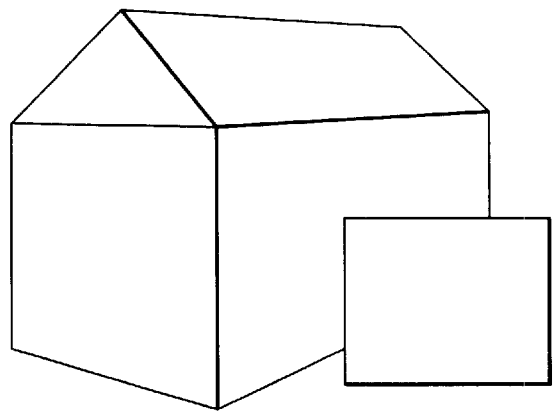
Figure 2A:
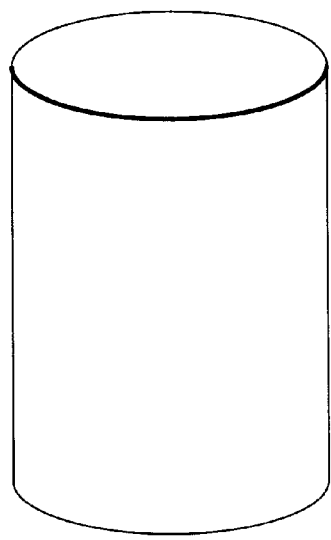
FIGS. 2A and 2B show the drawing result obtained by a conventional paint tool.
Figure 2B:
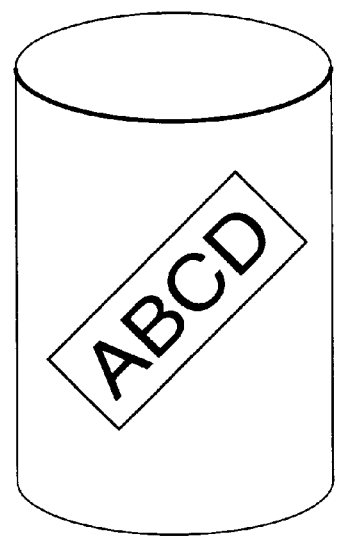
Figure 3:
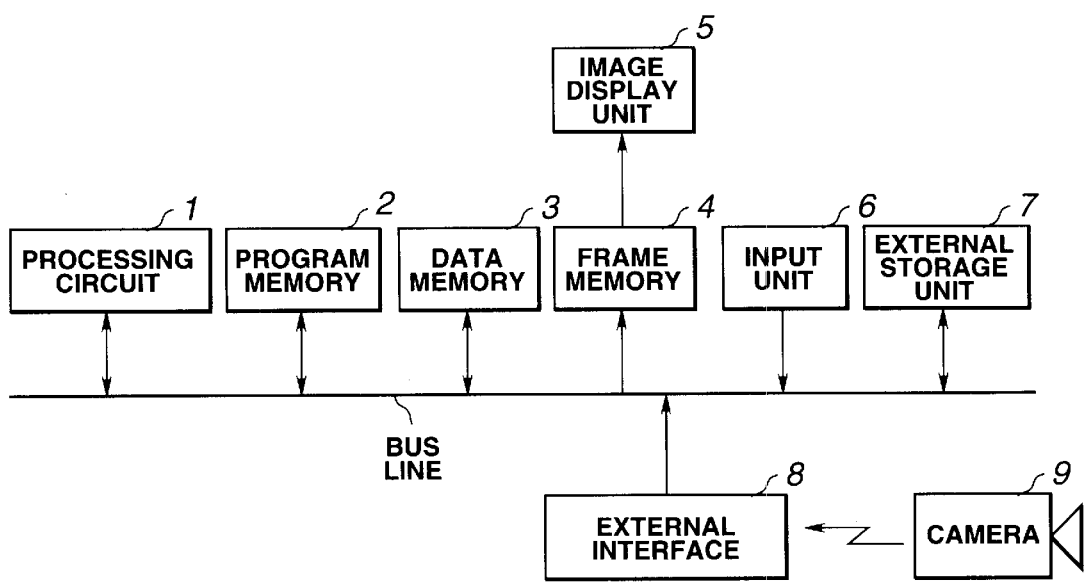
FIG. 3 is a block diagram showing an exemplary structure of hardware of an embodiment of an image processing device to which the present invention is applied.

FIG. 3 shows an exemplary structure of an embodiment of an image processing device to which the present invention is applied. This image processing device is constituted on the basis of a computer and is capable of easily performing three-dimensional editing with respect to a two-dimensional image.

Specifically, a processing circuit 1 is constituted by, for example, a CPU (central processing unit). Under the control of an operating system (OS) stored in a program memory 2, the processing circuit 1 executes an application program similarly stored in the program memory 2, thereby performing various types of processing on a two-dimensional image as will be later described. The program memory 2 is constituted by, for example, a random access memory (RAM), and temporarily stores the OS and application program stored (recorded) in an external storage unit 7. A data memory 3 is constituted by, for example, a RAM, and temporarily stores data necessary for processing carried out by the processing circuit 1. A frame memory 4 is constituted by, for example, a RAM, and stores image data to be displayed on an image display unit 5. The image display unit 5 is constituted by, for example, a cathode ray tube (CRT) or a liquid crystal display, and displays the image data stored in the frame memory 4. An input unit 6 is constituted by, for example, a mouse, a combination of pen and tablet, or a keyboard, and is operated in entering necessary commands and data or in designating a predetermined position on the screen of the image display unit 5. The external storage unit 7 is constituted by, for example, a hard disk, a floppy disk, a compact disc read-only memory (CD-ROM) or a magneto-optical disc, and stores the OS and application program. The external storage device 7 also stores data necessary for operation of the processing circuit 1 and a two-dimensional image (digital data) to be a processing target. An external interface 8 functions as an interface for taking therein data supplied from outside such as a two-dimensional image shot by a video camera 9 and data transmitted through a communication channel, not shown.

The processing circuit 1, the program memory 2, the data memory 3, the frame memory 4, the input unit 6, the external storage unit 7 and the external interface 8 are connected to one another through a bus, and the program and data are transmitted between the respective blocks through the bus.

In the image processing device constituted as described above, when the power is turned on, the OS stored in the external storage unit 7 is read out and expanded to the program memory 2 and then executed by the processing circuit 1. As the input unit 6 is operated to execute the application program, the application program is read out from the external storage unit 7 by the processing circuit 1 under the control of the OS, then expanded to the program memory 2 and then executed. Thus, various types of processing is performed on, for example, a two-dimensional image shot by the video camera 9 and stored in the external storage unit 7 through the external interface 8.

FIG. 4 shows an exemplary functional structure of the image processing device of FIG. 3, realized as the processing circuit 1 executes the application program.

An input event processing section 11 is supplied with a GUI event from the OS. The input event processing section 11 analyzes the GUI event and actuates a copy operation processing section 12, a paste operation processing section 13, a paste buffer selection processing section 14, an erase operation processing section 15, a matte operation processing section 16, an object property operation processing section 17 and a paint processing section 18 to carry out processing in accordance with the result of analysis.

The GUI event includes shift of a mouse cursor, click of a mouse (press-down of a mouse button), selection of a menu or operation of a button on the GUI and the like. The GUI event is defined by a window system such as an X Window.

The copy operation processing section 12 carries out copy processing for storing (copying) an image to a paste buffer, which will be later described. The paste operation processing section 13 carries out paste processing for pasting an image stored in the paste buffer to a two-dimensional image stored in an image buffer, which will be later described. The paste buffer selection processing section 14 carries out paste buffer selection processing for selecting an image buffer to be used as a paste buffer from among image buffers and storing the buffer ID to a buffer ID storage section 21.

In the data memory 3, an area for storing the pixel value of an image for each screen is secured as an image buffer. In this embodiment, a plurality of image buffers are secured in the data memory 3 and the buffer ID is appended to each image buffer so that each image buffer can be identified. Of the plurality of image buffers, the image buffer having the buffer ID stored in the buffer ID storage section 21 is referred to as a paste buffer. The image buffer not only can store the pixel value (e.g., RGB value or the like) of a two-dimensional image but also can store the matte of an object displayed as the two-dimensional image. The matte will be described later.

The erase operation processing section 15 carries out erase processing for deleting a part of images stored in the paste buffer. The matte operation processing section 16 carries out matte processing for generating a matte with respect to a three-dimensional object displayed as a two-dimensional image stored in the image buffer. The object property operation processing section 17 carries out object property processing for changing so-called material properties such as the color and material impression of a three-dimensional object displayed as a two-dimensional image stored in the image buffer, and light source change processing for changing the light source (changing the degree of illumination of the three-dimensional object in the two-dimensional image stored in the image buffer). The event processing section 18 carries out paint processing for performing 2D paint on an image stored in the paste buffer.

A conversion designation processing section 19 corrects the position of a characteristic point on a two-dimensional image stored in the image buffer, which is designated by a user operating the input unit 6, in accordance with the instruction from the copy operation processing section 12 and the paste operation processing section 13, and supplies the corrected characteristic, point back to the copy operation processing section 12 and the paste operation processing section 13. An image conversion processing section 20 converts an image stored in the image buffer or the paste buffer in accordance with the instruction from the copy operation processing section 12 and the paste operation processing section 13. The buffer ID storage section 21 stores the buffer ID of an image buffer selected as a paste buffer by the paste buffer selection processing section 14. The buffer ID stored in the buffer ID storage section 21 is supplied to the erase operation processing section 15, the paint processing section 18 and the image conversion processing section 20. Thus, the erase operation processing section 15, the paint processing section 18 and the image conversion processing section 20 recognize the image buffer which is a paste buffer.

A display processing section 22 carries out processing necessary for displaying a two-dimensional image stored in the image buffer onto the image display unit 5. Image data outputted by the display processing section 22 is written into the frame memory 4 and displayed on the image display unit 5.

Of the blocks shown in FIG. 4, the blocks except for the data memory 3 and the buffer ID storage section 21 are realized as the processing circuit 1 executes the application program, and the program corresponding to each block is made as a module.

Figure 5A:
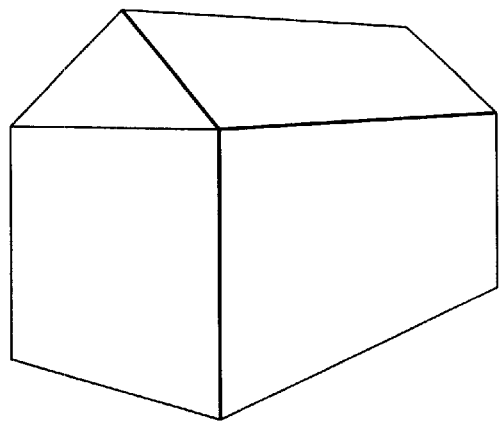
FIGS. 5A to 5C show the result of two-dimensional image processing by the image processing device of FIG. 4.
Figure 5B:
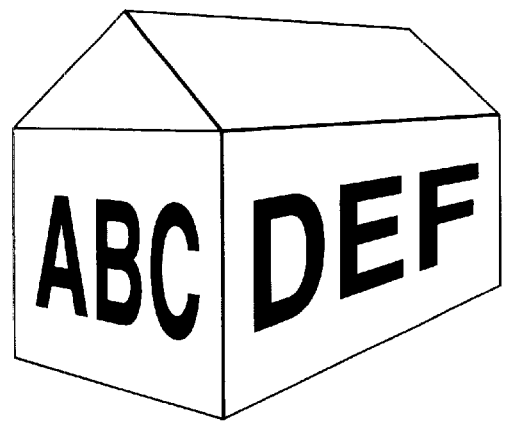
Figure 5C:
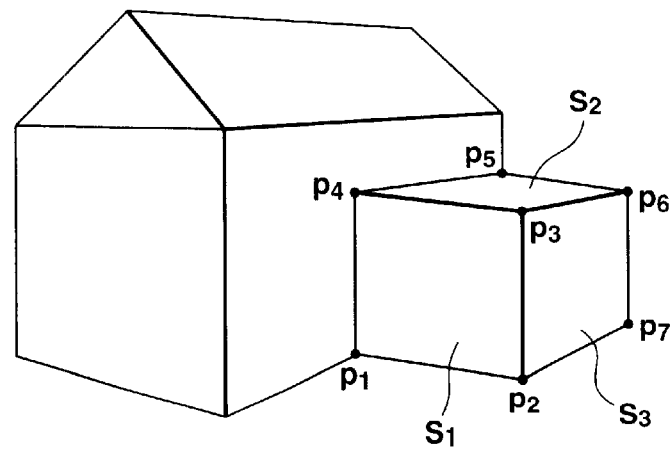
Figure 6A:
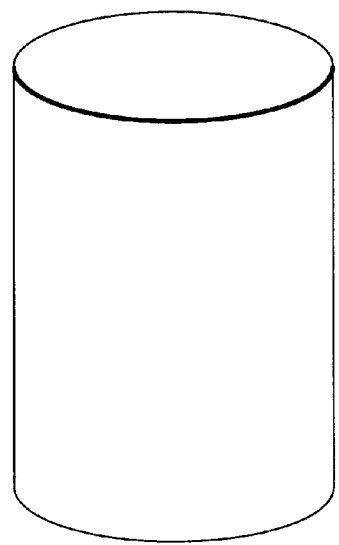
FIGS. 6A and 6B show the result of two-dimensional image processing by the image processing device of FIG. 4.
Figure 6B:
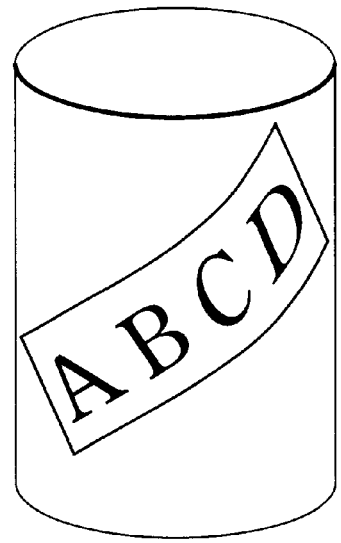

With the image processing device constituted as described above, in the case where a two-dimensional image in which a three-dimensional object imitating a house is displayed as shown in FIG. 5A is stored in the image buffer, even if the user draws characters without being particularly aware of the direction of the wall of the house, a two-dimensional image which looks as if the characters were drawn along with wall can be obtained as shown in FIG. 5B. Also, even if the user draws a rectangle without being aware of the direction of the wall of the house, a two-dimensional image which looks as if a rectangular-parallelepiped room were added to the wall of the house can be obtained as shown in FIG. 5C. Moreover, in the case where a two-dimensional image in which a column is displayed as shown in FIG. 6A is stored in the image buffer, even if the user draws characters without being particularly aware of the direction of the lateral side thereof, a two-dimensional image which looks as if the characters were drawn along the lateral side can be obtained as shown in FIG. 6B.

That is, even in the case where a three-dimensional object having characters drawn thereon is not actually shot by the video camera 9, a two-dimensional image which looks as if the three-dimensional object having characters drawn thereon were actually shot can be easily obtained by performing three-dimensional operation on a two-dimensional image obtained by shooting a three-dimensional object having no character drawn thereon by the video camera 9.

The processing in the image processing device of FIG. 4 will now be described with reference to the flowchart of FIG. 7.

Figure 8:
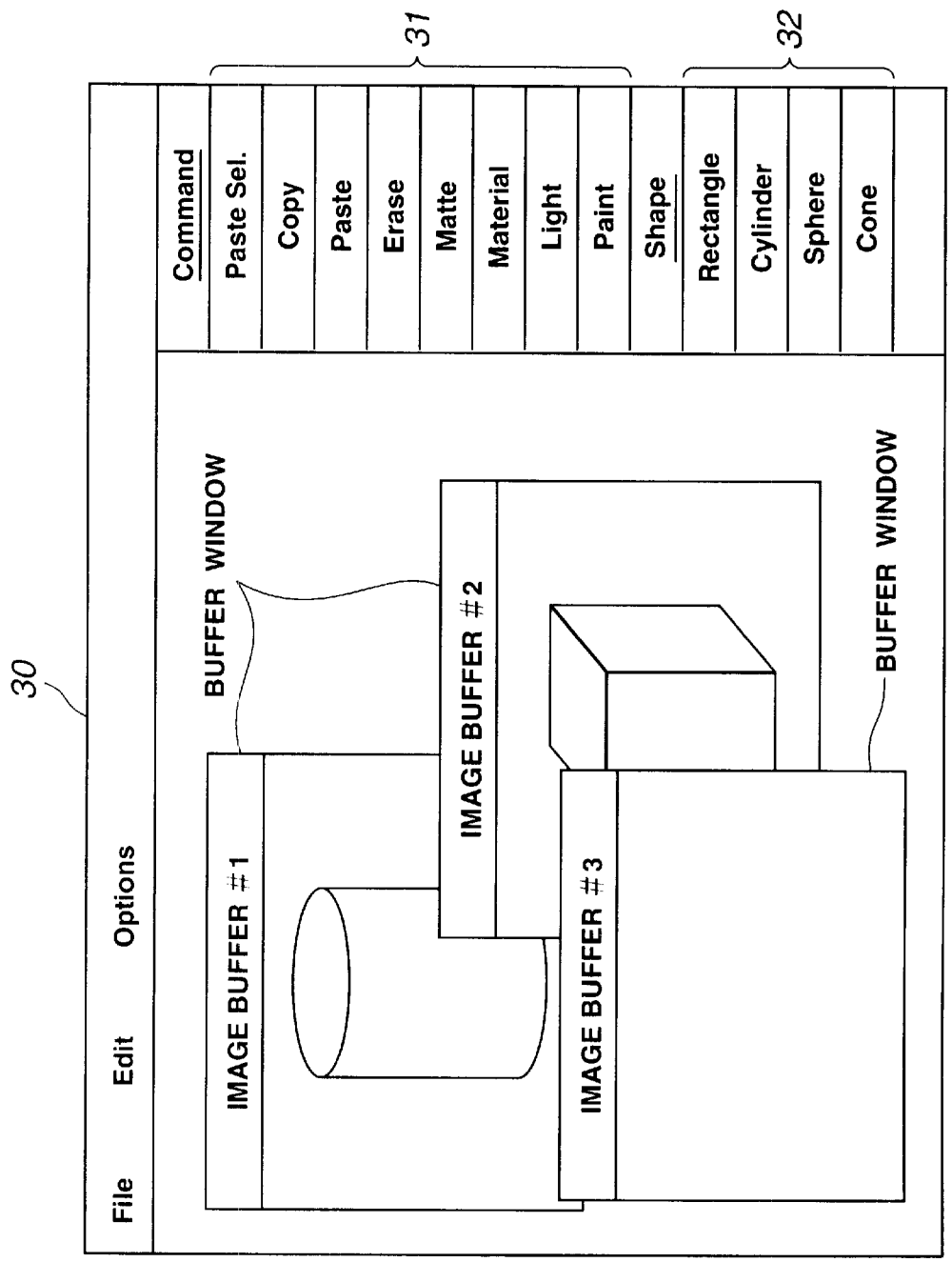
FIG. 8 shows a main window which is displayed when the image processing device of FIG. 4 is started.

When an application program is executed by the processing circuit 1 (FIG. 3), a main window 30 as shown in FIG. 8 is displayed on the image display unit 5. On the right side of the main window 30, command buttons (Command) 31 and shape buttons (Shape) 32 are displayed. On the left side thereof, a window in which a two-dimensional image stored in the image buffer is displayed (hereinafter suitably referred to as a buffer window) is displayed.

The command buttons 31 are operated for inputting commands. In the embodiment shown in FIG. 8, the command buttons include a "Paste Sel." button operated in carrying out paste buffer selection processing, a "Copy" button operated in carrying out copy processing, a "Paste" button operated in carrying out paste processing, an "Erase" button operated in carrying out erase processing, a "Matte" button operated in carrying out matte processing, a "Material" button operated in carrying out object property processing, a "Light" button operated in carrying out light source change processing, and a "Paint" button operated in carrying out paint processing.

The shape buttons 32 are operated for inputting the shape (shape information) of the sides of a three-dimensional object as a processing target. In the embodiment shown in FIG. 8, the shape buttons include a "Rectangle" button, a "cylinder" button, a "Sphere" button, and a "Cone" button, which are operated in designating a rectangle, a lateral side of a column or cylinder, a sphere, and a lateral side of a cone, respectively.

Furthermore, in the embodiment shown in FIG. 8, three buffer windows are displayed and the storage contents of image buffers #1, #2 and #3 of the plural image buffers are displayed in these buffer windows, respectively. (The suffix "i" of the image buffer #i represents the buffer ID.) In the case where a plurality of buffer windows are displayed, the buffer window showing the storage contents of a noted buffer, which will be later described, of the plurality of buffer windows, is displayed on the most forward side (i.e., made active).

The operation of the main window 30 is basically unified on a user interface for selecting an image buffer as a processing target and then selecting the processing. Therefore, first, the user clicks one of the buffer windows displayed in the main window 30 by operating the input unit 6, thereby selecting the image buffer as a processing target.

Specifically, when the user clicks one of the buffer windows, the input event processing section 11 at step S1 selects the image buffer having the storage contents displayed in the buffer window, as a noted buffer.

After that, the user clicks one of the command buttons 31. In this case, at step S2, the input event processing section 11 recognizes which of the command buttons 31 is clicked, and goes to step S3 to determine what processing (operation) to be carried out is instructed on the basis of the result of recognition. If it is determined at step S3 that paste buffer selection processing to be carried out is instructed, that is, if the "Paste Sel." button of the command buttons 31 is operated (clicked), the input event processing section 11 goes to step S4 to start the paste buffer selection processing section 14 so as to carry out paste buffer selection processing. Specifically, in this case, the paste buffer selection processing section 14 overwrites the buffer ID in the buffer ID storage section 21 by the buffer ID of the noted buffer, thus setting as the paste buffer the image buffer which is currently the noted buffer. The processing then returns to step S1.

If it is determined at step S3 that either copy processing or paste processing to be carried out is instructed, that is, if the "Copy" button or the "Paste" button of the command buttons 31 is operated, the input event processing section 11 waits for the shape button 32 to be operated and then proceeds to step S5. Specifically, the copy processing is the processing for spreading on a two-dimensional plane a side constituting a three-dimensional object displayed as a two-dimensional image stored in the noted buffer to generate a spread image and for storing the spread image into the paste buffer, while the paste processing is the processing for generating a projection image by pasting the image on the two-dimensional image stored in the paste buffer to the side constituting the three-dimensional object and projecting the image on the screen and for pasting the projection image to the two-dimensional image stored in the noted buffer. In both cases, the side constituting the three-dimensional object is used as a processing target. Therefore, if the user operates the "Copy" button or the "Paste" button, the user subsequently operates the shape button 32 to designate (input) shape information related to the shape of the side of the three-dimensional object as the target of copy processing or paste processing.

At step S5, the shape (shape information) of the side constituting the three-dimensional object as the target of the copy processing or paste processing is recognized on the basis of the operation of the shape button 32. The input event processing section 11 waits for a characteristic point to be entered and then proceeds to step S6. That is, in the copy processing, the portion (side) producing the spread image must be specified by designating several points constituting the side of the three-dimensional object displayed as the two-dimensional image stored in the noted buffer. In the paste processing, in order to paste the projection image of the image stored in the paste buffer to the side constituting the three-dimensional object displayed as the two-dimensional image stored in the noted buffer, the side must be specified by designating several points constituting the side. Thus, the user operates the "Copy" button or the "Paste" button, subsequently operates the shape button 32 to designate the shape of the side of the three-dimensional object as the target of the copy processing or paste processing, and then operates the input unit 6 to designate, as characteristics points, several points constituting the side of the three-dimensional object as the processing target in the two-dimensional image stored in the noted buffer.

At step S6, the coordinate of the characteristic points thus designated in the two-dimensional image is recognized.

In the above-described case, the characteristic points are designated after the shape of the three-dimensional object is designated. However, it is also possible to first designated the characteristic points and then designate the shape of the three-dimensional object. The processing of steps S5 and S6 is carried out by the copy operation processing section 12 if the copy processing is commanded, or by the paste operation processing section 13 if the paste processing is commanded.

The copy operation processing section 12 or the paste operation processing section 13, having recognized the characteristic points designated by the user at step S6, supplies the characteristic points to the conversion designation processing section 19. On receiving the characteristic points, the conversion designation processing section 19 at step S7 corrects the position of the characteristic points and supplies the corrected characteristic points to the copy operation processing section 12 or the paste operation processing section 13, that is, the section that supplied the characteristic points thereto.

After that, at step S8, the input event processing section 11 determines which of the "Copy" button and the "Paste" button is operated. If it is determined at step S8 that the "Copy" button is operated, the copy operation processing section 12 carries out the copy processing. Specifically, in this case, the processing goes from step S8 to step S9, and the copy operation processing section 12 calculates a conversion formula for converting the side constituting the three-dimensional object in the two-dimensional image stored in the noted buffer to the spread image on the basis of the shape information and characteristic points (hereinafter suitably referred to as a backward conversion formula), and supplies the conversion formula to the image conversion processing section 20. At step S10, the image conversion processing section 20 converts the side constituting the three-dimensional object in the two-dimensional image stored in the noted buffer (side specified by the characteristic points) to the spread image. Moreover, at step S11, the image conversion processing section 20 copies (writes) the spread image over the image buffer having the buffer ID stored in the buffer ID storage section 21, that is, the paste buffer. Then, the processing returns to step S1.

Figure 9B:
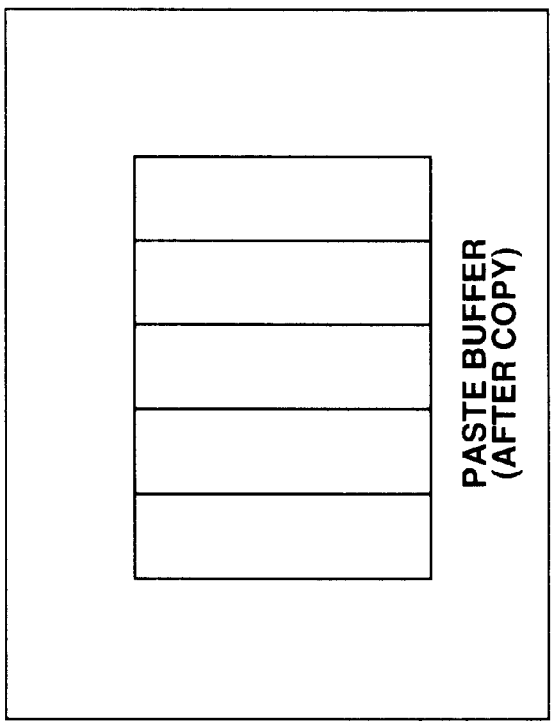
FIGS. 9A and 9B illustrate the copy processing.
Figure 9A:
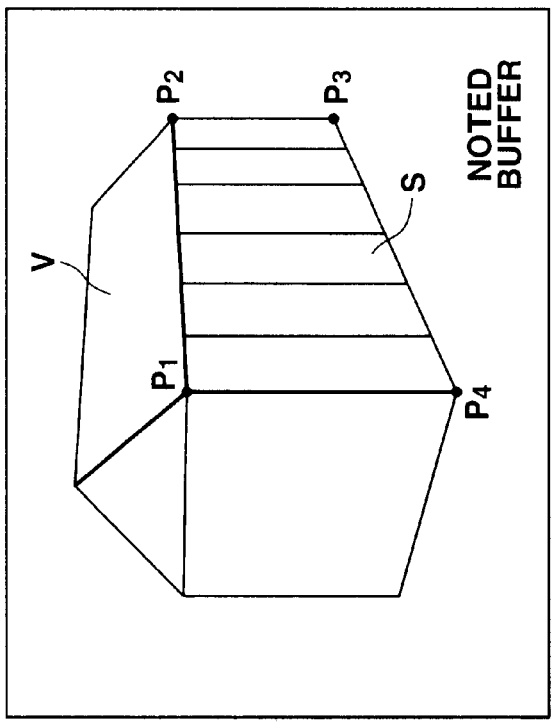

By the copy processing as described above, in the case where a two-dimensional image showing a three-dimensional object V imitating a house as shown in FIG. 9A is stored in the noted buffer, when a rectangle, which is the shape of a wall side S having vertical lines thereon, is designated as shape information while four apexes $P_1$, $P_2$, $P_3$ and $P_4$ of the wall side S are designated as characteristic points, a two-dimensional image (spread image) of the wall side S having vertical lines thereon obtained by spreading the three-dimensional object onto the two-dimensional plane is generated as shown in FIG. 9B and is stored into the paste buffer.

Therefore, in the case where the two-dimensional image showing the three-dimensional object V as shown in FIG. 9A is stored in the image buffer, in order to obtain the spread image of the wall side S having vertical lines thereon, the user may firstly set as a noted buffer the image buffer in which the two-dimensional image showing the three-dimensional object V is stored, secondly operate the "Copy" button commanding the copy processing, thirdly operate the "Rectangle" button designating the shape of the wall side S, and lastly designate as characteristic points the four apexes $P_1$, $P_2$, $P_3$ and $P_4$ of the rectangle constituting the wall side S having vertical lines thereon in the two-dimensional image as shown in FIG. 9A.

On the other hand, if it is determined at step S8 that the "Paste" button is operated, the paste operation processing section 13 carries out the paste processing. Specifically, in this case, the processing goes from step S8 to step S12, and the paste operation processing section 13 calculates a conversion formula for converting the image (spread image) on the two-dimensional plane stored in the paste buffer to a projection image on the basis of the shape information and characteristic points (hereinafter suitably referred to as a forward conversion formula), and supplies the conversion formula to the image conversion processing section 20. At step S13, the image conversion processing section 20 converts the image stored in the paste buffer to the projection image on the basis of the forward conversion formula. Moreover, at step S14, the image conversion processing section 20 pastes the projection image to the side (side specified by the characteristic points) of the three-dimensional object displayed as the two-dimensional image stored in the noted buffer. Then, the processing returns to step S1.

Figure 10A:
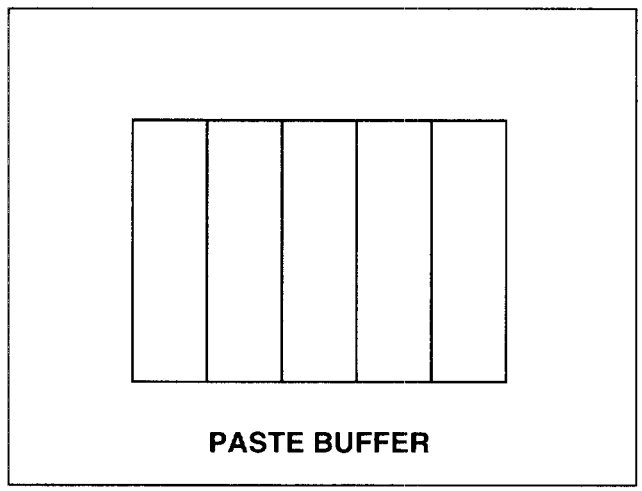
FIGS. 10A to 10C illustrate the paste processing.
Figure 10B:
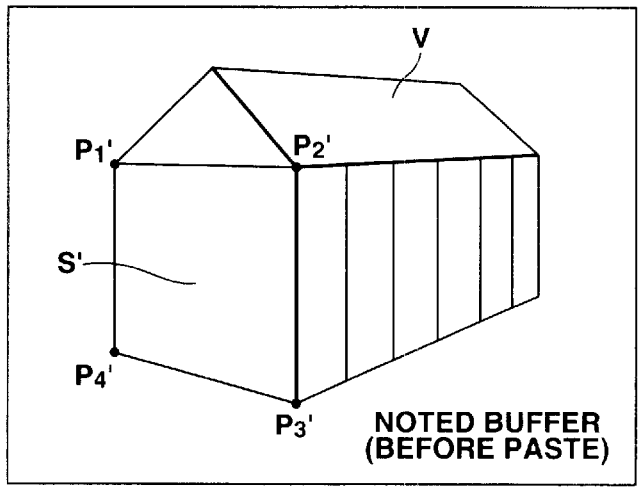

By the paste processing as described above, in the case where an image on the two-dimensional plane as shown in FIG. 10A is stored in the paste buffer by the copy processing described with reference to FIGS. 9A and 9B and where a two-dimensional image showing a three-dimensional object V imitating a house as shown in FIG. 10B is stored in the noted buffer, when a rectangle, which is the shape of a plain wall side S', is designated as shape information while four apexes $P_1'$, $P_2'$, $P_3'$ and $P_4'$ of the wall side S' are designated as characteristic points, a projection image of the wall side S' is generated such that the three-dimensional object V with the image stored in the paste buffer pasted on the wall side S' thereof is projected on the screen. The projection image is pasted onto the wall side S' specified by the characteristic points $P_1'$ to $P_4'$ of the three-dimensional object V displayed as the two-dimensional image stored in the noted buffer.

Therefore, in the case where the image as shown in FIG. 10A is stored in the paste buffer while the two-dimensional image showing the three-dimensional object V imitating a house as shown in FIG. 10B is stored in the image buffer, in order to obtain a two-dimensional image pasted to the wall side S' of the three-dimensional object V, the user may firstly set as a noted buffer the image buffer in which the two-dimensional image showing the three-dimensional object V is stored, secondly operate the "Paste" button commanding the paste processing, thirdly operate the "Rectangle" button designating the shape of the wall side S', and lastly designate as characteristic points the four apexes $P_1'$, $P_2'$, $P_3'$ and $P_4'$ of the rectangle constituting the wall side S' in the two-dimensional image as shown in FIG. 10B.

Figure 10C:
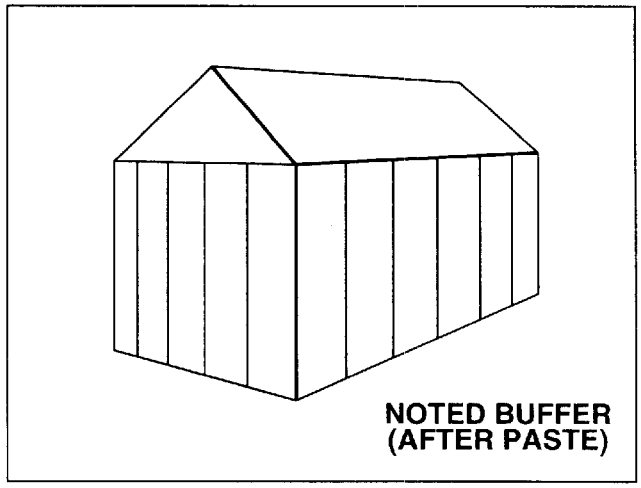

As is clear from the above description, the texture of the wall side S can be copied to the other wall side S' by carrying out the copy processing as described with reference to FIGS. 9A and 9B using as the noted buffer the image buffer in which the two-dimensional image showing the three-dimensional object V is stored, and then carrying out the paste processing as described with reference to FIGS. 10A to 10C. That is, the user can copy the texture of the wall side S in the two-dimensional image to the other wall side S' simply by carrying out the operation for the above-described copy processing and paste processing without being particularly aware of the direction of the wall sides S and S'.

Moreover, by drawing characters "ABC" or "DEF" in the paste buffer like drawing characters on a plane using the conventional 2D paint and then pasting the characters onto the wall side of the house shown in FIG. 5A, a natural two-dimensional image as shown in FIG. 5B can be obtained. That is, the characters need not be drawn along the wall side.

Also, by carrying out the copy processing to store a certain spread image into the paste buffer or select an image buffer in which a certain texture is stored as a paste buffer, and then carrying out the paste processing three times with apexes $p_1$, $p_2$, $p_3$ and $p_4$ constituting a side $S_1$, apexes $p_3$, $p_4$, $p_5$ and $p_6$ constituting a side $S_2$, and apexes $p_2$, $p_3$, $p_6$ and $p_2$ constituting a side $S_3$ of FIG. 5C designated as characteristic points, a two-dimensional image in which a rectangular-parallelepiped room is added to a wall of a house can be easily produced as shown in FIG. 5C. (In this case, a rectangle is designated as the shape information of the sides. $S_1$ to $S_3$.)

As can be seen from FIGS. 5A to 5C, the three-dimensional object as the paste processing target may be displayed or need not be displayed in the two-dimensional image stored in the noted buffer. That is, FIG. 5B shows the case where the three-dimensional object as the paste processing target (i.e., the three-dimensional object on which characters are to be pasted) is displayed in the original two-dimensional image (i.e., the two-dimensional image shown in FIG. 5A). FIG. 5C shows the case where the three-dimensional object as the paste processing target (i.e., the rectangular-parallelepiped prescribed by the sides $S_1$, $S_2$ and $S_3$ of FIG. 5C) is not displayed in the original two-dimensional image. In the case where the three-dimensional object as the paste processing target is not displayed in the original two-dimensional image, correction of the characteristic points designated by the user as the points on the three-dimensional object, that is, the processing of step S7 of FIG. 7 is skipped. This is because of the following reason. That is, while at step S7 the characteristic points designated by the user are corrected to be located on the contour of the three-dimensional object, the contour of the three-dimensional line does not exist if it is not displayed in the original two-dimensional image.

Figure 11A:
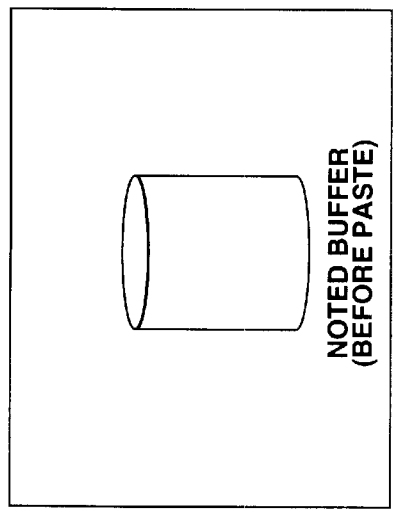
FIGS. 11A to 11D illustrate copying of texture by combining the copy processing and the paste processing.
Figure 11C:
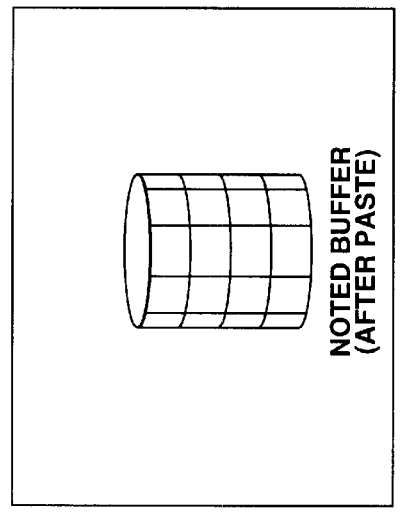
Figure 11B:
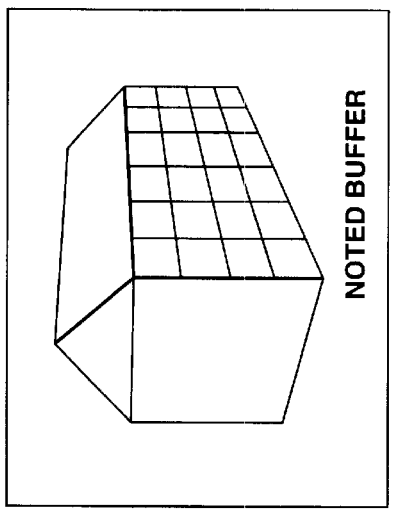
Figure 11D:
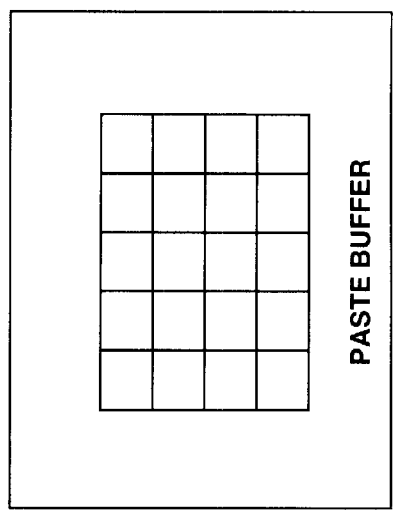

The spread image obtained from the two-dimensional image by the copy processing can be pasted to any two-dimensional image except for the original two-dimensional image, and the side of the three-dimensional object on which the spread image is to be pasted need not have the same shape as the side of the original three-dimensional object for producing the spread image. Specifically, it is possible to carry out the copy processing with respect to a check-patterned wall side of a three-dimensional object (of the shape of a house) displayed as a two-dimensional image as shown in FIG. 11A, then storing a spread image of the check-patterned wall side into the paste buffer as shown in FIG. 11B, then carry out the paste processing with respect to the lateral side of a column displayed as a two-dimensional image as shown in FIG. 11C, and paste the check-patterned spread image along the lateral side of the column as shown in FIG. 11D. That is, the texture of a certain three-dimensional object can be pasted as the texture of another three-dimensional object.

Furthermore, arbitrary images can be stored in the paste buffer, as well as images obtained by the copy processing. Therefore, by the paste processing, an arbitrary image can be pasted to the three-dimensional object displayed as the two-dimensional image. (As described above, the three-dimensional object need not be displayed as the two-dimensional image.)

Also, by the copy processing and the paste processing, various types of three-dimensional operations other than the above-described operations can be performed on the two-dimensional image. Specifically, if the three-dimensional object displayed as the two-dimensional image has an uneven side, a two-dimensional image showing the three-dimensional object with the unevenness eliminated therefrom can be obtained by storing a spread image of the uneven side into the paste buffer by the copy processing, then deleting the uneven portion on the paste buffer, and then pasting the image after the deletion onto the side of the original three-dimensional object by the paste processing. Also, in carrying out the copy processing and the paste processing with respect to the same three-dimensional object, shift, expansion, contraction and other non-linear transformation (e.g., transformation as if shooting were carried out by using a lens having special optical characteristics such as a so-called fisheye lens) of the three-dimensional object can be carried out by changing the characteristic points designated in carrying out the paste processing to the characteristic points designated in carrying out the copy processing.

Referring again to FIG. 7, if it is determined at step S3 that the matte processing is designated, that is, if the "Matte" button of the command buttons 31 is operated, the processing goes to step S15 and the input event processing section 11 starts up the matte operation processing section 16 to carry out the matte processing. Specifically, in this case, the matte operation processing section 16 generates a matte of the three-dimensional object displayed as the two-dimensional image stored in the noted buffer and stores the matte in the noted buffer. The processing then returns to step S1. The matte processing will be later described in detail.

If it is determined at step S3 that the object property processing or light source change processing is designated, that is, if the "Material" button or the "Light" button of the command buttons 31 is operated, the processing goes to step S16 and the input event processing section 11 starts up the object property operation processing section 17 to carry out the object property processing or light source change processing (object property/light source change processing). The processing then returns to step S1. The object property/light source change processing will be later described in detail.

On the other hand, if it is determined at step S3 that the erase processing is designated, that is, if the "Erase" button of the command buttons 31 is operated, the processing goes to step S17 and the input event processing section 11 starts up the erase operation processing section 15 to carry out the erase processing. The processing then returns to step S1. The erase processing will be later described in detail.

If it is determined at step S3 that the paint processing is designated, that is, if the "Paint" button of the command buttons 31 is operated, the processing goes to step S18 and the input event processing section 11 starts up the paint processing section 18 to carry out the paint processing. The processing then returns to step S1. Specifically, in the paint processing, a part of the image stored in the paste buffer is erased or another image (including a character or a pattern) is added in accordance with the operation of the input unit 6 by the user using the paint tool for carrying out 2D paint as in the conventional technique.

For example, in the case where a three-dimensional object displayed as a two-dimensional image has an uneven side, as described above, by storing a spread image of that side into the paste buffer by the copy processing, then deleting the uneven portion on the paste buffer by the paint processing, and then pasting the image after the deletion to the side of the original three-dimensional object by the paste processing, a two-dimensional image showing the three-dimensional object with the unevenness removed therefrom can be obtained. Also, by carrying out the copy processing with respect to a two-dimensional image showing a three-dimensional object as shown in FIG. 5A, then storing a spread image of its wall side into the paste buffer, then writing characters "ABC" or "DEF" onto the image stored in the paste buffer by the paint processing, and pasting the resulting image to the original wall side by the paste processing, a natural two-dimensional image as shown in FIG. 5B can be obtained. That is, three-dimensional drawing can be easily carried out by 2D paint.

Figure 12:
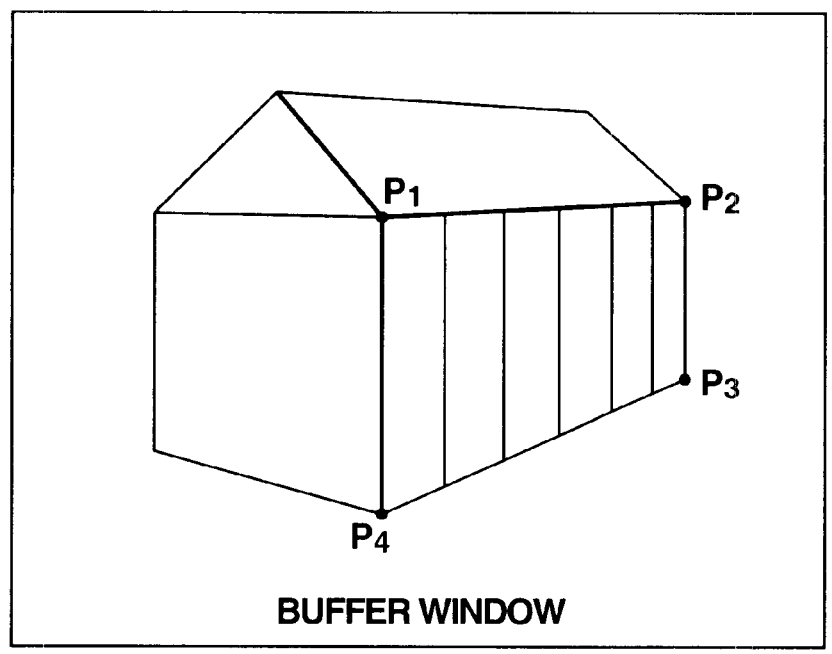
FIG. 12 shows a characteristic point designated by a user.

In carrying out the copy processing as described with reference to FIGS. 9A and 9B or the paste processing as described with reference to FIGS. 10A to 10C, accurate designation of the positions of apexes $P_1$ to $P_4$ or apexes $P_1'$ to $P_4'$ as characteristic points as shown in FIG. 9A or 10B is difficult even for a user skilled in the operation. Specifically, for example, in carrying out the copy processing as shown in FIGS. 9A and 9B, the characteristic points $P_1$ to $P_4$ designated by the user are generated deviated from the positions of apexes that should be originally designated, as shown in FIG. 12. Moreover, if the two-dimensional image is blurred or fluctuated, accurate designation of the positions of apexes that should be originally designated is difficult even for a user highly skilled in the operation.

Figure 7:
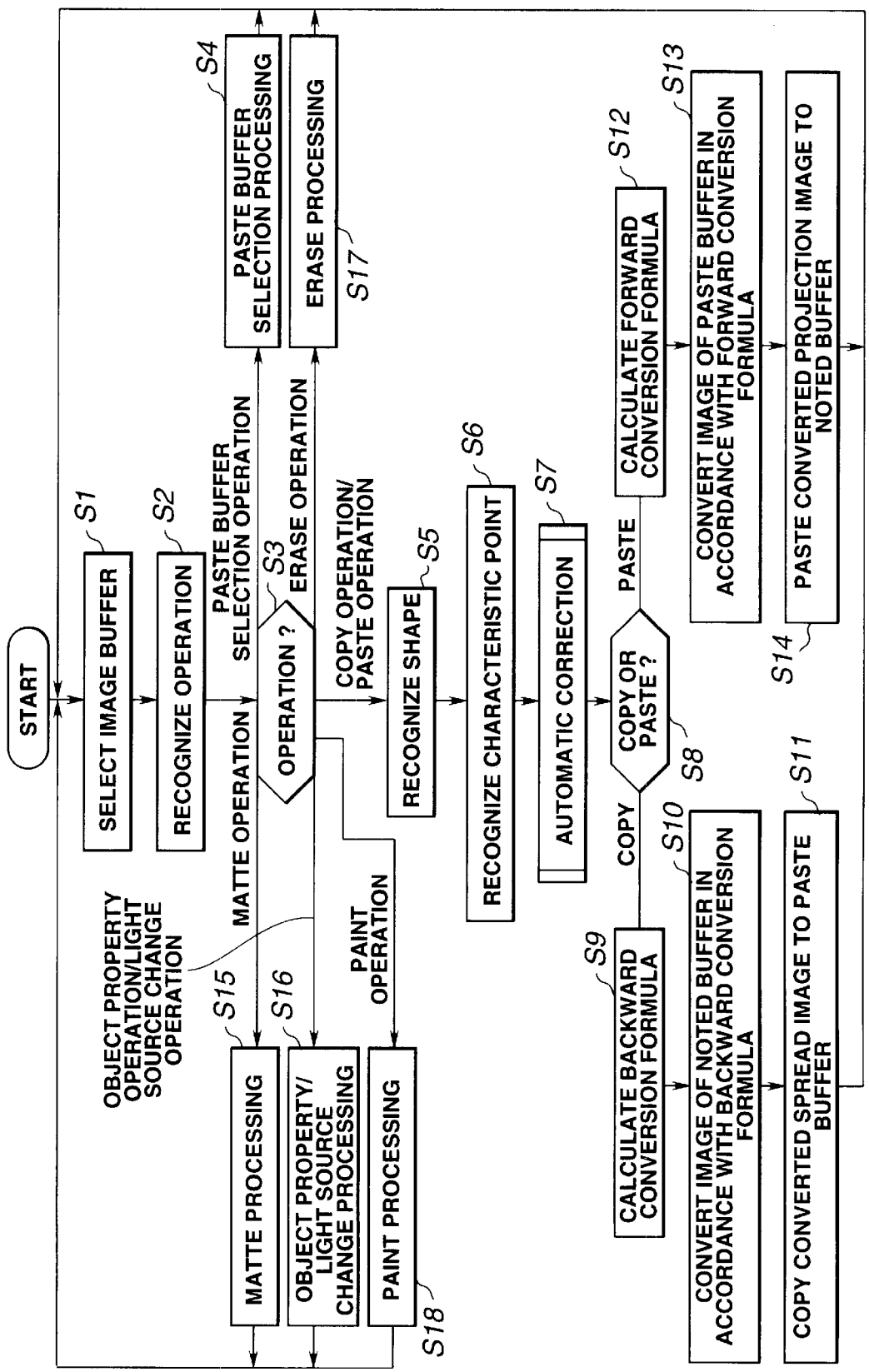
FIG. 7 is a flowchart for explaining the processing of the image processing device of FIG. 4.

Thus, at step S7 of FIG. 7, automatic correction processing is carried out in which the characteristic points designated by the user are automatically corrected to the positions that should be originally designated.

Specifically, at step S7, the copy operation processing section 12 or the paste operation processing section 13 starts up the conversion designation processing section 19 and supplies the shape information and characteristic points designated by the user operating the input unit 6 to the conversion designation processing section 19.

On receiving the shape information and characteristic points, the conversion designation processing section 19 carries out the automatic correction processing for correcting the characteristic points.

The points to be designated as characteristic points are basically located on the contour (boundary) of the side of the three-dimensional shape as a target of the copy processing or paste processing, as will be later described. Thus, the conversion designation processing section 19 extracts the contour of the three-dimensional shape (side) as the target of the copy processing or paste processing and corrects the characteristic points so as to be located on the contour.

Figure 13:
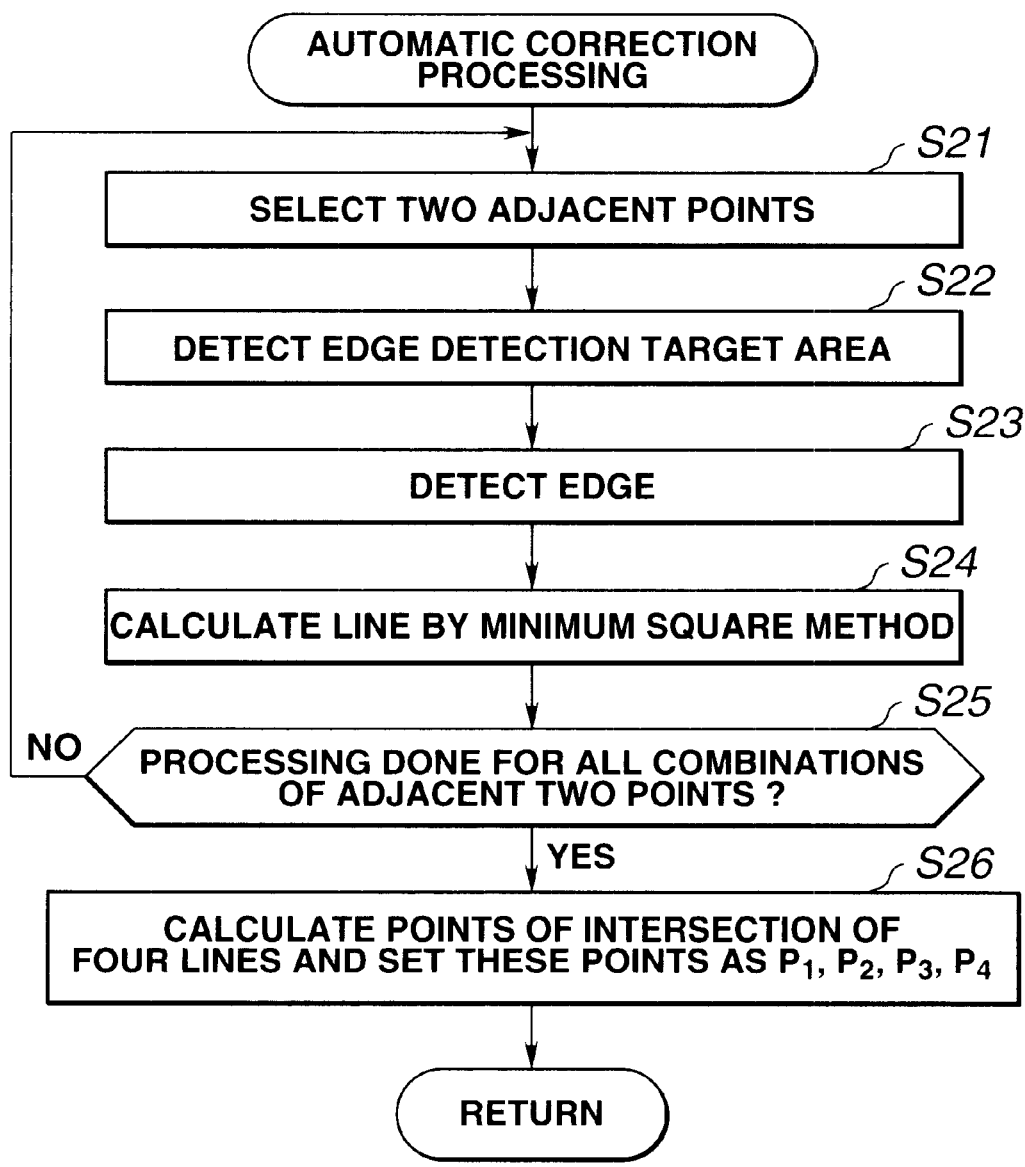
FIG. 13 is a flowchart for explaining details of the processing of step S7 of FIG. 7.

FIG. 13 is a flowchart for explaining the automatic correction processing carried out by the conversion designation processing section 19. In this example, in order to simplify the description, the side of the three-dimensional object displayed as a two-dimensional image, which is a target of the copy processing or paste processing, is rectangular as shown in FIG. 12, and the four apexes of the rectangle should be designated as characteristic points as shown in FIG. 12.

First, at step S21, the conversion designation processing section 19 selects a set of two adjacent points of the characteristic points inputted (designated) by the user. The points to be designated as characteristic points are located on the contour of the side of the three-dimensional object displayed as the two-dimensional image, which is a target of the copy processing or paste processing, as described above, and which position to be designated on the contour is predetermined in accordance with the shape of the three-dimensional object, as will be later described. Therefore, the two adjacent points on the contour, of the characteristic points inputted by the user, can be recognized on the basis of the shape information. Thus, at step S21, the conversion designation processing section 19 selects one of sets of two characteristic points thus recognized.

After that, the automatic correction processing goes to step S22 and an area as a target of edge detection at the subsequent step S23 (hereinafter suitably referred to as an edge candidate area) is detected. Specifically, at step S22, a line connecting the two characteristic points selected at step S21 (hereinafter suitably referred to as selected characteristic points) is found, and pixels located within a range at a predetermined distance (e.g., a distance of five pixels) from a pixel on the line are detected. Then, an area constituted by such pixels is detected as an edge candidate area.

Figure 14:
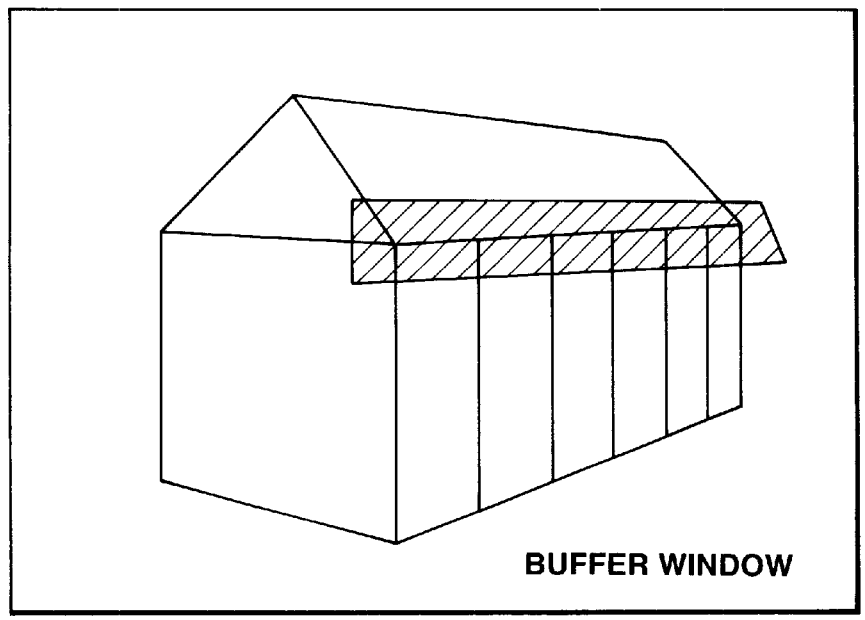
FIG. 14 illustrates the processing of step S22 of FIG. 13.

For example, in the case where the characteristic points $P_1$ to $P_4$ are designated as shown in FIG. 12, when the characteristic points $P_1$ and $P_2$ of these characteristic points are selected as selected characteristic points, a shaded area in FIG. 14 is detected as an edge candidate area.

The distance of the range including the pixels to be detected from the pixel on the line connecting the two selected characteristic points at step S22 can be preset or can be inputted by the user operating the input unit 6.

After the detection of the edge candidate area, the automatic correction processing goes to step S23 and edge detection is carried out with respect to the edge candidate area as a target.

As the edge detection method, various methods have been conventionally proposed and any of such methods can be used. In this case, however, the following technique is used.

Specifically, the pixels within the edge detection area are filtered by an edge detection filter referred to as a Sobel operator, and the gradient (gradient vector) at each pixel is found. The technique of detecting a pixel having a large gradient as an edge has been conventionally known. Moreover, in this example, the inner product of the unit vector in the direction orthogonal to the line connecting the two characteristic points, that is, the normal vector, and the gradient of each pixel within the edge candidate area is calculated, and a pixel generating the inner product not less than a predetermined threshold value is detected as a pixel constituting the edge (hereinafter suitably referred to as an edge pixel).

As the characteristic points, points which are close to, though not coincident with, the apexes of the rectangle, which is the side constituting the three-dimensional object as the target of the copy processing or paste processing, are selected as shown in FIG. 12. Therefore, the line connecting the two selected characteristic points are substantially coincident with the contour of the rectangle, which is the side constituting the three-dimensional object as the target of the copy processing or paste processing. As a result, the inner product of the normal vector and the gradient expresses a gradient component in the direction of the normal vector, that is, a gradient component in the direction substantially orthogonal to the contour. Therefore, by detecting the edge in accordance with the magnitude of the inner product, the edge detection can be less influenced by the noise or the like in comparison with the case where the edge is detected in accordance with the magnitude of the gradient. That is, the edge detection which is less influenced by the noise on the two-dimensional image or the texture such as a stripe pattern can be carried out.

After the detection of the edge pixel, the automatic correction processing goes to step S24 and a straight line passing through the edge pixel is found by a minimum square method. Specifically, at step S24, a straight line for minimizing the sum of square of the distance from the edge pixel detected at step S23 (hereinafter suitably referred to as an edge line) is found.

Then, the automatic correction processing goes to step S25 and it is determined whether or not the edge line has been found with respect to all the combinations of two adjacent points of the characteristic points inputted by the user. If it is determined that the edge line has not been found with respect to all the combinations of two adjacent characteristic points, the processing returns to step S21. Again, two adjacent characteristic points for which the edge line has not been found are selected as selected characteristic points and similar processing is repeated.

If it is determined at step S25 that the edge line has been found with respect to all the combinations of two adjacent characteristic points, that is, if the edge line has been found for the set of $P_1$ and $P_2$, the set of $P_2$ and $P_3$, the set Of $P_3$ and $P_4$, and the set of $P_4$ and $P_1$ in FIG. 12, the automatic correction processing goes to step S26 and points of intersection of the four edge lines found for the four sets are found. Specifically, a point of intersection between the edge line found for the set of characteristic points $P_4$ and $P_1$ and the edge line found for the set of characteristic points $P_1$ and $P_2$ (hereinafter suitably referred to as a first point of intersection), a point of intersection between the edge line found for the set of characteristic points $P_1$ and $P_2$ and the edge line found for the set of characteristic points $P_2$ and $P_3$ (hereinafter suitably referred to as a second point of intersection), a point of intersection between the edge line found for the set of characteristic points $P_2$ and $P_3$ and the edge line found for the set of characteristic points $P_3$ and $P_4$ (hereinafter suitably referred to as a third point of intersection), and a point of intersection between the edge line found for the set of characteristic points $P_3$ and $P_4$ and the edge line found for the set of characteristic points $P_4$ and $P_1$ (hereinafter suitably referred to as a fourth point of intersection) are found. Moreover, at step S26, the characteristic points closest to the respective points of intersection are corrected to the positions of those points of intersection. That is, the characteristic points $P_1$ to $P_4$ are corrected to the positions of the first to fourth points of intersection, respectively, and then the processing returns.

In accordance with the above-described automatic correction processing, the characteristic points $P_1$ to $P_4$ designated by the user are shifted to the positions of the apexes of the rectangle that should be originally designated as characteristic points. Therefore, the user need not accurately designate the positions that should be originally designated. That is, it suffices that the user simply designates positions close to the positions to be originally designated.

In the embodiment shown in FIG. 7, the automatic correction processing for the characteristic points is necessarily carried out. However, it is possible to carry out the automatic correction processing only when an instruction to carry out the automatic correction processing is issued from the user. Also, it is possible to further correct the characteristic points by the user after the correction by the automatic correction processing.

The automatic correction processing for the characteristic points can be also be carried out as follows, using the edge pixel detection method described with reference to FIG. 13.

Figure 15:
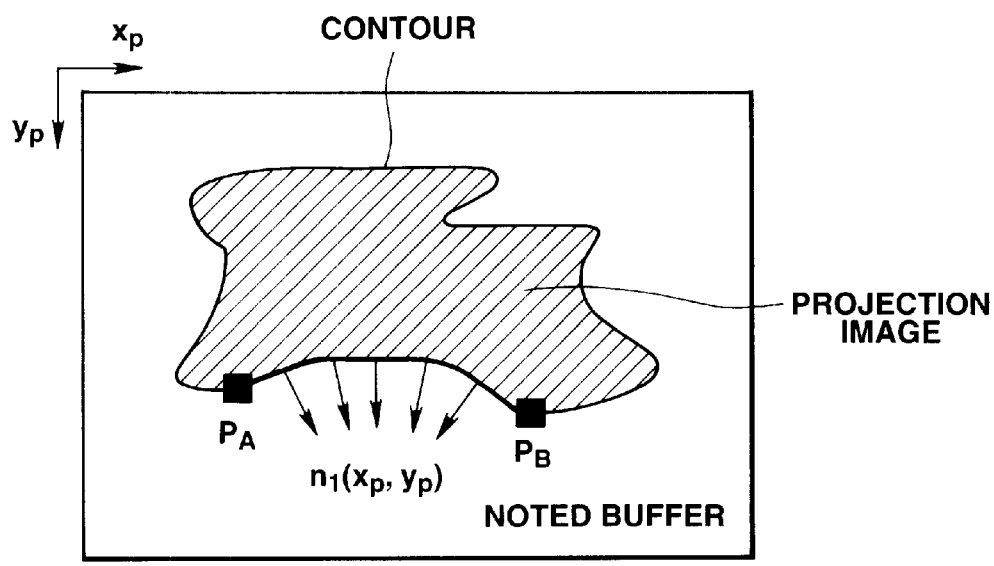
FIG. 15 illustrates a contour extraction method for a three-dimensional object displayed as a two-dimensional image.

Specifically, it is assumed that a two-dimensional image as shown in FIG. 15 is stored in the noted buffer. In FIG. 15, a shaded portion represents a three-dimensional object displayed as a two-dimensional image. (Since this is obtained by projecting the three-dimensional object in the three-dimensional space onto the screen, it is suitably referred to as a projection image hereinafter.)

In FIG. 15, with respect to the two-dimensional image, points $P_A$ and $P_B$ are designated as characteristic points. of the projection image of the three-dimensional object. The characteristic points $P_A$ and $P_B$ are adjacent to each other on the contour of the projection image of the three-dimensional object.

On the assumption that a two-dimensional coordinate system (hereinafter suitably referred to as a screen coordinate system) using an Xp axis and a Yp axis as the horizontal axis and the vertical axis, respectively, is defined with respect to the two-dimensional image stored in the noted buffer, as shown in FIG. 15, the shape of the three-dimensional object displayed as the two-dimensional image can be recognized from shape information. As the shape of the three-dimensional object is known, the contour line between the characteristic points $P_A$ and $P_B$ of the projection image can be generally defined by an equation f=0 of a function "f" using $x_p$ and $y_p$ as variables expressed by one or more parameters. (Since the contour line of the projection image basically constitutes a closed loop, two contour lines exist between the characteristic points $P_A$ and $P_B$. However, of the two contour lines (indicated by a thin line and a bold line in FIG. 15), the line on which no other characteristic point exits (indicated by the bold line in FIG. 15) is used.) (The function "f" has a varying type (implementation in programming) for each shape of the three-dimensional object.)

Specifically, with the parameters expressed by $C_1$, $C_2$, ..., $C_N$ (where N is an integer not smaller than 1), the contour between the characteristic points $P_A$ and $P_B$ can be defined by the following equation.

$$f(x_p, y_p, C_1, C_2, \ldots, C_N)=0 \tag{1}$$

Meanwhile, with respect to the pixels constituting the true contour, a component of the pixel value in the direction orthogonal to the contour is rapidly changed. Therefore, as the parameters $C_1$, $C_2$, ..., $C_N$ are found which maximize the component in the direction of normal vector (i.e., the direction orthogonal to the contour) of the pixel, from among the differential values of the pixel values of the pixels on the screen coordinate system expressed by the equation (1), it can be said that the line defined by the equation (1) using the parameters expresses the true contour.

Thus, with respect to the line equivalent to the contour between the characteristic points $P_A$ and $P_B$ defined by the equation (1) (i.e., as described above, though two lines equivalent to the contour of the projection image exist between the characteristic points $P_A$ and $P_B$, the line on which no other characteristic point exists, of the two lines, is used), energy $E_f$ is defined by the following equation.

$$E_f = \frac{\sum_{\{(x_p, y_p) | f(x_p, y_p, C_1, \ldots, C_N) = 0\}} |\nabla B(x_p, y_p) \cdot n_f(x_p, y_p)|}{K} \quad (2)$$

In the equation (2), $\Sigma$ represents the summation with respect to all the pixels on the line expressed by the equation (1). $\nabla$ represents the nabla operator, and $B(x_p, y_p)$ represents the pixel value of a pixel located at the position $(x_p, y_p)$ of the screen coordinate system. The vector $n_f(x_p, y_p)$ represents the normal vector (see FIG. 15) at the pixel located at the position $(x_p, y_p)$ (i.e., the unit vector at the position $(x_p, y_p)$ of the vector in the direction orthogonal to the line expressed by the equation (1) (e.g., the outer vector of outer and inner vectors of the area surrounded by contour).) $|x|$ represents the non of the vector "x", and "." represents the inner product. Moreover, "K" represents the total number of pixels on the line expressed by the equation (1).

$\nabla B(x_p, y_p)$ in the equation (2) represents the differential value of the pixel values of the pixels on the line expressed by the equation (1), that is, the gradient. This can be found by using the Sobel operator. Specifically, $\nabla B(x_p, y_p)$ can be found in accordance with the following equations.

$$\nabla B(x_p, y_p) = (\Delta_x B(x_p, y_p), \Delta_y B(x_p, y_p))$$

$$\Delta_x B(x_p, y_p) = B(x_p+1, y_p-1) + 2B(x_p+1, y_p) + B(x_p+1, y_p+1) - (B(x_p-1, y_p-1) + 2B(x_p-1, y_p) + B(x_p-1, y_p+1))$$

$$\Delta_y B(x_p, y_p) = B(x_p-1, y_p+1) + 2B(x_p, y_p+1) + B(x_p+1, y_p+1) - (B(x_p-1, y_p-1) + 2B(x_p, y_p-1) + B(x_p+1, y_p-1)) \quad (3)$$

The parameter Cn (where n=1, 2, . . . , N) which maximizes the energy $E_f$ can be found as follows. That is, the equation (2) is calculated with the parameter $C_n$ changed within a range from $C_n' - \epsilon_n$ to $C_n' + \epsilon_n$ where $C_n'$ represents the initial value of the parameter $C_n$, and the parameter $C_n$ maximizing the value may be found. ($\epsilon_n$ is a predetermined small value.)

Specifically, on the assumption that the contour between the characteristic points $P_A$ and $P_B$ is a segment L, the equation (2) can be expressed as follows.

$$E_f = \frac{\sum_{(x_p, y_p) \in L} |\nabla B(x_p, y_p) \cdot n_L|}{K} \quad (4)$$

In this example, $\Sigma$ represents the summation of all the pixels on the line expressed by the equation (1) as described above, that is, the segment L in this example. The vector $n_L$ is equivalent to the vector $n_f(x_p, y_p)$ in the equation (2) and represents the normal vector of the segment L. In the equation (4), K represents the total number of pixels on the segment L.

On the other hand, in the case where the contour between the characteristic points $P_A$ and $P_B$ is a segment, the equation (1) can be expressed as follows, for example, using three parameters $C_1$, $C_2$ and $C_3$.

$$f(x_p, y_p, C_1, C_2, C_3) = C_1 x_p + C_2 y_p + C_3 = 0 \quad (5)$$

On the assumption that the characteristic points $P_A$ and $P_B$ have the coordinate $(x_1, y_1)$ and $(x_2, y_2)$, respectively, the parameters $C_1$, $C_2$ and $C_3$ in the equation (5) can be expressed as follows.

$$C_1 = y_1 - y_2, \quad C_2 = -x_1 + x_2, \quad C_3 = x_1 y_2 - x_2 y_1 \quad (6)$$

Therefore, in this case, the values expressed by the equation (6) are used as initial values $C_1'$, $C_2'$ and $C_3'$ of the parameters $C_1$, $C_2$ and $C_3$, and the energy $E_f$ expressed by the equation (4) is calculated with these values varied. Thus, the parameters $C_1$, $C_2$ and $C_3$ at the time when the energy $E_f$ reaches the maximum is found. The equation (5) using the parameters $C_1$, $C_2$ and $C_3$ at this point expresses the true contour between the characteristic points $P_A$ and $P_B$. Therefore, as the characteristic points $P_A$ and $P_B$ are shifted onto the line expressed by the equation (5), the characteristic points $P_A$ and $P_B$ are regarded as being shifted onto the true contour line.

In the case where the contour between the characteristic points $P_A$ and $P_B$ is a segment, varying the parameters $C_1$, $C_2$ and $C_3$ is equivalent to varying the coordinate $(x_1, y_1)$ and $(x_2, y_2)$ of the characteristic points $P_A$ and $P_B$, respectively, as is clear from the equation (6). Therefore, it can be said that the coordinate $x_1$, $y_1$, $x_2$, $y_2$ are parameters of the function "f".

In the case where the contour between the characteristic points $P_A$ and $P_B$ is a segment, the initial values are provided by the characteristic points $P_A$ and $P_B$ for all the three parameters $C_1$, $C_2$ and $C_3$ of the function "f" in the equation (5). However, in the case where the contour between the characteristic points $P_A$ and $P_B$ is a curved line, initial values are not necessarily provided for all the parameters of the function "f". In such a case, with respect to a parameter for which no initial value is provided, a preset value may be provided as an initial value, or a value to be an initial value may be inputted by the user.

In the above-described case, only the two adjacent characteristic points are noted in order to simplify the description. In such a case, however, the following problem may arise in the actual processing. Specifically, on the assumption that three characteristic points, that is, a characteristic point #1, a characteristic point #2 adjacent thereto, and a characteristic point #3 adjacent thereto, are designated on the contour, if the above-described automatic correction processing is carried out with respect to the characteristic points #1 and #2 and then the automatic correction processing is carried out with respect to the characteristic points #2 and #3, the position of the corrected characteristic point #2 obtained by carrying out the automatic correction processing with respect to the characteristic points #1 and #2 might be deviated from the position of the corrected characteristic point #2 obtained by carrying out the automatic correction processing with respect to the characteristic points #2 and #3.

Thus, in the actual processing, it is desired to change the parameters of the equation (1) defining the contour between the characteristic points #1 and #2 (hereinafter suitably referred to as first parameters) and the parameters of the equation (1) defining the contour between the characteristic points #2 and #3 (hereinafter suitably referred to as second parameters) so that the above-described deviation of position of the corrected characteristic point #2 is not generated. In this case, the first and second parameters are not independent, and the relation between these parameters is constrained by the condition such that the deviation of position of the corrected characteristic point #2 is not generated. Therefore, the first parameters for maximizing the energy $E_f$ of the equation (2) obtained by noting the characteristic points #1 and #2 and the second parameters for maximizing the energy $E_f$ of the equation (2) obtained by noting the characteristic points #2 and #3 might not be in the relation satisfying the condition such that the deviation of position of the characteristic point #2 is not generated. In such a case, for example, the first and second parameters which maximize the sum of the energy $E_f$ of the equation (2) obtained by noting the characteristic points #1 and #2 and the energy $E_f$ of the equation (2) obtained by noting the characteristic points #2 and #3 may be found.

In this case, the position of one characteristic point #2 is deviated, in order to simplify the description. However, since this deviation may be generated with respect to all the characteristic points on the same contour, it is desired to find the parameters of the equation (1) defining the contour between the combination of adjacent characteristic points on the same contour by applying the above-described technique with respect to all the combinations. That is, it is desired to find the sum of the energy $E_f$ with respect to the combination of adjacent characteristic points on the same contour and then find parameters which maximize the sum.

Figure 16:
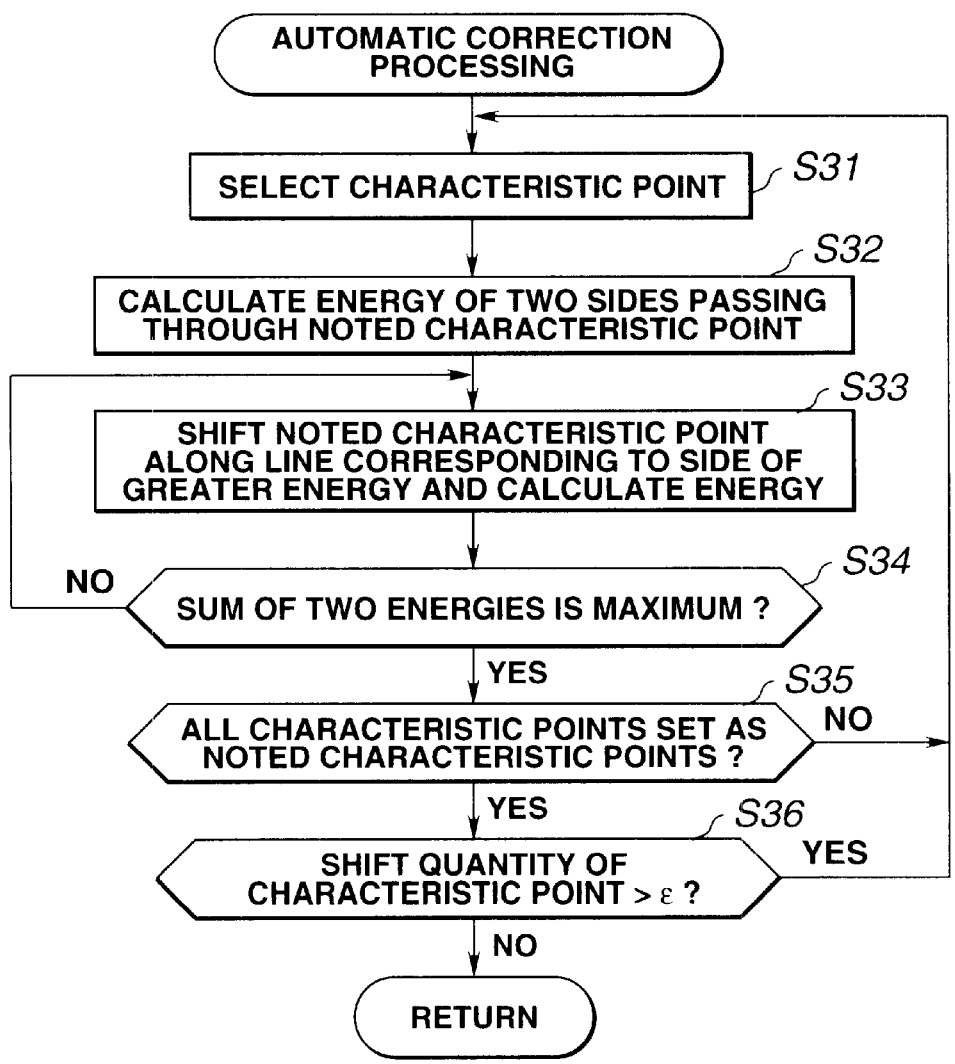
FIG. 16 is a flowchart for explaining details of the processing of step S7 of FIG. 7.

Referring to the flowchart of FIG. 16, the processing in the case where the above-described automatic correction processing is carried out at step S7 of FIG. 7 will now be described further.

In this case, to simplify the description, a rectangular projection image is used and the four apexes of the rectangle are designated as characteristic points $P_1$ to $P_4$.

Also, in this case, the energy $E_f$ expressed by the equation (4) is calculated while the three parameters $C_1$, $C_2$ and $C_3$ in the equation (5), that is, the x-coordinate x1, x2 and the y-coordinate y1, y2 of the two characteristic points in the equation (6) are varied. Then, $x_1$, $x_2$, $y_1$, $y_2$ which maximize the value of the energy are found. This required a relatively large quantity of calculation. Thus, to reduce the quantity of calculation, a simplified technique is used.

Figure 17:
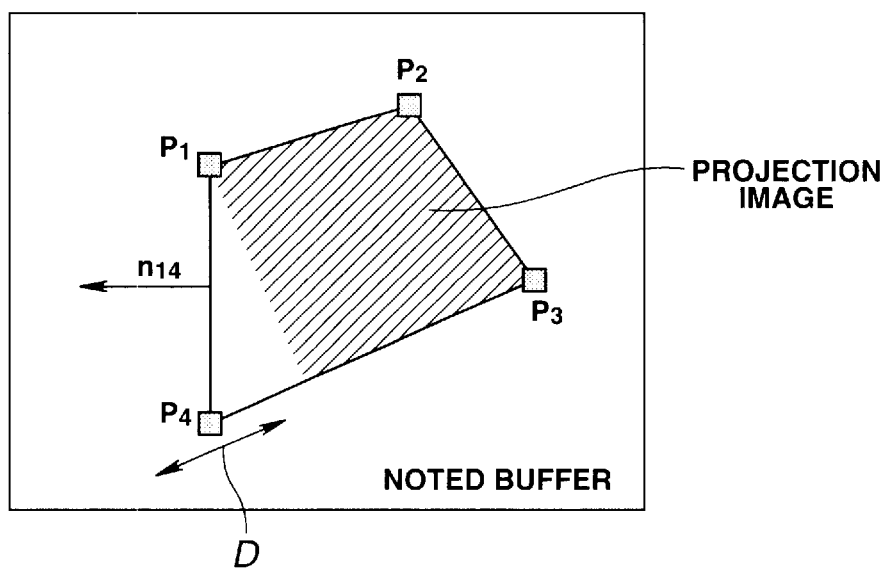
FIG. 17 illustrates a correction method for a characteristic point.

Specifically, first, at step S31, one of the four characteristic points $P_1$, to $P_4$ is selected as a noted characteristic point. The automatic correction processing goes to step S32 and the energy $E_f$ of two sides of a rectangle (formed by connecting the noted characteristic point and the other characteristic points) passing through the noted characteristic points is found, respectively. That is, for example, in FIG. 17, it is assumed that points $P_1$ to $P_4$ are designated as characteristic points with respect to a projection image indicated as a shaded area and that the characteristic point $P_4$ is selected as a noted characteristic point. In this case, at step S32, the energy $E_f$ of the sides $P_4P_1$ and $P_3P_4$ passing through the noted characteristic point $P_4$, of the four sides of the rectangle $P_1P_2P_3P_4$, is found.

Then, the automatic correction processing goes to step S33 and the side having the greater energy $E_f$, of the two sides having their energy $E_f$ found at step S32, is selected as a side better along the contour of the projection image. Along a straight line extended from that side (hereinafter also referred to as an edge line), the noted characteristic point is shifted. Then, the energy $E_f$ of the two sides formed by the noted characteristic point at the shifted position and two characteristic points adjacent thereto is calculated. Specifically, for example, in FIG. 17, in the case where the characteristic point $P_4$ is selected as the noted characteristic point, when the energy $E_f$ of the side $P_3P_4$ is greater than the energy of the side $P_4P_1$, the noted characteristic point $P_4$ is shifted along the straight line $P_3P_4$ as indicated by an arrow D in FIG. 17. Then, the energy $E_f$ of the side $P_3P_4$ formed by the noted characteristic point $P_4$ after the shift and the one characteristic point $P_3$ adjacent thereto, and the energy $E_f$ of the side $P_4P_1$ formed by the noted characteristic point $P_4$ after the shift and the other characteristic point $P_1$ adjacent thereto are found.

After that, the processing goes to step S34 and it is determined whether the sum of the energy $E_f$ of the two sides found at step S33 is the maximum value or not. If it is determined that the sum is not the maximum value, the processing returns to step S33. The noted characteristic point is shifted again along the edge line and similar processing is subsequently repeated.

On the other hand, if it is determined at step S34 that the sum of the energy $E_f$ of the two sides found at step S33 is the maximum value, that is, if the normal vector $n_{14}$ of the side $P_4P_1$ is made substantially orthogonal to the side connecting two apexes that should be designated by the characteristic points $P_1$ and $P_4$ by shifting the noted characteristic point $P_4$ along the straight line $P_3P_4$, the automatic correction processing goes to step S35 and it is determined whether or not the processing has been carried out using all the characteristic points $P_1$ to $P_4$ designated by the user, as the noted characteristic point. If it is determined that the processing has not been carried out using all the characteristic points $P_1$ to $P_4$ designated by the user, as the noted characteristic point, the processing goes to step S31. The characteristic point which has not been used as the noted characteristic point is newly selected as the noted characteristic point and the processing of and after step S32 is repeated.

If it is determined at step S35 that the processing has been carried out using all the characteristic points $P_1$ to $P_4$ designated by the user, as the noted characteristic point, the automatic correction processing goes to step S36 and it is determined whether or not there is a characteristic point, of the characteristic points $P_1$ to $P_4$, which has the quantity of shift in the previous processing of step S33 (i.e., the distance between the characteristic point before the shift and the characteristic point after the shift) greater than a predetermined threshold value $\epsilon$. If it is determined at step S36 that there is a characteristic point, of the characteristic points $P_1$ to $P_4$, which has the quantity of shift in the previous processing of step S33 greater than a predetermined threshold value $\epsilon$, the processing returns to step S31 and similar processing is repeated. That is, the characteristic points $P_1$ to $P_4$ are sequentially used as the noted characteristic point and the position thereof is shifted so that the sum of the energy of the two sides formed by each noted characteristic point becomes the maximum value.

On the other hand, if it is determined at step S36 that there is no characteristic point, of the characteristic points $P_1$ to $P_4$, which has the quantity of shift in the previous processing of step S33 greater than a predetermined threshold value $\epsilon$, that is, if none of the characteristic points $P_1$ to $P_4$ is substantially shifted in the previous processing of step S33, the processing returns.

The copy operation processing section 12 and the paste operation processing section 13 calculate the backward conversion formula and the forward conversion formula, respectively, by using the characteristic points corrected as described above and the shape information. The method for calculating the backward conversion formula and the forward conversion formula will now be described.

Figure 18C:
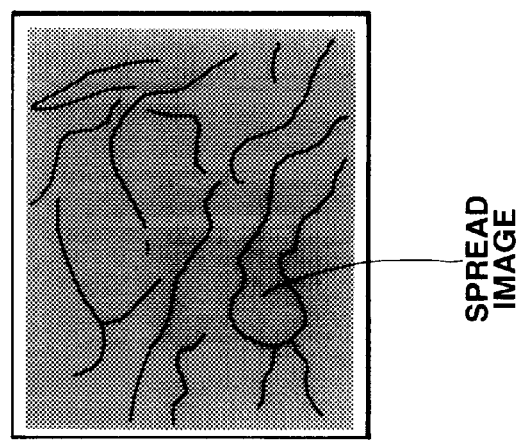
FIGS. 18A to 18C illustrate a calculation methods for a backward conversion formula and a forward conversion formula.
Figure 18B:
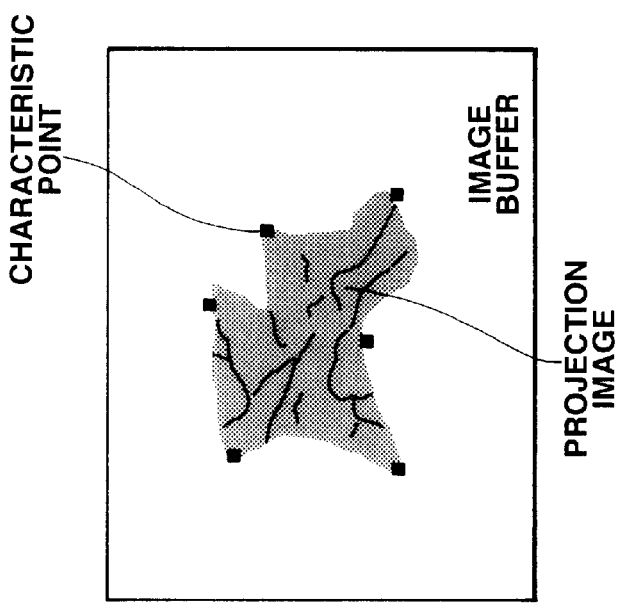
Figure 18A:
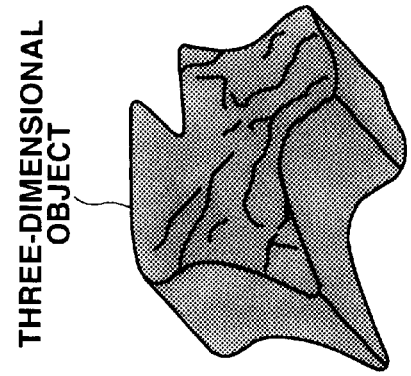

For example, in the case where a three-dimensional object in a three-dimensional space as shown in FIG. 18A is shot by the video camera 9 (FIG. 3), a two-dimensional image outputted by the video camera 9 is a projection image obtained by projecting the three-dimensional object to a screen as shown in FIG. 18B. Therefore, in the image buffer (except for the paste buffer), a two-dimensional image showing such a projection image is stored.

Meanwhile, in the paste buffer, a spread image obtained by spreading the surface of the three-dimensional object in the three-dimensional space (FIG. 18A) onto the two-dimensional plane is stored, as shown in FIG. 18C. Specifically, if the surface of the three-dimensional object is a plane, a two-dimensional image of the plane viewed from the front side is stored in the paste buffer. If the surface of the three-dimensional object is the lateral side of a column, a two-dimensional image obtained by spreading the lateral side onto the two-dimensional plane as a rectangular shape is stored in the paste buffer. If the surface of the three-dimensional object is a spherical surface, a two-dimensional image is stored which is obtained by spreading the spherical surface onto the two-dimensional plane by a cylindrical projection method used for preparation of a map or other methods. If, for example, the surface of the three-dimensional object is a cubic curved surface expressed by two auxiliary variables "S" and "t" such as a Bezier curved surface, a two-dimensional image obtained by spreading the curved surface onto the two-dimensional plane with the auxiliary variables "s" and "t" representing the horizontal and vertical axes, respectively, is stored in the paste buffer. Moreover, if the three-dimensional object is a rotating object, a two-dimensional image obtained by spreading the rotating object onto the two-dimensional plane with the circumferential direction and the direction of rotation axis representing the horizontal and vertical axes, respectively, is stored in the paste buffer.

In the copy processing, when several characteristic points (indicated by ■ in FIG. 18B) on the projection image of the three-dimensional object (surface) displayed as a two-dimensional image stored in the noted buffer and the shape information of the three-dimensional object (surface) are designated as shown in FIG. 18B, the backward conversion formula is calculated. In accordance with the backward conversion formula, a spread image as shown in FIG. 18C is generated from the projection image as shown in FIG. 18B and is then stored in the paste buffer. In the paste processing, when several characteristic points (indicated by ■ in FIG. 18B) in an area where the projection image of the three-dimensional object (surface) is to be pasted and the shape information of the three-dimensional object (surface) are designated in the noted buffer as shown in FIG. 18B, the forward conversion formula is calculated. In accordance with the forward conversion formula, a projection image as shown in FIG. 18B is generated from the image (spread image) as shown in FIG. 18C stored in the paste buffer and is then pasted to the image buffer.

Therefore, in calculation of the backward conversion formula and the forward conversion formula, the relation between the three-dimensional object in the three-dimensional space, the projection image thereof and the spread image thereof is important.

Figure 19:
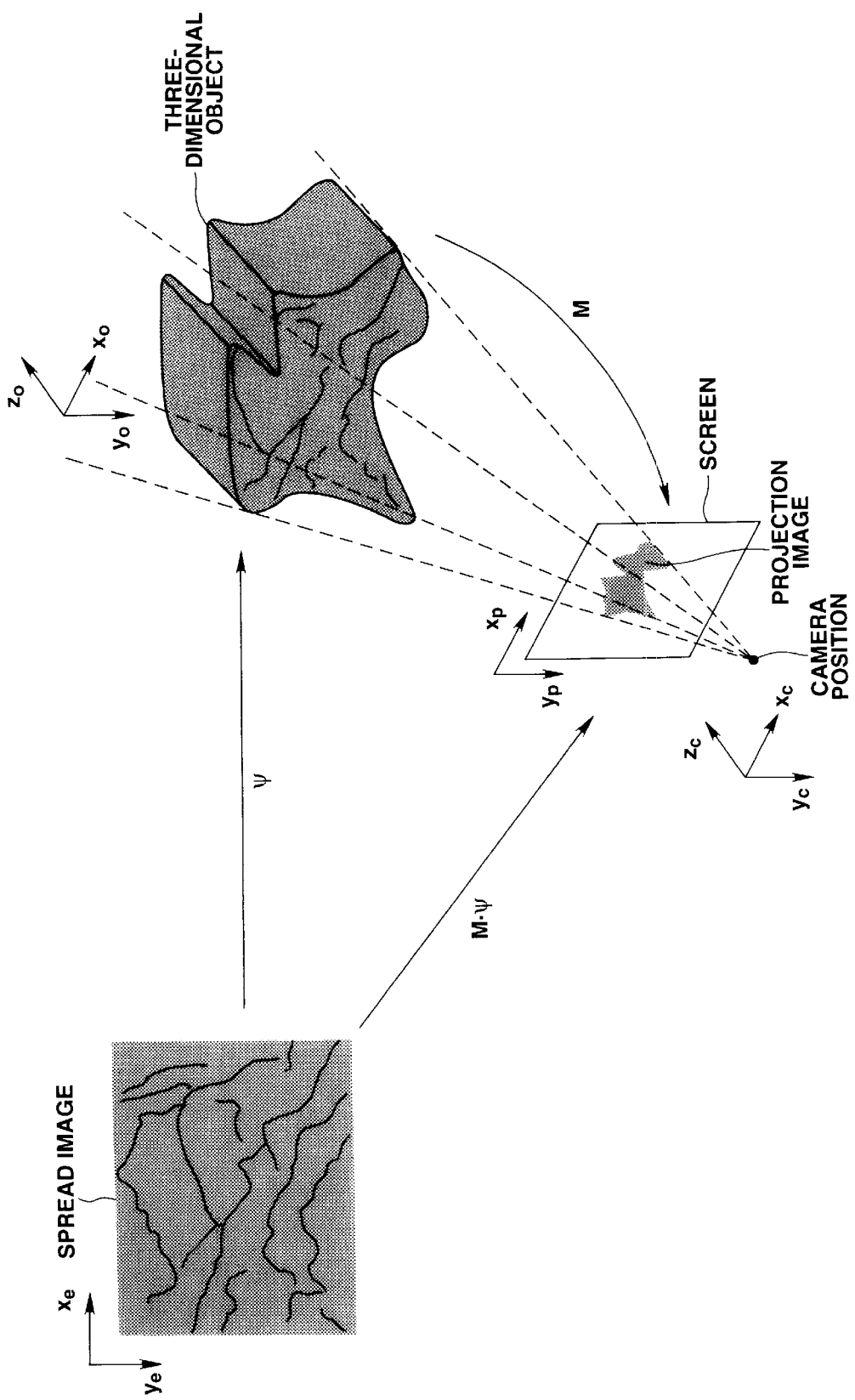
FIG. 19 shows the relation between a three-dimensional object, a spread image, and a projection image in a three-dimensional space.

Thus, as shown in FIG. 19, for example, the two-dimensional coordinate system for the spread image, the three-dimensional coordinate system for the three-dimensional object, and the two-dimensional coordinate system for the projection image are considered. The x- and y-coordinate in the two-dimensional coordinate system for the spread image is expressed as $x_e$ and $y_e$, the x-, y- and z-coordinate in the three-dimensional coordinate system for the three-dimensional object is expressed as $x_o$, $y_o$ and $z_o$, and the x- and y-coordinate in the two-dimensional coordinate system for the projection image is expressed as $x_p$ and $y_p$. The pixel value (stored value in the noted buffer) of the projection image at a point $(x_p, y_p)$ is expressed as $B(x_p, y_p)$, and the pixel value (stored value in the noted buffer) of the projection image at a point $(x_e, y_e)$ is expressed as $C(x_e, y_e)$. The mapping for pasting the spread image onto the surface of the three-dimensional object is expressed as $\psi$, and the mapping for converting the three-dimensional object to the projection image is expressed as M.

The two-dimensional coordinate system for the spread image, the three-dimensional coordinate system for the three-dimensional object, and the two-dimensional coordinate system for the projection image can be arbitrarily determined. For example, the three-dimensional coordinate system for the three-dimensional object can be determined in a form convenient for the expression of the three-dimensional object. Specifically, if the three-dimensional object is a column, the center of either one of the two circular bases is set as the origin (0, 0, 0), and the rotation axis (straight line connecting the centers of the two circular bottom sides) can be made coincident with the $y_o$-axis. If the three-dimensional object has a rectangular surface, a lower left apex of the four apexes of the rectangle is set as the origin (0, 0, 0), and the horizontal axis and the vertical axis of the rectangle can be made coincident with the $x_o$-axis and the $y_o$-axis, respectively.

A point $(x_o, y_o, z_o)$ on the three-dimensional object and a point $(x_e, y_e)$ on the spread image correspond to each other on the one-to-one basis, and the relation between them, that is, the mapping $\psi$ (or $\psi^{-1}$), can be found by geometrical calculation. Therefore, if the relation between a point $(x_o, y_o, z_o)$ on the three-dimensional object and a point $(x_p, y_p)$ on the projection image, that is, the mapping M (or $M^{-1}$), is known, the mapping $M\psi$ for converting a point $(x_e, y_e)$ on the spread image to a point $(x_p, y_p)$ on the projection image can be found.

However, in the case where only the three-dimensional object and the projection image are noted, the mapping M cannot be found if at which point $(x_p, y_p)$ the point $(x_o, y_o, z_o)$ on the three-dimensional object is projected is not known. To find at which point $(x_p, y_p)$ the point $(x_o, y_o, z_o)$ on the three-dimensional object is projected, from the projection image, it is basically necessary to prepare a plurality of two-dimensional images and use the principle of triangulation as described above. Moreover, to express a three-dimensional model of the three-dimensional object, a memory for temporarily holding three-dimensional data obtained by viewing the point $(x_o, y_o, z_o)$ on the three-dimensional object from the visual point (the origin of the camera coordinate, which will be later described) is necessary, and calculation for handling such three-dimensional data is also necessary.

Thus, in this example, the mapping $\psi$ is found on the basis of the shape information provided by the user, and the mapping M is found on the basis of the characteristic points provided by the user. Furthermore, the relation between the spread image and the projection image, that is, the mapping $M\psi$ for converting the spread image to the projection image is found. The mapping $M\psi$ represents the forward conversion formula and the mapping $(M\psi)^{-1}$ for carrying out backward conversion of the conversion equivalent to the mapping $M\psi$ represents the backward conversion formula. Therefore, the backward conversion formula can be found by calculating the reverse matrix of the mapping $M\psi$ using a Gaussian elimination method or the like.

Thus, since the backward conversion formula $(M\psi)^{-1}$ can be easily found by finding the forward conversion formula $M\psi$, the method for calculating the forward conversion formula $M\psi$ will be described here.

Since a point $(x_o, y_o, z_o)$ on the three-dimensional object and a point $(x_e, y_e)$ on the spread image correspond to each other on the one-to-one basis as described above, the point $(x_o, y_o, z_o)$ can be expressed as shown in an equation (7) using the mapping $\psi$ and the point $(x_e, y_e)$ $$\begin{aligned} x_0 &\quad \psi_1(x_e, y_e) \\ y_0 = \psi(x_e, y_e) &= \psi_2(x_e, y_e) \\ z_0 &\quad \psi_3(x_e, y_e) \end{aligned} \quad (7)$$

In the case where the three-dimensional object is shot by the video camera 9 in the three-dimensional space and the projection image thereof is obtained, the three-dimensional coordinate representing the position $(x_c, y_c, z_c)$ of the video camera 9 (hereinafter suitably referred to as camera coordinate) can be considered. The camera coordinate $(x_c, y_c, z_c)$ of the point $(x_o, y_o, z_o)$ can be expressed by the following equation, where $r_{11}, r_{12}, r_{13}, r_{21}, r_{22}, r_{23}, r_{31}, r_{32}, r_{33}$ represent nine elements expressing the rotational movement in the three-dimensional space and $t_1, t_2, t_3$ represent three elements expressing the parallel movement in the three-dimensional space.

$$\begin{aligned} x_c &\quad r_{11} \; r_{12} \; r_{13} \quad x_0 \quad t_1 \\ y_c &= r_{21} \; r_{22} \; r_{23} \quad y_0 + t_2 \\ z_c &\quad r_{31} \; r_{32} \; r_{33} \quad z_0 \quad t_3 \end{aligned} \quad (8)$$

The point $(x_p, y_p)$ on the projection image is obtained by projecting the point $(x_o, y_o, z_o)$ on the three-dimensional object at the camera coordinate onto the screen, and this conversion is perspective projection conversion (perspective transformation) as described in the above-mentioned document 1. Therefore, both the denominator and the numerator can be expressed by a rational equation which is a simple equation (a simple term of any one of x, y and z, and a constant term) of any one of the x-coordinate, y-coordinate and z-coordinate. That is, on the assumption that "w" is an arbitrary number expressing the homogeneous coordinate, the point $(x_p, y_p)$ of the projection image on the screen can be expressed as shown in an equation (9) by the homogeneous coordinate.

$$\begin{aligned} wx_p &\quad f_h \; 0 \; 0 \quad x_c \\ wy_p &= 0 \; f_v \; 0 \quad y_c \\ w &\quad 0 \; 0 \; 1 \quad z_c \end{aligned} \quad (9)$$

In the case where "f" represents the focal length of the video camera 9 and "h" and "v" represent the horizontal length and the vertical length, respectively, of one pixel on the screen at the camera coordinate, $f_h$ and $f_v$ in the equation (9) represent f×h and f×v, respectively.

As is clear from the equation (9), values obtained by dividing the x-coordinate $wx_p$ and the y-coordinate $wy_p$ of the homogeneous coordinate by the z-coordinate "w" is the x-coordinate $x_p$ and the y-coordinate $y_p$ of the projection image, respectively.

An equation (10) can derived from the equations (7) to (9).

$$\begin{aligned} wx_p &\quad \psi_1(x_e, y_e) \\ wy_p &= M \; \psi_2(x_e, y_e) = M\psi(x_e, y_e) \\ w &\quad \psi_3(x_e, y_e) \\ &\quad 1 \end{aligned} \quad (10)$$

In the equation (10), M is a matrix for converting $\psi(x_e, y_e)$, that is, $(x_o, y_o, z_o)$, to $(x_p, y_p)$ as is clear from FIG. 19, and is expressed as follows.

$$\begin{aligned} M &= \begin{array}{cccc} m_{11} & m_{12} & m_{13} & m_{14} \\ m_{21} & m_{22} & m_{23} & m_{24} \\ m_{31} & m_{32} & m_{33} & 1 \end{array} \\ &= \begin{array}{cccc} r_{11}f_h/t_3 & r_{12}f_h/t_3 & r_{13}f_h/t_3 & t_1 f_h/t_3 \\ r_{21}f_v/t_3 & r_{22}f_v/t_3 & r_{23}f_v/t_3 & t_2 f_v/t_3 \\ r_{31}/t_3 & r_{32}/t_3 & r_{33}/t_3 & 1 \end{array} \end{aligned} \quad (11)$$

$\psi(\psi_1, \psi_2, \psi_3)$ in the equation (10) can be found by geometrical calculation based on the shape information provided by the user. The matrix M in the equation (10) can be found on the basis of the characteristic points provided by the user. That is, since the matrix M generally has eleven elements $m_{11}, m_{12}, m_{13}, m_{14}, m_{21}, m_{22}, m_{23}, m_{24}, m_{31}, m_{32}, m_{33}$ as unknown numbers, if five points with a degree of freedom equal to 2 on the projection image and one point with a degree of freedom equal to 1, that is, six points in total, are designated as characteristic points, $m_{11}$ to $m_{14}$, $m_{21}$ to $m_{24}$, and $m_{31}$ to $m_{33}$ can be found. If more than the above-mentioned six points are designated on the projection image, the eleven elements $m_{11}$ to $m_{14}$, $m_{21}$ to $m_{24}$, and $m_{31}$ to $m_{33}$ are found by using the minimum square method or the like.

As described above, since the matrix M in this example is found on the basis of the characteristic points provided by the user, three-dimensional data of the three-dimensional object at the camera coordinate need not be handled and therefore calculation using the three-dimensional data need not be carried out. Moreover, a plurality of two-dimensional images obtained by shooting the same three-dimensional object from a plurality of positions need not be used. That is, the matrix M can be found from one two-dimensional image obtained by shooting the three-dimensional object from a certain position. As a result, the mapping $M\psi$ (and $(M\psi)^{-1}$) can be found without carrying out calculation using the three-dimensional data at the camera coordinate or without using a plurality of two-dimensional images.

The method for calculating $\psi$ and M in the case where several objects of primitive shapes are used as the three-dimensional object will now be described.

In the case where the three-dimensional object is a rectangular-parallelepiped, for example, the relation between $\psi$ of the equation (7), that is, the point $(x_o, y_o, z_o)$ in the three-dimensional space of a certain side (rectangle) of the rectangular-parallelepiped, and the point $(x_e, y_e)$ on the projection image can be expressed as follows.

$$\begin{aligned} x_0 &\quad \psi_1(x_e, y_e) \quad x_e \\ y_0 &= \psi_2(x_e, y_e) = y_e \\ z_0 &\quad \psi_3(x_e, y_e) \quad 0 \end{aligned} \quad (12)$$

In this specific example, as the two-dimensional coordinate for the projection image (hereinafter suitably referred to as screen coordinate), the coordinate on the plane of $z_o=0$ in the three-dimensional coordinate for the three-dimensional object (hereinafter simply referred to as three-dimensional coordinate) and having the equal x- and y-coordinate ($x_e=x_o$, $y_e=y_o$), that is, the xy-plane of the three-dimensional coordinate system for the three-dimensional object is used. As the three-dimensional coordinate system, there is used the coordinate such that one apex of a certain side of the rectangle-parallelepiped coincides with the origin and that the certain side is included in the xy-plane.

Since $z_o=0$ holds in the equation (12), the third column, $m_{13}$, $M_{23}$, $M_{33}$ of the matrix M in the equation (11) is not necessary. That is, in this case, the equation (10) can be expressed as follows.

$$\begin{pmatrix} wx_p \\ wy_p \\ w \end{pmatrix} = M \begin{pmatrix} x_e \\ y_e \\ 1 \end{pmatrix} = \begin{pmatrix} m_{11} & m_{12} & m_{14} \\ m_{21} & m_{22} & m_{24} \\ m_{31} & m_{32} & 1 \end{pmatrix} \begin{pmatrix} x_e \\ y_e \\ 1 \end{pmatrix} \quad (13)$$

Therefore, in this case, since eight elements of the matrix M, that is, $m_{11}$, $m_{12}$, $m_{14}$, $m_{21}$, $m_{22}$, $m_{24}$, $m_{31}$, $m_{32}$, are to be found, these eight elements $m_{11}$, $m_{12}$, $m_{14}$, $m_{21}$, $m_{22}$, $m_{24}$, $m_{31}$, $m_{32}$ can be found by designating four points corresponding to the four points on the spread image as characteristic points (i.e., by providing eight pieces of information in total, for the $t_p$- and $y_p$-coordinate of the four characteristic points).

Figure 20A:
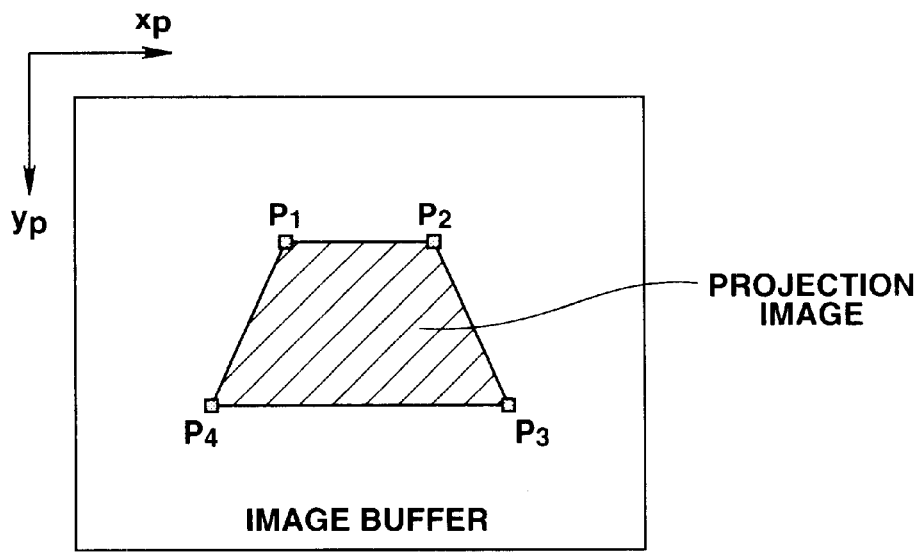
FIGS. 20A and 20B illustrate a calculation method for a backward conversion formula and a forward conversion formula in the case where the three-dimensional object is a rectangular-parallelepiped.
Figure 20B:
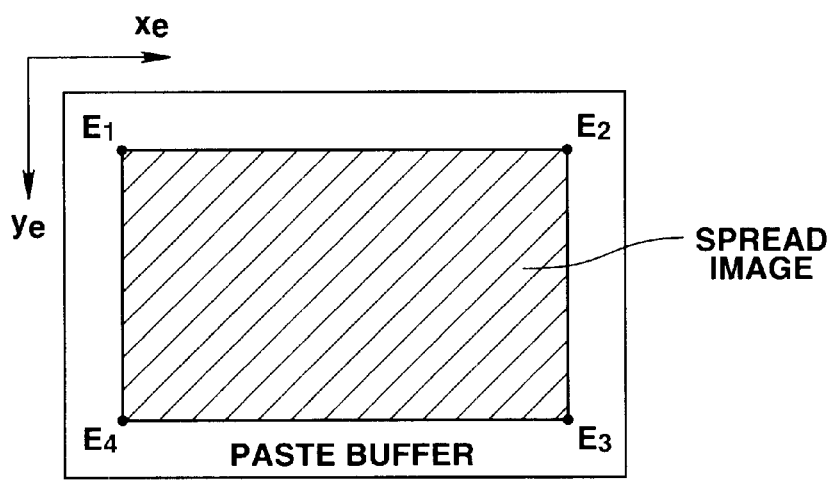

In the case where the three-dimensional object is a rectangle-parallelepiped, the projection image of the side (rectangle) is a rectangle as shown in FIG. 20A. Thus, the user is made to designate the four apexes of the rectangular projection image as characteristic points. In this case, the apexes of the rectangular projection image are set as points $P_1$, $P_2$, $P_3$, $P_4$ clockwise from the upper left apex, as shown in FIG. 20A, and the apexes of the rectangular spread image stored in the paste buffer are set as points $E_1$, $E_2$, $E_3$, $E_4$ clockwise from the upper left apex, as shown in FIG. 20B. The point $P_1$ and the point $E_1$ are caused to correspond to each other. The point $P_2$ and the point $E_2$ are caused to correspond to each other. The point $P_3$ and the point $E_3$ are caused to correspond to each other. The point $P_4$ and the point $E_4$ are caused to correspond to each other.

The coordinate of the points $E_1$, $E_2$, $E_3$, $E_4$ in the two-dimensional coordinate for the spread image (hereinafter suitably referred to as paste buffer coordinate) is set as $(0, 0)$, $(L_W, 0)$, $(L_W, L_H)$, $(0, L_H)$. $L_W$ and $L_H$ represent the horizontal and vertical lengths of the rectangular spread image, respectively, and can be arbitrarily set by the user within a range allowed by the capacity of the paste buffer. In addition to such setting by the user, $L_W$ and $L_H$ can also be set so that the spread image has a size (area) of a predetermined proportion, for example, 80%, of the paste buffer.

In this case, on the assumption that the screen coordinate of the points $P_1$, $P_2$, $P_3$, $P_4$ as the characteristic points designated by the user is $(x_{p1}, y_{p1})$, $(x_{p2}, y_{p2})$, $(x_{p3}, y_{p3})$, $(x_{p4}, y_{p4})$, the following equation holds from the equation (10).

$$\begin{pmatrix} w_1 x_{p1} & w_2 x_{p2} & w_3 x_{p3} & w_4 x_{p4} \\ w_1 y_{p1} & w_2 y_{p2} & w_3 y_{p3} & w_4 y_{p4} \\ w_1 & w_2 & w_3 & w_4 \end{pmatrix} = M \begin{pmatrix} 0 & L_W & L_W & 0 \\ 0 & 0 & L_H & L_H \\ 1 & 1 & 1 & 1 \end{pmatrix} \quad (14)$$

In the equation (14), $w_1$, $w_2$, $w_3$, $w_4$ are arbitrary numbers expressing the homogeneous coordinate.

In the matrix M in the equation (14), the eight elements $m_{11}$, $m_{12}$, $m_{14}$, $m_{21}$, $m_{22}$, $m_{24}$, $m_{31}$, $m_{32}$ in the equation (13) are unknown numbers. From the equation (14), eight equations can be established from the equation, and therefore, the eight unknown numbers $m_{11}$, $m_{12}$, $m_{14}$, $m_{21}$, $m_{22}$, $M_{24}$, $m_{31}$, $m_{32}$, that is, the matrix M, can be found. As the characteristic points for finding the matrix M, characteristic points obtained by correcting, by the above-described automatic correction processing, the characteristic points designated by the user, are basically used.

In the case where the three-dimensional object is a rectangular-parallelepiped, when the copy processing or the paste processing is carried out with respect to the side (rectangle) thereof, $\psi$ is found in accordance with the equation (12) and M is found from the equation (14). In the paste processing, the mapping $M\psi$ is directly used as the forward conversion formula. In the copy processing, the reverse matrix of the mapping $M\psi$ is found and used as the backward conversion formula. In this description, whether or not the three-dimensional object is a rectangular-parallelepiped, the conversion formula used in the paste processing is referred to as the forward conversion formula because the mapping $M\psi$ is used as it is, and the conversion formula used in the copy processing is referred to as the backward conversion formula because the reverse mapping of the mapping $M\psi$ is used.

In the case where the copy processing is carried out, in the image conversion processing section 20, each pixel in the rectangle $P_1 P_2 P_3 P_4$, which is the projection image shown in FIG. 20A, in the noted buffer, is written at the corresponding position in the rectangle $E_1 E_2 E_3 E_4$ shown in FIG. 20B in the paste buffer in accordance with the backward conversion formula $(M\psi)^{-1}$.

In the case where one pixel in the noted buffer corresponds to a plurality of pixels in the paste buffer, the pixel value of the one pixel in the noted buffer may be written with respect to all the plural pixels, or an interpolation value may be found by carrying out interpolation using a plurality of pixels in the noted buffer and written into the paste buffer. For example, in the case where a pixel A in the noted buffer corresponds to two adjacent pixels $a_1$, $a_2$ in the paste buffer, the pixel value of the pixel A can be written to the pixel $a_1$ and an average value of the pixel value of the pixel A and the pixel values of the pixels adjacent thereto in the noted buffer can be written to the pixel $a_2$.

On the other hand, in the case where a plurality of pixels in the noted buffer correspond to one pixel in the paste buffer, the pixel value of any one of the plurality of pixels may be written to the paste buffer, or a weighted addition value may be found by filtering the plurality of pixels and written to the paste buffer.

The writing of the pixel value to the paste buffer may be carried out by calculating the pixel of the spread image in the paste buffer to which each pixel of the projection image in the noted buffer is converted, as described above, or conversely by carrying out the pixel of the projection image to be converted to each pixel of the spread image, as long as it is in conformity to the backward conversion formula $(M\psi)^{-1}$.

In the case where the paste processing is carried out, in the image conversion processing section 20, each pixel in the rectangle $E_1 E_2 E_3 E_4$, which is the spread image shown in FIG. 20B, in the paste buffer, is written at the corresponding position in the rectangle $P_1 P_2 P_3 P_4$ shown in FIG. 20A in the paste buffer in accordance with the forward conversion formula $M\psi$. Thus, the projection image is pasted onto the two-dimensional image stored in the noted buffer.

In the case where one pixel in the paste buffer corresponds to a plurality of pixels in the noted buffer, the pixel value of the one pixel in the paste buffer may be written with respect to all the plural pixels, or an interpolation value may be found by carrying out interpolation using a plurality of pixels in the paste buffer and written to the noted buffer, similarly to the copy processing.

On the other hand, in the case where a plurality of pixels in the paste buffer correspond to one pixel in the noted buffer, the pixel value of any one of the plurality of pixels may be written to the noted buffer, or a weighted addition value may be found by filtering the plurality of pixels and written to the noted buffer.

The writing of the pixel value to the noted buffer, too, may be carried out by calculating the pixel of the projection image in the noted buffer to which each pixel of the spread image in the paste buffer is converted, as described above, or conversely by carrying out the pixel of the spread image to be converted to each pixel of the projection image, as long as it is in conformity to the forward conversion formula M$\psi$.

Next, in the case where the three-dimensional object is a column, in carrying out the copy processing for generating a spread image of the lateral side of the column and storing it in the paste buffer, or the paste processing for pasting the image stored in the paste buffer onto the lateral side of the column, the backward conversion formula or the forward conversion formula is calculated in the following manner.

Specifically, in this case, as the three-dimensional coordinate showing the position of the column in the three-dimensional space, the coordinate is considered in which the center of the upper base, for example, of the upper and lower bases (circles), is set as the origin (0, 0) and in which the $y_o$-axis is set in the direction from the upper base to the lower base while the $z_o$-axis is set in the direction from a point $O_5$, later described, to the center of the upper base. (The $x_o$-axis is set in the direction of proceeding of a right screw when it is turned in the direction from the $y_o$-axis to the $z_o$-axis.)

Figure 21A:
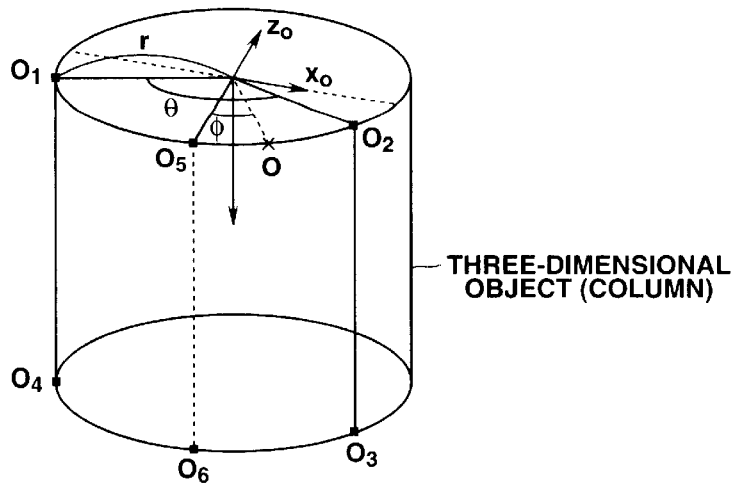
FIGS. 21A to 21C illustrate a calculation method for a backward conversion formula and a forward conversion formula in the case where the three-dimensional object is a column.

Then, it is assumed that a projection image obtained by shooting the column of FIG. 21A from the upper forward side of the point $O_5$ is stored as a two-dimensional image in the noted buffer. In this case, the projection image of the column appears as shown by a shaded portion in FIG. 21B.

Figure 21B:
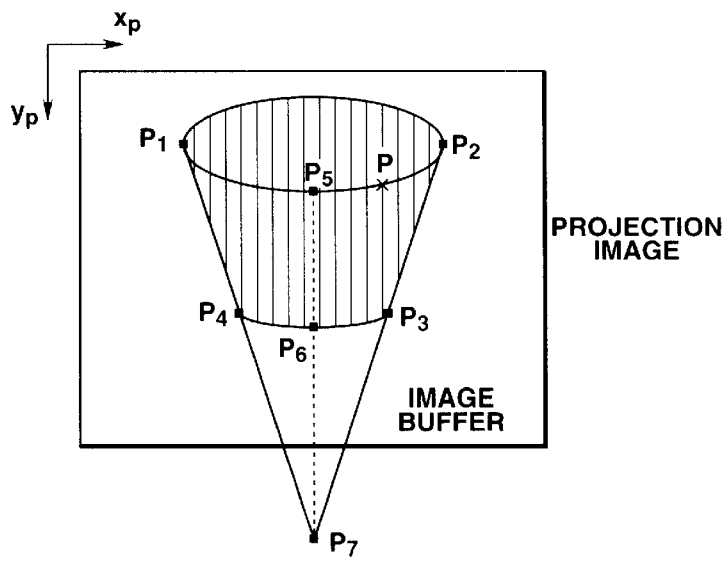

In FIG. 21B, points $P_1$ and $P_2$ and points $P_3$ and $P_4$ represent end points of cross lines (bold lines in FIG. 21B) between the lateral side of the column and the upper and lower bases, respectively, in the projection image. That is, the point $P_1$ represents the point of intersection between the left contour of the lateral side of the column and the upper base in the projection image. The point $P_2$ represents the point of intersection between the right contour of the lateral side of the column and the upper base in the projection image. The point $P_3$ represents the point of intersection between the right contour of the lateral side of the column and the lower base in the projection image. The point $P_4$ represents the point of intersection between the left contour of the lateral side of the column and the lower base in the projection image.

Points $O_1$, $O_2$, $O_3$, $O_4$ in FIG. 21A correspond to the points $P_1$, $P_2$, $P_3$, $P_4$ in FIG. 21B, respectively.

The point $O_5$ in FIG. 21A is a point bisecting an arc $O_1O_2$ (arc that can be seen as the projection image), and a point $P_5$ in FIG. 21B corresponds to this point $O_5$. Moreover, a point $O_6$ in FIG. 21A is a point bisecting an arc $O_3O_4$ (arc that can be seen as the projection image), and a point $P_6$ in FIG. 21B corresponds to this point $O_6$.

As described above, since the $z_o$-axis is directed toward the center of the upper base from the point $O_5$ and passes the center of the upper base, which is the origin, the point $O_5$ is in the $y_oz_o$-plane, that is, in the plane of $x_o=0$. Therefore, the point $O_6$ is also in the plane of $x_o=0$.

In FIG. 21B, a point $P_7$ represents the vanishing point of the column, that is, the point of intersection between the line $P_1P_4$ and the line $P_2P_3$. Therefore, the point $P_6$ is located on a line connecting the points $P_5$ and $P_7$. That is, the degree of freedom of the point $P_6$ is limited to the single direction of the line $P_5P_7$.

An angle $\theta$ (radian) in FIG. 21A is an angle formed by the point $O_1$, the center of the upper base (in this case, the origin of the three-dimensional coordinate and the point $O_2$ (and therefore it is also an angle formed by the point $O_3$, the center of the lower base and the point $O_4$.) On the assumption that the radius of the base of the column is expressed as "r", in the case where the spread image corresponding to the portion of the projection image of the lateral side of the column is to be stored in the paste buffer, the relation between the radius "r" and the angle $\theta$ can be expressed as follows. (In this example, for example, the circumferential direction of the base of the column is assumed to correspond to the lateral direction of the spread image.)

$$r = L_W/\theta \qquad (15)$$

In this equation, $L_W$ represents the lateral width (lateral length) of the spread image, as described above.

The angle $\phi$ is set as follows.

$$\phi = \theta(x_e - L_W/2)/L_W \qquad (16)$$

In this case, $x_e$ represents the x-coordinate (coordinate in the horizontal direction) of the paste buffer coordinate system. Hereinafter, in the paste buffer coordinate system, the upper left apex of the rectangular spread image is set as the origin. The $x_e$-axis is set in the direction from the left to the right, and the $y_e$-axis is set in the direction from the top to the bottom.

In the case where the angle $\theta$ is set as in the equation (16) with respect to the column, $\phi$ of the equation (7), that is, the relation between the point $(x_o, y_o, z_o)$ in the three-dimensional space of the lateral side of the column and the point $(x_e, y_e)$ on the spread image, can be expressed as follows by considering the spread view of the column of FIG. 21A.

$$
\begin{aligned}
x_o &\quad \psi_1(x_e, y_e) \quad r\sin\varphi \\
y_o &= \psi_2(x_e, y_e) = y_e \\
z_o &\quad \psi_3(x_e, y_e) \quad -r\cos\varphi
\end{aligned}
\qquad (17)
$$

In this case, which is different from the case described with reference to FIGS. 20A and 20B, there is no unnecessary element in the matrix M and therefore the eleven elements $m_{11}$ to $m_{14}$, $m_{21}$ to $m_{24}$, $m_{31}$ to $m_{33}$ described in the equation (11) must be found. The eleven elements $m_{11}$ to $m_{14}$, $m_{21}$ to $m_{24}$, $m_{31}$ to $m_{33}$ can be found by designating predetermined five points on the projection image and one point having degree of freedom equal to 1, that is, six points in total, as characteristic points as described above.

Figure 21C:
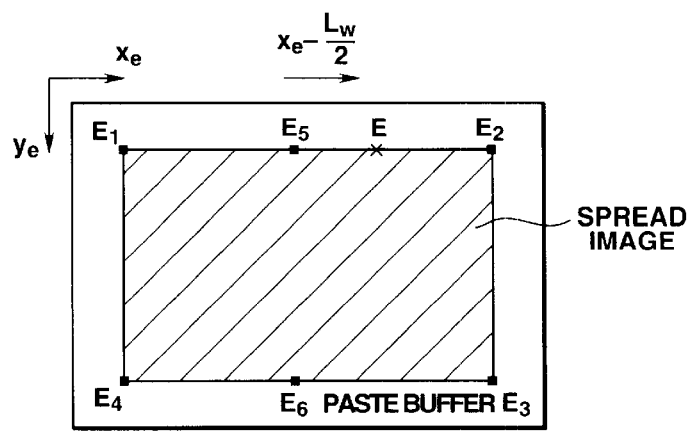

Thus, in this case, the user is made to designate the six points $P_1$ to $P_6$ shown in FIG. 21B as characteristic points. Also, as shown in FIG. 21C, the apexes of the rectangular spread image stored in the paste buffer are set at points $E_1$, $E_2$, $E_3$, $E_4$ clockwise from the upper left apex, and points $E_5$ and $E_6$ are set as points bisecting the segments $E_1E_2$ and $E_3E_4$, respectively. The point $P_2$ and the point $E_1$ are caused to correspond to each other. The point $P_2$ and the point $E_2$ are caused to correspond to each other. The point $P_3$ and the point $E_3$ are caused to correspond to each other. The point $P_4$ and the point $E_4$ are caused to correspond to each other. The point $P_5$ and the point $E_5$ are caused to correspond to each other. The point $P_6$ and the point $E_6$ are caused to correspond to each other.

Furthermore, the coordinate of the points $E_1$, $E_2$, $E_3$, $E_4$, $E_5$, $E_6$ is set as $(0, 0)$, $(L_W, 0)$, $(L_W, L_H)$, $(0, L_H)$, $(L_W/2, 0)$, $(L_W/2, L_H)$, respectively.

By establishing and solving equations in accordance with the equation (10) with respect to the eleven elements $m_{11}$, to $m_{14}$, $m_{21}$ to $m_{24}$, $m_{31}$ to $m_{33}$ using the above-described relations, these eleven elements $m_{11}$ to $m_{14}$, $m_{21}$ to $m_{24}$, $m_{31}$ to $m_{33}$, that is, the matrix M, can be found.

In this case, the characteristic points $P_1$ to $P_6$ used for finding the matrix M are corrected by the automatic correction processing, and either one of the characteristic points $P_5$ and $P_6$ is further corrected so as to be located on a straight line connecting the other point corrected by the automatic correction processing and the vanishing point $P_7$. Specifically, for example, the characteristic point $P_6$, which is one of the characteristic points $P_5$ and $P_6$, is further corrected so as to be located on the straight line connecting the other characteristic point $P_5$ corrected by the automatic correction processing and the vanishing point $P_7$. This is because the characteristic point $P_6$ is a point having a degree of freedom equal to 1, as described above.

On the assumption that the height of the column of FIG. 21A is equal to the vertical length $L_H$ of the spread image of FIG. 21C, the coordinate of the points $O_1$, $O_2$, $O_3$, $O_4$, $O_5$, $O_6$ is $(-r\sin(\theta/2), 0, -r\cos(\theta/2))$, $(r\sin(\theta/2), 0, -r\cos(\theta/2))$, $(r\sin(\theta/2), L_H, -r\cos(\theta/2))$, $(-r\sin(\theta/2), L_H, -r\cos(\theta/2))$, $(0, 0, -r)$, $(0, L_H, -r)$, respectively.

Figure 22:
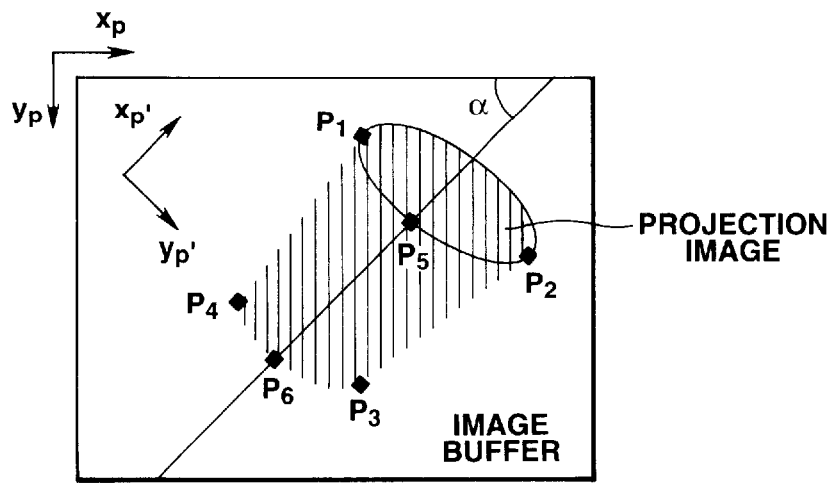
FIG. 22 illustrates a calculation method for a backward conversion formula and a forward conversion formula in the case where the three-dimensional object is a column.

The matrix M found as described above with respect to the column is a function of the angle $\theta$ in FIG. 21A and therefore this angle $\theta$ must be found. Moreover, in FIG. 21B, the projection image of the column is displayed as a two-dimensional image so that the straight line connecting the characteristic point $P_5$ and the vanishing point $P_7$ becomes parallel to the $y_p$-axis. Generally, however, in the projection image of the column, the straight line connecting the characteristic point $P_5$ and the vanishing point $P_7$ is often inclined with respect to the $y_p$-axis, as shown in FIG. 22.

Thus, the method for finding $\theta$ will now be described, in which the angle formed by the $x_p$-axis and the straight line connecting the characteristic point $P_5$ and the vanishing point $P_7$ is set as $\alpha$.

In this case, if an $x_p'$-axis and a $y_p'$-axis are considered, which are coordinate axes obtained by rotating the $x_p$-axis and the $y_p$-axis as the coordinate axes of the screen coordinate system by a counterclockwise, the relation between the coordinate axes and the projection image of the column coincides with that of the case shown in FIG. 21B. Thus, $\theta$ is found on the basis of the coordinate system prescribed by the $x_p'$-axis and the $y_p'$-axis obtained by rotating the $x_p$-axis and the $y_p$-axis by $\alpha$ counterclockwise.

In this case, the relation between the point $(x_p, y_p)$ and the point $(x_p', y_p')$ can be expressed by the following equation using the homogeneous coordinate.

$$\begin{pmatrix} wx_p' \\ wy_p' \\ w \end{pmatrix} = \begin{pmatrix} \cos\alpha & -\sin\alpha & 0 \\ \sin\alpha & \cos\alpha & 0 \\ 0 & 0 & 1 \end{pmatrix} \begin{pmatrix} wx_p \\ wy_p \\ w \end{pmatrix} \quad (18)$$

Then, the matrix M' is defined as follows, for example.

$$M' = \begin{pmatrix} \cos\alpha & -\sin\alpha & 0 \\ \sin\alpha & \cos\alpha & 0 \\ 0 & 0 & 1 \end{pmatrix} \quad M = \begin{pmatrix} m_{11}' & m_{12}' & m_{13}' & m_{14}' \\ m_{21}' & m_{22}' & m_{23}' & m_{24}' \\ m_{31}' & m_{32}' & m_{33}' & 1 \end{pmatrix} \quad (19)$$

M in the equation (19) is expressed by the equation (11). In this case, the following equations are derived from the equation (10) and the equations (15) to (19).

$$x_p' = (m_{11}'r\sin\phi + m_{12}'y_e - m_{13}'r\cos\phi + m_{14}')/(m_{31}'r\sin\phi + m_{32}'y_e - m_{33}'r\cos\phi + 1)$$

$$y_p' = (m_{21}'r\sin\phi + m_{22}'y_e - m_{23}'r\cos\phi + m_{24}')/(m_{31}'r\sin\phi + m_{32}'y_e - m_{33}'r\cos\phi + 1) \quad (20)$$

That is, in the column as the three-dimensional object shown in FIG. 21A, if the point O is set on the arc $O_1O_5O_2$ to be displayed as the projection image, the point O is projected as the point P on the arc $P_1P_5P_2$ on the projection image of FIG. 21B. If this point P corresponds to the point E in the paste buffer coordinate system as shown in FIG. 21C, the $x_e$-coordinate of the point E based on the point $E_5$ can be expressed by $x_e$-$L_W/2$.

In the paste buffer coordinate system of FIG. 21C, since the point $E_5$ and the point E correspond to the point $O_5$ or the point O, respectively, on the column in the three-dimensional space of FIG. 21A, the $x_e$-coordinate of the point E based on the point $E_5$, that is, $x_e$-$L_W/2$ corresponds to the position of the point O along the circumference of the upper side (upper base) of the column of FIG. 21A based on the point $O_5$.

That is, the angle $\phi$ defined by the equation (16) represents the angle formed by the point $O_5$, the origin and the point O, and $x_p'$ and $y_p'$ expressed by the equation (20) represents the coordinate of the point P on the projection image corresponding to the point O.

Figure 23:
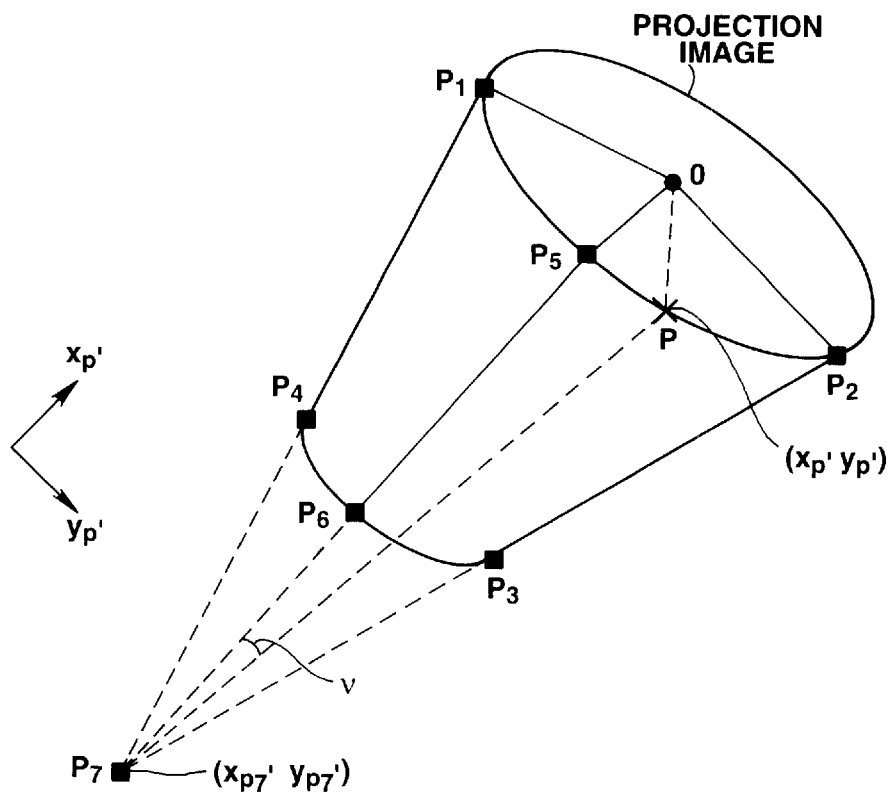
FIG. 23 illustrates an angle v.

In the case where the point O is shifted along the circumference on the upper side of the column based on the point $O_5$, that is, in the case where the angle $\phi$ is varied from 0 radian, the point P on the projection image corresponding to point O is also shifted on the arc $P_5P_2$ or the arc $P_5P_1$ based on the point $P_5$. The angle formed by the point P, the vanishing point $P_7$ and the point $P_5$ is expressed as $\nu$, as shown in FIG. 23.

The coordinate of the point P is expressed by $(x_p', y_p')$, which is found in accordance with the equation (20). Therefore, on the assumption that the coordinate of the point $P_7$ is expressed as $(x_{p7}', y_{p7}')$, the angle $\nu$ can be found in accordance with the following equation. (See FIG. 23.)

$$\nu = \tan^{-1}(|y_p' - y_{p7}'|/|x_p' - x_{p7}'|) \quad (21)$$

Since the angle $\nu$ is varied by the shift of the point P, that is, by the change of the angle $\phi$, the angle $\nu$ is a function of the angle $\phi$.

In FIG. 23, if the clockwise direction is set as the positive direction of the angle $\nu$ based on the segment $P_5P_7$, the angle $\nu$ reaches the maximum value when the point P coincides with the point $P_2$, and the angle $\nu$ reaches the minimum value when the point P coincides with the point $P_1$.

The point P coincides with the point $P_1$ or $P_2$ in the case where the equation $|\phi|=\theta/2$ holds. (The point P coincides with the point $P_1$ in the case where the equation $\phi=-\theta/2$ holds. The point P coincides with the point $P_2$ in the case where the equation $\phi=\theta/2$ holds.) Therefore, the angle $\nu$ has the extremum in the case where the equation $|\phi|=\theta/2$ holds.

Thus, the partial differential of the angle $\nu$ of the equation (21) by $\phi$ is set to be 0 as follows.

$$\frac{\partial v}{\partial \varphi} = 0 \tag{22}$$

As described above, the equation (22) holds when $|\phi|$ is equal to $\theta/2$, and $\theta$ ($=2\phi$) at this point is $\theta$ to be found (i.e., the angle formed by the point $O_1$, the center of the upper base of the column and the point $O_2$ when the points $P_1$ and $P_2$ correspond to the points $O_1$ and $O_2$, respectively, in FIGS. 21A to 21C.)

Meanwhile, the partial differential of $v$ by $\phi$ in the equation (22) (i.e., the left member of the equation (22)) is a function having two variables, $\theta$ and $\phi$, and therefore calculation for finding $\theta$ and $\phi$ that satisfy the equation (22) is complicated. Thus, in this case, $\theta$ that satisfies the equation (22) is found by an approximate formula.

Figure 24:
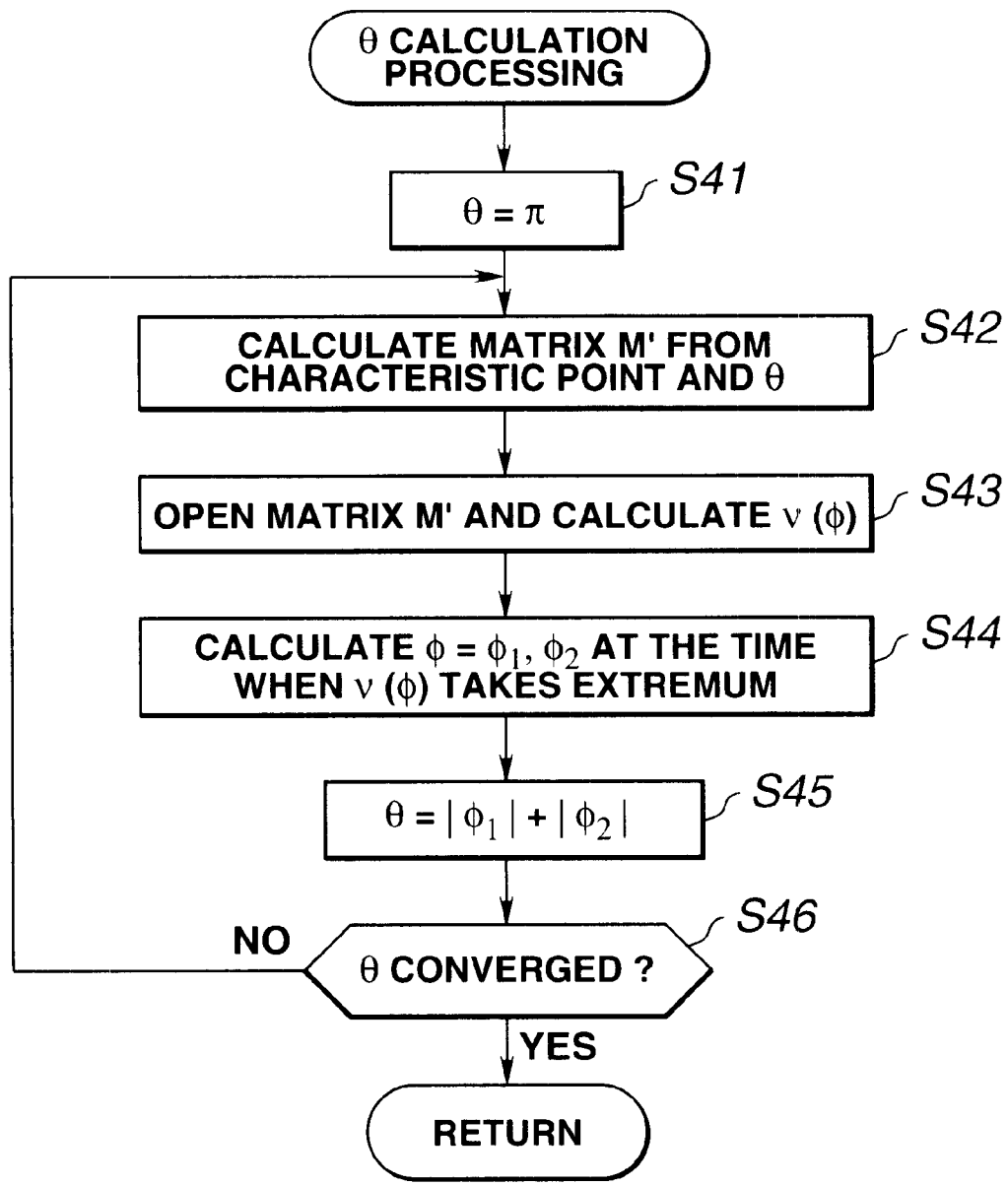
FIG. 24 is a flowchart for explaining a calculation method for θ in FIGS. 21A to 21C.

Specifically, FIG. 24 shows the flowchart for explaining the processing for finding $\theta$ that satisfies the equation (22) by an approximate formula (hereinafter suitably referred to as $\theta$ calculation processing). This $\theta$ calculation processing is carried out by the copy operation processing section 12 in the case where the copy processing is carried out, and the $\theta$ calculation processing is carried out by the paste operation processing section 13 in the case where the paste processing is carried out.

In the $\theta$ calculation processing, first, at step S41, $\pi$ (radian) as an initial value is set for $\theta$. At step S42, the matrix M' that satisfies the equation (22) is found by using $\theta$ and characteristic points. At step S43, $v$ expressed by the equation (21) is found by using the matrix M' found at step S42. At step S44, $\phi$ at the time when $v$ has the extremum, that is, $\phi$ that satisfies the equation (22), is found. Then, the $\theta$ calculation processing goes to step S45.

Two "$\phi$"s that satisfy the equation (22) are found and they are referred to as $\phi_1$ and $\phi_2$. At step S45, $|\phi_1|+|\phi_2|$ is newly set for $\theta$. At step S46, it is determined whether $\theta$ has been converged or not, that is, whether the absolute value of the difference between the new $\theta$ and the previous $\theta$ is equal to or less than a predetermined threshold value. If it is determined at step S46 that $\theta$ has not been converged, that is, if the absolute value of the difference between the new $\theta$ and the previous $\theta$ is not equal to or lower than the predetermined threshold value, the $\theta$ calculation processing returns to step S42 and the processing of step S42 and the subsequent steps is repeated using new $\theta$.

If it is determined at step S46 that $\theta$ has been converged, that is, if the absolute value of the difference between the new $\theta$ and the previous $\theta$ is equal to or lower than the predetermined threshold value, the new $\theta$ is determined as $\theta$ to be found. Then, the $\theta$ calculation processing ends.

In the above-described case, the vanishing point $P_7$ exists in the projection image of the column (FIG. 21B and FIG. 23). However, in the case where there is not vanishing point (i.e., in the case where the segment $P_1P_4$ and the segment $P_2P_3$ are parallel to each other in the projection image), $y_p{}'$ of the equation (20) has the extremum when the equation $|\phi|=\theta/2$ holds. Therefore, the partial differential of $y_p{}'$ of the equation (20) by $\phi$ is set to be $\theta$ as in the equation (23), and the equations (20) and (23) are used in place of the equations (21) and (22), respectively, to carry out the $\theta$ calculation processing of FIG. 24. Thus, at the time when $y_p{}'$ has the extremum.

$$\frac{\partial y_p'}{\partial \varphi} = 0 \tag{23}$$

Next, in the case where the three-dimensional object is a sphere, in carrying out the copy processing for generating a spread image of the spherical surface and storing it in the paste buffer, or the paste processing for pasting the image stored in the paste buffer onto the spherical surface, the backward conversion formula or the forward conversion formula is calculated in the following manner. It is assumed that the spread image of the spherical surface is generated by, for example, a cylindrical projection method.

Figure 25A:
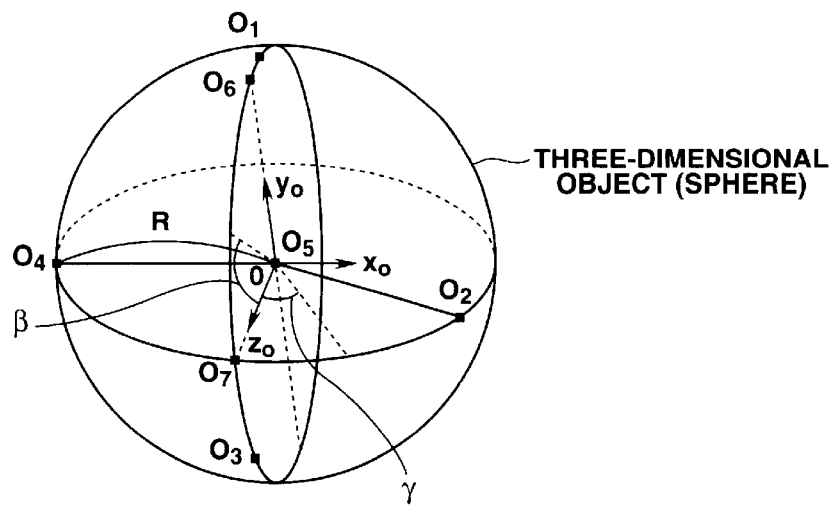
FIGS. 25A to 25C illustrate a calculation method for a backward conversion formula and a forward conversion formula in the case where the three-dimensional object is a sphere.

In this case, as the three-dimensional coordinate representing the position of the sphere in the three-dimensional space, the center of the sphere is set as the origin (0, 0, 0) and the $x_o$-, $y_o$- and $z_o$-axes are provided to be orthogonal to one another, as shown in FIG. 25A. (The $x_o$-axis is in the direction of proceeding of a right screw where the right screw is turned in the direction from the $y_o$-axis to the $z_o$-axis.)

Hereinafter, as a matter of convenience, a point of intersection between the sphere and the $y_o$-axis where the $y_o$-coordinate is positive is referred to as the north pole, and a cross line (circle) between the sphere and the $x_oy_o$-plane (plane of $y_o=0$) is referred to as the equator.

Figure 25B:
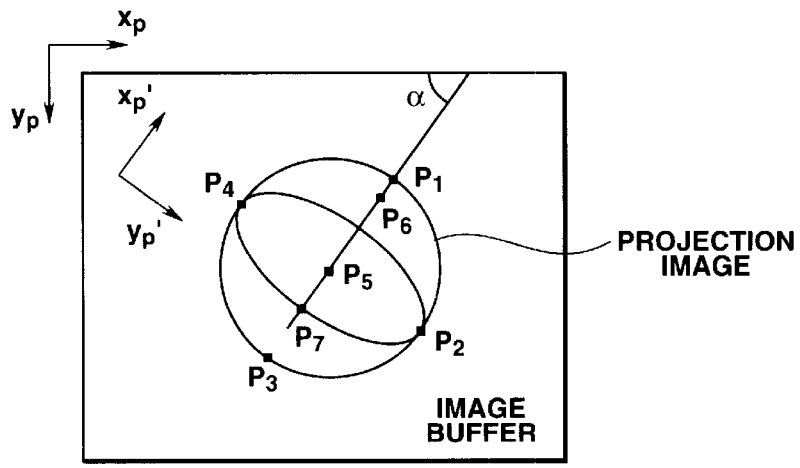

Then, it is assumed that a projection image obtained by shooting the sphere of FIG. 25A from a predetermined position is stored, as shown in FIG. 25B, as a two-dimensional image in the noted buffer. In FIG. 25B, a straight line $P_5P_6$ connecting points $P_5$ and $P_6$, later described, is inclined by an angle $\alpha$ with respect to the $x_p$-axis.

In FIG. 25B, points $P_1$ and $P_3$ are two end points of the portion displayed in the projection image, of the cross line (circle) between the sphere and the $y_ox_o$-plane (plane of $x_o=0$). The point $P_1$ is the end point on the north pole side, and the point $P_3$ is the end point on the side opposite to the north pole on the basis of the $x_oz_o$-plane as the reference plane. Points $P_2$ and $P_4$ are two end points of the portion displayed in the projection image, of the equator, which is the cross line between the sphere and the $x_oz_o$-plane. The point $P_2$ is the end point on the side where the $x_o$-coordinate is positive, and the point $P_4$ is the end point on the side where the $x_o$-coordinate is negative. Points $O_1$, $O_2$, $O_3$, $O_4$ in FIG. 25A correspond to the points $P_1$, $P_2$, $P_3$, $P_4$ in FIG. 25B, respectively.

A point $O_5$ in FIG. 25A represents the center of the sphere. A point $O_6$ represents the north pole. A point $O_7$ represents a point bisecting an arc $O_2O_4$ along the equator (i.e., an arc that can be seen as the projection image). Points $P_5$, $P_6$, $P_7$ in FIG. 25B correspond to the points $O_5$, $O_6$, $O_7$, respectively.

On the assumption that a spread image of the entire spherical surface of FIG. 25A obtained by the cylindrical projection method is stored in the paste buffer, the radius R of the sphere can be expressed as follows. (In this example, the equator is assumed to correspond to the lateral direction of the spread image.)

$$R=L_W/(2\pi) \tag{24}$$

With respect to the spherical surface, $\psi$ of the equation (7), that is, the relation between a point $(x_o, y_o, z_o)$ in the three-dimensional space of the spherical surface and a point $(x_e, y_e)$ on the spread image obtained by the cylindrical projection method, can be expressed as follows in consideration of the spread view of the spherical surface of FIG. 25A by the cylindrical projection method.

$$\begin{aligned} x_o &\quad \psi_1(x_e, y_e) &\quad R\sin(\pi y_e/L_H)\cos(2\pi x_e/L_W) \\ y_o &= \psi_2(x_e, y_e) = R\cos(\pi y_e/L_H) \\ z_o &\quad \psi_3(x_e, y_e) &\quad R\sin(\pi y_e/L_H)\sin(2\pi x_e/L_W) \end{aligned} \quad (25)$$

In this case, too, there is no unnecessary element in the matrix M and therefore the eleven elements $m_{11}$ to $m_{14}$, $m_{21}$ to $m_{24}$, $m_{31}$ to $m_{33}$ described in the equation (11) must be found.

Thus, in this example, the user is made to designate the seven points $P_1$ to $P_7$ shown in FIG. 25B as characteristic points. First, the user is made to designate the points $P_2$, $P_4$, $P_5$, $P_6$ as characteristic points. All of the points $P_2$, $P_4$, $P_5$, $P_6$ have a degree of freedom equal to 2. After that, the user is made to designate the points $P_1$, $P_3$, $P_7$ as characteristic points so as to be located on the straight line $P_5P_6$ connecting the points $P_5$ and $P_6$. Since the points $P_1$, $P_3$, $P_7$ are located on the straight line $P_5P_6$, these points have a degree of freedom equal to 1.

As described above, the points $P_2$, $P_4$, $P_5$, $P_6$ have a degree of freedom equal to 2 and the points $P_1$, $P_3$, $P_7$ have a degree of freedom equal to 1. Therefore, as these seven points $P_1$ to $P_7$ are known, the eleven elements $m_{11}$ to $m_{14}$, $m_{21}$ to $m_{24}$, $m_{31}$ to $m_{33}$ can be found.

In this example, a spread image obtained by spreading the entire spherical surface of FIG. 25A by the cylindrical projection method is stored in the paste buffer. The spread image appears as shown in FIG. 25C.

Figure 25C:
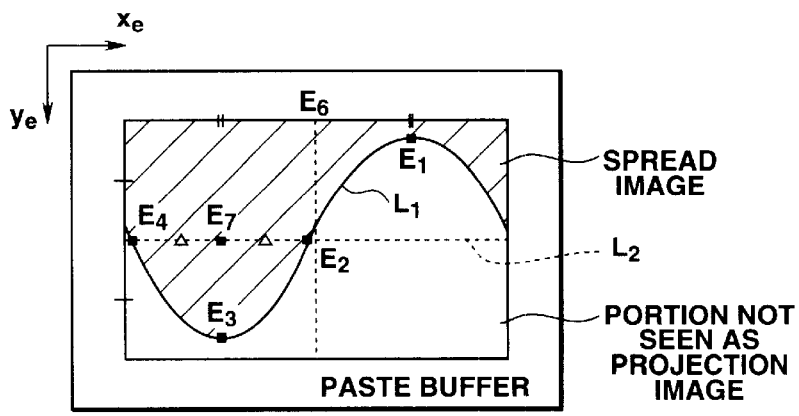

In FIG. 25C, the shaded portion indicates the spread image of the portion of the projection image shown in FIG. 25B, and the unshaded portion indicates the spread image of the portion of the spherical surface which is not displayed in the projection image shown in FIG. 25B. Therefore, a curve $L_1$ corresponds to the boundary between the spherical surface which is seen as the projection image shown in FIG. 25B and the spherical surface which is not seen as the projection image, of the sphere shown in FIG. 25A.

Points $E_1$, $E_2$, $E_3$, $E_4$ on the curve $L_1$ correspond to the characteristic points $P_1$, $P_2$, $P_3$, $P_4$ on the projection image of FIG. 25B, respectively. The points $E_1$ and $E_3$ are points on the curve $L_1$ where the $y_e$-coordinate is the minimum and the maximum, respectively. The points $E_2$ and $E_4$ are two points of intersection between the curve $L_1$ and a segment $L_2$ corresponding to the equator, where $E_2$ has the greater $x_e$-coordinate and $E_4$ has the smaller $x_e$-coordinate.

In FIG. 25C, a segment $E_6$ is a line connecting the origin (0, 0) and a point $(L_W, 0)$ in the paste buffer coordinate system and corresponds to the point $P_6$ of FIG. 25B. Also, in FIG. 25C, a point $E_7$ is a point bisecting a segment $E_2E_4$ and corresponds to the point $P_7$ of FIG. 25B.

Figure 26A:
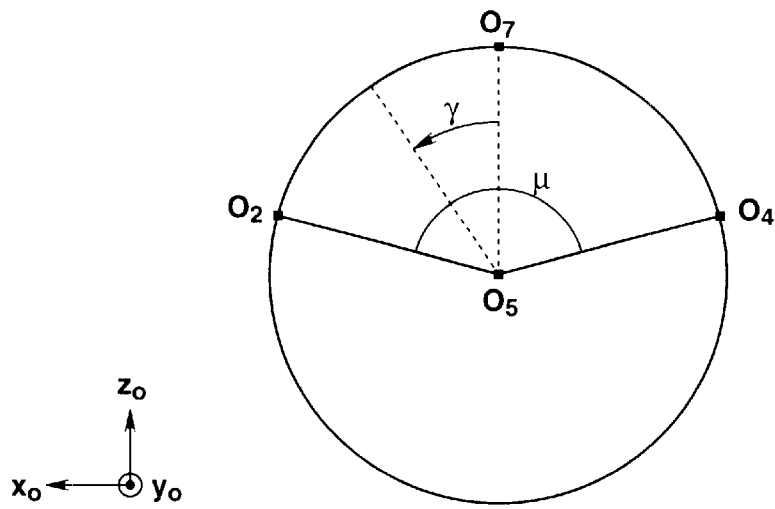
FIGS. 26A and 26B illustrate a calculation method for a backward conversion formula and a forward conversion formula in the case where the three-dimensional object is a sphere.
Figure 26B:
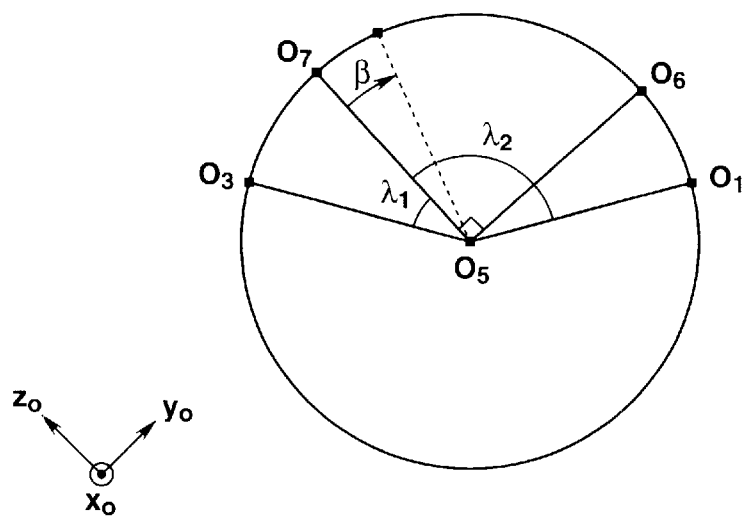

The angles of predetermined parts of the sphere of FIG. 25A are expressed as $\mu$, $\lambda_1$, and $\lambda_2$ as shown in FIGS. 26A and 26B. Specifically, an angle $\angle O_2O_5O_4$ formed by the two points $P_1$ and $P_3$ of the portion displayed in the projection image, of the circumference (equator) of the circle, which is the cross line between the sphere and the $x_oz_o$-plane, and the center $O_5$ of the sphere, is expressed as $\mu$ as shown in FIG. 26A. An angle $\angle O_3O_5O_7$ formed by the end point $O_3$ on the side opposite to the north pole of the portion displayed in the projection image, of the circumference of the circle, which is the cross line between the sphere and the $y_oz_o$-plane, and the points $O_7$ and $O_5$, is expressed as $\lambda_1$, and an angle $\angle O_1O_5O_7$ formed by the end point $O_1$ on the north pole side and the points $O_7$ and $O_5$ is expressed as $\lambda_2$, as shown in FIG. 26B. $\lambda_1 + \lambda_2$ represents an angle $\angle O_1O_5O_3$ formed by the two points $O_1$ and $O_3$ of the portion displayed in the projection image, of the circumference of the cross line (circle) between the sphere and the $y_oz_o$-plane, and the center $O_5$ of the sphere.

In this case, the coordinate of the points $O_1$, $O_2$, $O_3$, $O_4$, $O_5$, $O_6$, $O_7$ is (0, $R\sin\lambda_2$, $R\cos\lambda_2$), ($R\sin(\mu/2)$, 0, $R\cos(\mu/2)$), (0, $-R\sin\lambda_1$, $R\cos\lambda_1$), ($-R\sin(\mu/2)$, 0, $R\cos(\mu/2)$), (0, 0, 0), (0, R, 0), (0, 0, R), respectively.

The matrix M found with respect to the spherical surface is a function of the angles $\mu$, $\lambda_1$ and $\lambda_2$ of FIGS. 26A and 26B and therefore these angles $\mu$, $\lambda_1$ and $\lambda_2$ must be found. Moreover, since the straight line $P_5P_6$ connecting the point $P_5$ corresponding to the center of the sphere and the point $P_6$ corresponding to the north pole and the $x_p$-axis form the angle $\alpha$ in FIG. 25B, the angles $\mu$, $\lambda_1$ and $\lambda_2$ must be found in consideration of this.

In this example, too, he angles $\mu$, $\lambda_1$ and $\lambda_2$ are found in consideration of an $x_p'$-axis and a $y_p'$-axis, which are coordinate axes obtained by rotating the $x_p$-axis and the $y_p$-axis by $\alpha$ counterclockwise.

In this case, too, the relation between the point $(x_p, y_p)$ and the point $(x_p', y_p')$ can be expressed by the equation (18) using the homogeneous coordinate.

In FIG. 25A, the point of intersection between the spherical surface and the plane of $x_o=0$ ($y_oz_o$-plane) is expressed as (0, $R\sin\beta$, $R\cos\beta$), and the point of intersection (point on the equator) between the spherical surface and the plane of $y_o=0$ ($x_oz_o$-plane) is expressed as ($R\sin\gamma$, 0, $R\cos\gamma$). The $x_p'$-coordinate and the $y_p'$-coordinate at the time when the point (0, $R\sin\beta$, $R\cos\beta$) is projected onto the screen are set as $x_{p1}$ and $y_{p1}$, respectively. The $x_p'$-coordinate and the $y_p'$-coordinate at the time when the point ($R\sin\gamma$, 0, $R\cos\gamma$) is projected onto the screen are set as $x_{p2}$ and $y_{p2}$, respectively. In this case, $x_{p1}$ and $y_{p2}$ can be expressed by equations (26) and (27), respectively, using the elements of the matrix M' defined by the equation (19).

$$x_{p1} = (m_{12}'R\sin\beta + m_{13}'R\cos\beta + m_{14}')/(m_{32}'R\sin\beta + m_{33}'R\cos\beta + 1) \quad (26)$$

$$y_{p2} = (m_{21}'R\sin\gamma + m_{22}'R\cos\gamma + m_{24}')/(m_{31}'R\sin\gamma + m_{33}'R\cos\gamma + 1) \quad (27)$$

With respect to the sphere of FIG. 25A, $x_{p1}$ of the equation (26) has the extremum when an equation $\beta = -\lambda_1$ or an equation $\beta = -\lambda_2$ holds, and $y_{p2}$ of the equation (27) has the extremum when an equation $\gamma = \mu/2$ or an equation $\gamma = -\mu/2$ holds. Thus, the partial differential of $x_{p1}$ of the equation (26) by $\beta$ and the partial differential of $y_{p2}$ of the equation (27) by $\gamma$ are set to be 0 as follows.

$$\frac{\partial x_{p1}}{\partial \beta} = 0 \quad (28)$$

$$\frac{\partial y_{p2}}{\partial \gamma} = 0 \quad (29)$$

The equation (28) holds when $\beta$ is equal to $-\lambda_1$ or $\lambda_2$, and $\lambda_1$ and $\lambda_2$ at this point are $\lambda_1$ and $\lambda_2$ to be found. The equation (29) holds when $\gamma$ is equal to $\mu/2$ or $-\mu/2$, and $\mu$ at this point is $\mu$ to be found.

Meanwhile, since the elements of the matrix M' are functions of $\mu$, $\lambda_1$, $\lambda_2$, the partial differential of $x_{p1}$ by $\beta$ of the equation (28) is a function of the four variables $\mu$, $\lambda_1$, $\lambda_2$, $\beta$, and the partial differential of $y_{p2}$ by $\gamma$ of the equation (29) is a function of the four variables $\mu$, $\lambda_1$, $\lambda_2$, $\gamma$. Therefore, the calculation for finding $\mu$, $\lambda_1$, $\lambda_2$ that satisfy the equations (28) and (29) is complicated. However, in accordance with the approximate formula for setting predetermined initial values for $\mu$, $\lambda_1$, $\lambda_2$ to find the elements of the matrix M', then finding $\beta$ and $\gamma$ using the elements, and updating $\mu$, $\lambda_1$, $\lambda_2$, similarly to the above-described $\theta$ calculation processing, $\mu$, $\lambda_1$, $\lambda_2$ can be found relatively easily.

In this example, the spherical surface is spread by the cylindrical projection method to generate the spread image. However, the technique used for generating a spread image of the spherical surface is not limited to this. Specifically, the spherical surface can also be spread to a spread image by using the Mercator projection method or the Lambert conformal conic projection method.

While the spread image of the entire spherical surface is stored in the paste buffer as shown in FIG. 25C, only the shaded portion in FIG. 25C corresponds to the projection image. Therefore, when the spread image is converted to the projection image and the projection image is pasted to the two-dimensional image stored in the noted buffer, only the shaded portion in FIG. 25C is displayed in the two-dimensional image. That is, since the entire image stored in the paste buffer is not fully displayed as the projection image on the two-dimensional image, this must be considered in drawing characters or the like in 2D paint. Specifically, in the case where characters are to be pasted to the projection image of the sphere of FIG. 25B, the characters must be drawn within the range of the shaded portion of FIG. 25C to carry out the paste processing. (If the characters exceed the shaded portion, the exceeding part of the characters is not pasted to the projection image of FIG. 25B.)

It is possible to find $\mu$, $\lambda_1$, $\lambda_2$ of FIGS. 26A and 26B in the case where the three-dimensional object is a sphere, by carrying out the processing similar to the $\theta$ calculation processing described in FIG. 24 with respect to each of $\mu$, $\lambda_1$, $\lambda_2$, as described above. However, $\mu$ can also be found from the following relation after finding $\lambda_1$ and $\lambda_2$.

Figure 27:
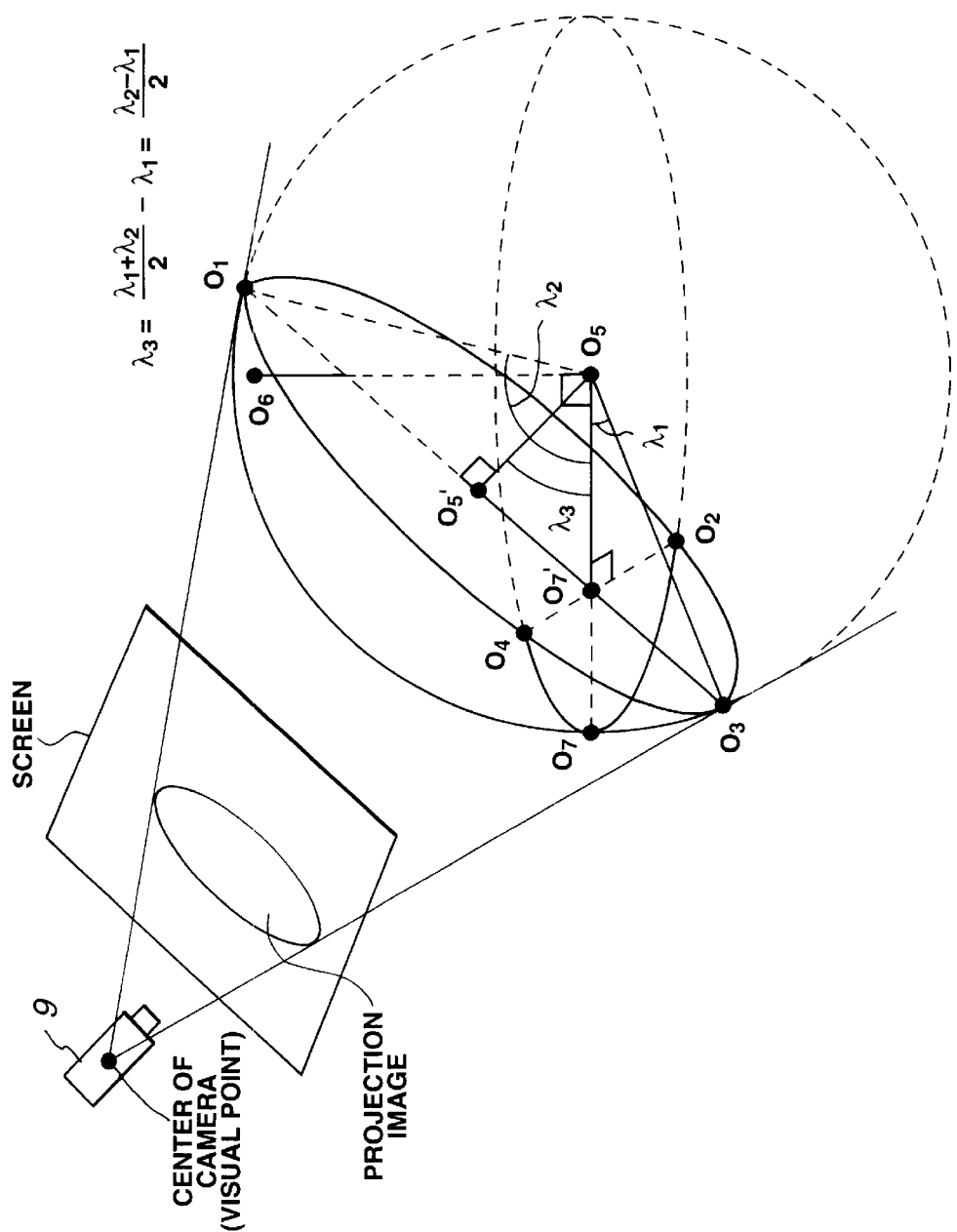
FIG. 27 illustrates a method for calculating $\mu$ from $\lambda_1$ and $\lambda_2$ of FIGS. 26A and 26B.

Specifically, in addition to the points $O_1$, to $O_7$ shown in FIG. 25A, points $O_5'$ and $O_7'$ are considered as shown in FIG. 27. The point $O_5'$ is a point of intersection between a perpendicular line to the segment $O_1O_3$ from the point $O_5$ and the segment $O_1O_3$. The point $O_7'$ is a point of intersection between the segment $O_2O_4$ and segment $O_5O_7$.

If $\angle O_5'O_5O_7'$ is expressed as $\lambda_3$, this $\lambda_3$ can be expressed as follows using $\lambda_1$, which represents $\angle O_3O_5O_7$, and $\lambda_2$, which is $\angle O_1O_5O_7$.

$$\lambda_3 = (\lambda_1 + \lambda_2)/2 - \lambda_1 \qquad (30)$$
$$= (\lambda_2 - \lambda_1)/2$$

Figure 28:
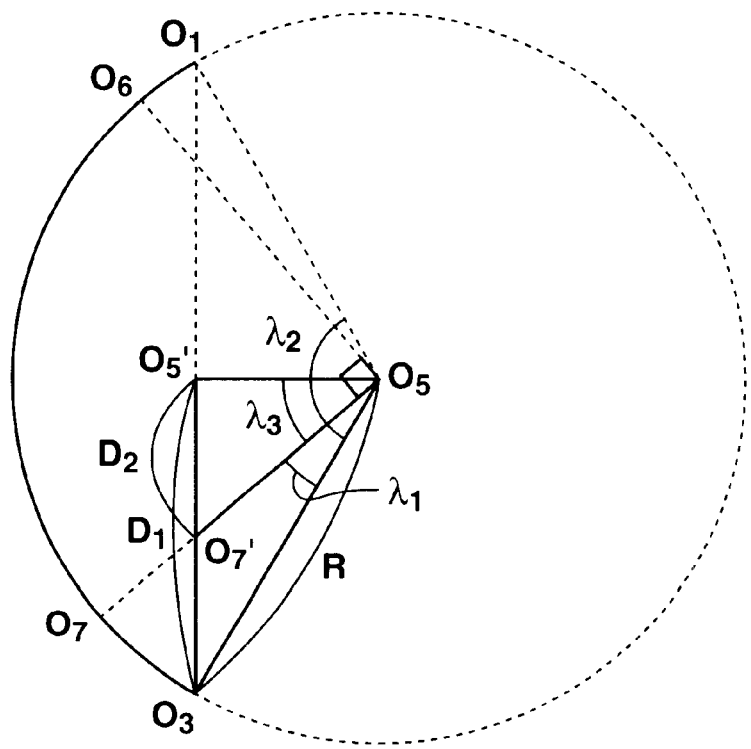
FIG. 28 illustrates a method for calculating $\mu$ from $\lambda_1$ and $\lambda_2$ of FIGS. 26A and 26B.

A cross surface between the sphere of FIG. 27 and the plane passing the point $O_1$, $O_6$, $O_7$, $O_3$ ($y_oz_o$-plane) is a circle having the point $O_5$ as its center and having the same radius as the sphere of FIG. 27, as shown in FIG. 28. In FIG. 28, if the length of the segment $O_3O_5'$ is represented by $D_1$, this $D_1$ can be found in accordance with the following equation.

$$D_1 = R \sin((\lambda_1+\lambda_2)/2) \qquad (31)$$

In this equation, R represents the radius of the sphere in the three-dimensional space, as in the equation (24).

Furthermore, in FIG. 28, if the length of the segment $O_5'O_7'$ is represented by $D_2$, this $D_2$ can be found in accordance with the following equation.

$$D_2 = R \cos((\lambda_1+\lambda_2)/2) \tan \lambda_3 \qquad (32)$$

Figure 29:
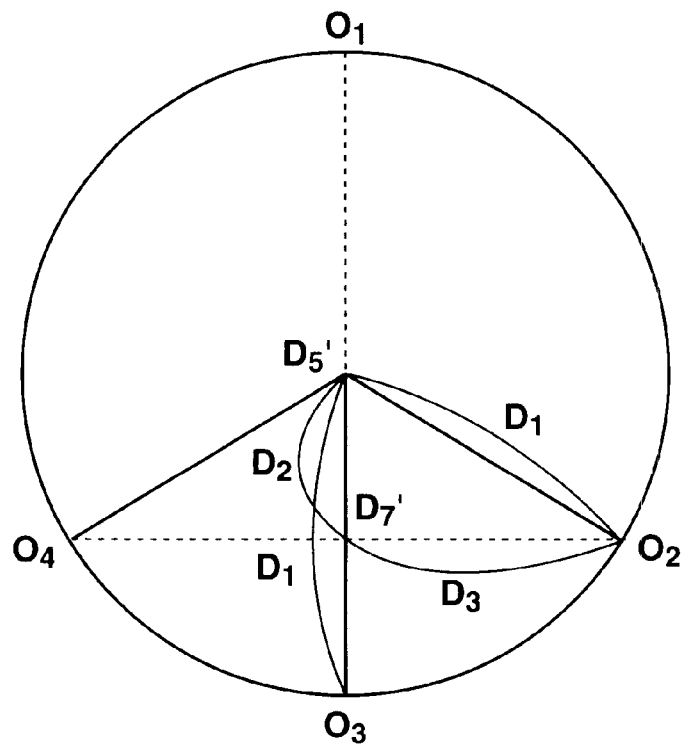
FIG. 29 illustrates a method for calculating $\mu$ from $\lambda_1$ and $\lambda_2$ of FIGS. 26A and 26B.

A cross surface between the sphere of FIG. 27 and the plane passing the point $O_1$, $O_2$, $O_3$, $O_4$ is a circle having the point $O_5'$ as its center and having the segment $O_3O_5'$ as its radius, as shown in FIG. 29. In FIG. 29, both of the segment $O_5O_3'$ and the segment $O_5'O_2$ are the radius of the circle centering at the point $O_5'$ and therefore are equal to each other. Therefore, the length of the segment $O_5'O_2$ is equal to the length $D_1$ of the segment $O_5'O_3$ found in accordance with the equation (31). In FIG. 29, if the length of the segment $O_2O_7'$ is expressed as $D_3$, this $D_3$ can be found in accordance with the following equation using the theorem of three squares.

$$S_3 = (D_1^2 - D_2^2)^{1/2} \qquad (33)$$
$$= R\left(\sin^2((\lambda_1 + \lambda_2)/2)^{1/2} - \cos^2((\lambda_1 + \lambda_2)/2)\tan^2\lambda_3\right)$$

Figure 30:
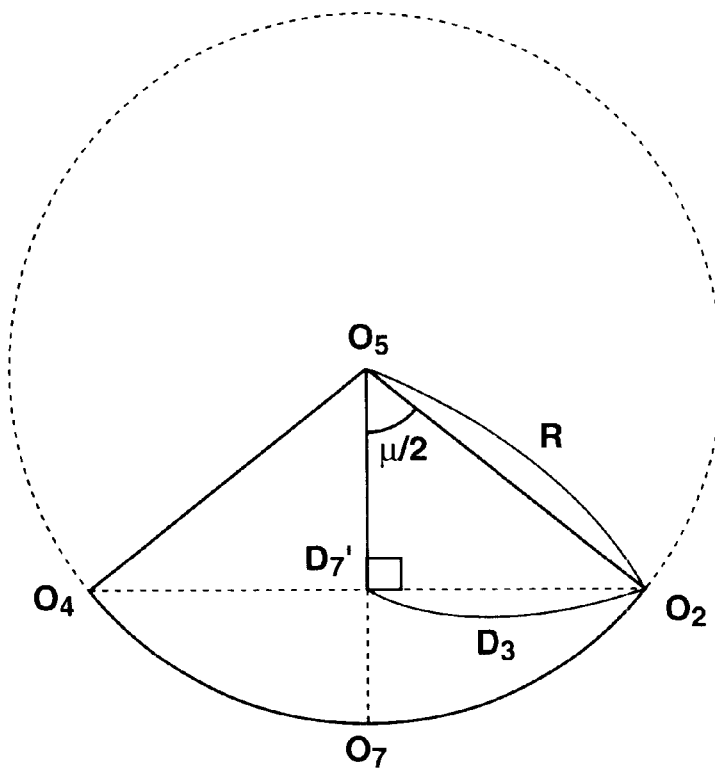
FIG. 30 illustrates a method for calculating $\mu$ from $\lambda_1$ and $\lambda_2$ of FIGS. 26A and 26B.

Moreover, a cross surface between the sphere of FIG. 27 and the plane passing the point $O_5$, $O_2$, $O_7$, $O_4$ ($x_oz_o$-plane) is a circle having the point $O_5$ as its center and having the radium R as shown in FIG. 30, similarly to the case shown in FIG. 26A. The sine of an angle $\mu/2$ can be found by calculating $D_3/R$, as shown in FIG. 30. Therefore, the following equation holds between the angle $\mu$ and $\lambda_1$, $\lambda_2$.

$$\sin(\mu/2) = D_3/R \qquad (34)$$
$$= \left(\sin^2((\lambda_1 + \lambda_2)/2)^{1/2} - \cos^2((\lambda_1 + \lambda_2)/2)\tan^2\lambda_3\right)$$
$$= \left(\sin^2((\lambda_1 + \lambda_2)/2)^{1/2} - \right.$$
$$\left. \cos^2((\lambda_1 + \lambda_2)/2)\tan^2((\lambda_2 - \lambda_1)/2)\right)$$

As described above, $\lambda_1$, and $\lambda_2$ can be found by carrying out the processing similar to the $\theta$ calculation processing described in FIG. 24, and $\mu$ can be found by substituting the found $\lambda_1$ and $\lambda_2$ in the equation (34).

In accordance with the $\theta$ calculation processing, the processing of steps S42 to S45 must be repeatedly carried out until $\theta$ is converged. However, in the case where $\mu$ is found from $\lambda_1$ and $\lambda_2$ in accordance with the relation of the equation (34), such processing need not be repeated. Accordingly, $\mu$ can be found with a smaller operation quantity.

Next, in the case where the three-dimensional object is a cone, in carrying out the copy processing for generating a spread image of the lateral side and storing it in the paste buffer, or the paste processing for pasting the image stored in the paste buffer onto the lateral side of the cone, the backward conversion formula or the forward conversion formula is calculated in the following manner.

Figure 31A:
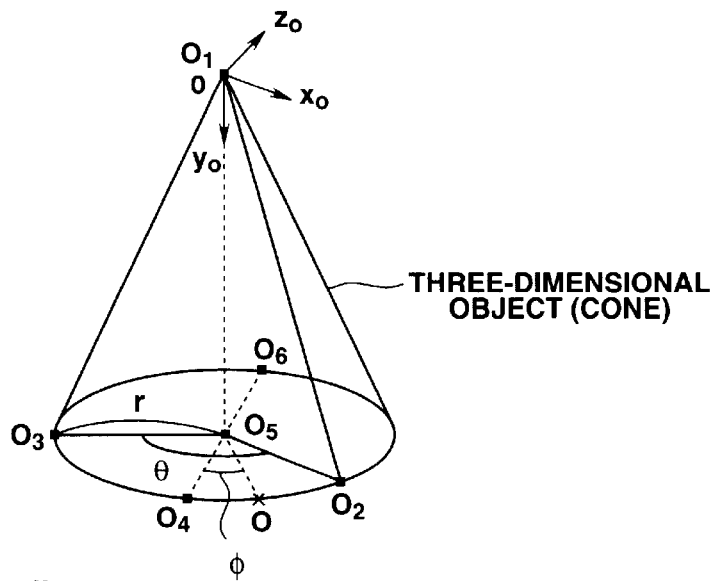
FIGS. 31A to 31C illustrate a calculation method for a backward conversion formula and a forward conversion formula in the case where the three-dimensional object is a cone.

Specifically, in this case, as the three-dimensional coordinate representing the position of the cone in the three-dimensional space, the apex $O_1$ of the cone (a point corresponding to the center of a fan shape when the lateral side is spread to the fan shape) is set as the origin (0, 0, 0) and the $y_o$-axis is provided in the direction from the apex $O_1$ to the center $O_5$ of the base while the $z_o$-axis provided in the direction from a point $O_4$, later described, to the center $O_5$ of the base, as shown in FIG. 31A. (The $x_o$-axis is in the direction of proceeding of a right screw where the right screw is turned in the direction from the $y_o$-axis to the $z_o$-axis.)

A projection image obtained by shooting the cone of FIG. 31A slightly from above is stored as a two-dimensional image in the noted buffer. In this case, the projection image of the cone appears like the shaded portion in FIG. 31B.

Figure 31B:
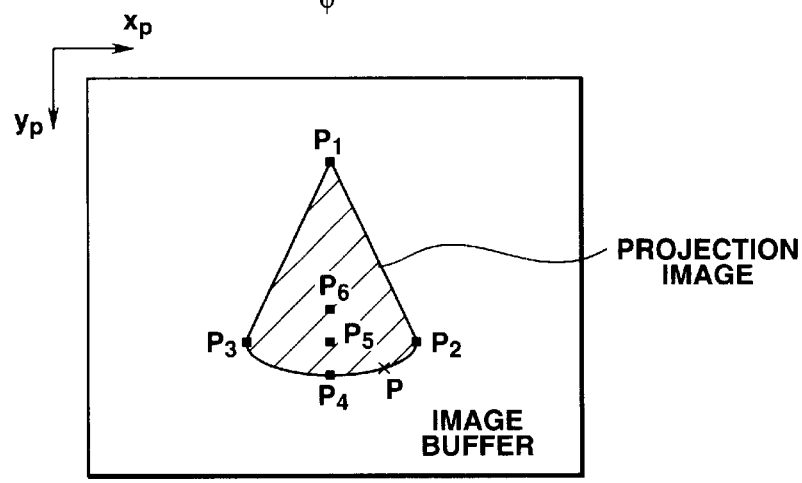

In FIG. 31B, points $P_1$ and $P_5$ correspond to the points $O_1$, and $O_5$ of FIG. 31A, respectively. Points $P_2$ and $P_3$ are end points (end points of the projection image of the circumference of the base) of a cross line between the projection image of the lateral side of the cone (projection image in the case where only the lateral side is projected) and the projection image of the base of the cone (projection in the case where only the base is projected). In FIG. 31B, the right end points and the left end point of the cross line is set as the points $P_2$ and $P_3$, respectively. These points $P_2$ and $P_3$ correspond to points $O_2$ and $O_3$ of FIG. 31A, respectively.

In FIG. 31A, points $O_4$ and $O_6$ are points bisecting the front-side circumference and the rear-side circumference of the base, respectively, between the points $O_2$ and $O_3$, and correspond to points $P_4$ and $P_6$ of FIG. 31B, respectively.

As described above, the $z_o$-axis is in the direction from the point $O_4$ to the center $O_5$ of the base, and the point $O_5$ is a point on the $y_o$-axis. Moreover, from the above description, the points $O_4$, $O_5$, $O_6$ exist on a single straight line and therefore all these points $O_4$ to $O_6$ are within the $y_o z_o$-plane (plane of $x_o=0$). Thus, in FIG. 31B, the points $P_4$, $P_5$, $P_6$ corresponding to the points $O_4$, $O_5$, $O_6$, respectively, are also located on a single straight line. If the points $O_4$ and $O_6$ are designated, which are two points of the points $O_4$ to $O_6$, the remaining point $O_5$ is located on the straight line $O_4 O_6$ and therefore has a degree of freedom equal to 1.

An angle $\theta$ in FIG. 31A represents $\angle O_2 O_5 O_3$. On the assumption that the radius of the base of the cone is represented by "r", in the case where a spread image corresponding to the portion of the projection image of the lateral side of the cone is stored in the paste buffer, the relation between the radius "r" and the angle $\theta$ can be expressed by the equation (15) similarly to the case of the column described in FIGS. 21A to 21C. (In this example, the circumferential direction of the base of the cone corresponds to the lateral direction of the spread image.)

Also, if the angle $\phi$ is expressed by the equation (16) similarly to the case of the column described in FIGS. 21A to 21C, $\psi$ of the equation (7) with respect to the lateral side of the cone, that is, the relation between the point $(x_o, y_o, z_o)$ in the three-dimensional space of the lateral side of the cone and the point $(x_e, y_e)$ on the spread image, can be expressed as follows by considering the spread view of the cone of FIG. 31A.

$$\begin{aligned} x_o &\quad \psi_1(x_e, y_e) \quad (y_e/L_H)r\sin\varphi \\ y_o &= \psi_2(x_e, y_e) = y_e \\ z_o &\quad \psi_3(x_e, y_e) \quad (-y_e/L_H)r\cos\varphi \end{aligned} \quad (35)$$

In this case, the eleven elements $m_{11}$ to $m_{14}$, $m_{21}$ to $m_{24}$, $m_{31}$ to $m_{33}$ of the matrix M described in the equation (11) must be found. These eleven elements $m_{11}$ to $m_{14}$, $m_{21}$ to $m_{24}$, $m_{31}$ to $m_{33}$ can be found by designating five points having a degree of freedom equal to 2 and one point having a degree of freedom equal to 1, that is, six points in total, on the projection image as characteristic points, as described above.

Thus, in this example, the user is made to designate the six points $P_1$ to $P_6$ shown in FIG. 31B. Specifically, the user is made to designate five points having a degree of freedom equal to 2, for example, the points $P_1$ to $P_4$ and $P_6$, and then designate one point having a degree of freedom equal to 1, for example, the point $P_5$. In the case where the point $P_4$ and $P_6$ are designated, the point $P_5$ is located on the straight line $P_4 P_6$ and therefore has a degree of freedom equal to 1.

Figure 31C:
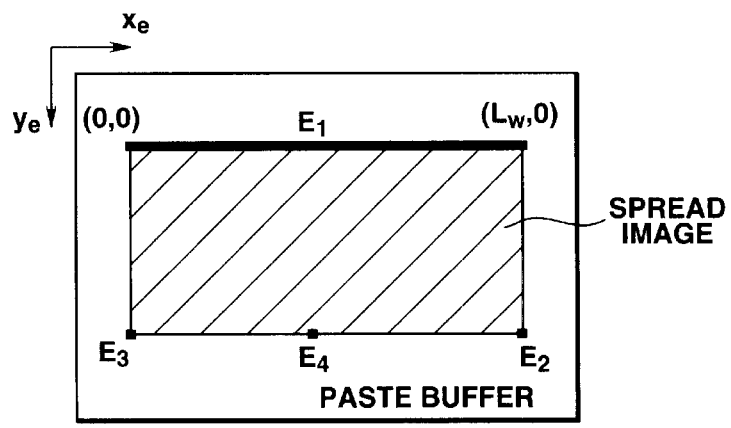

Also, in this example, a segment connecting the origin (0, 0) and the point $(L_W, 0)$ in the paste buffer coordinate system of the rectangular spread image stored in the paste buffer is set as $E_1$, and points represented by the coordinate $(L_W, L_H)$, $(0, L_H)$ and $(L_W/2, L_H)$ are set as $E_2$, $E_3$ and $E_4$, respectively, as shown in FIG. 31C. The point $P_1$ and the segment $E_1$ are caused to correspond to each other. The point $P_2$ and the point $E_2$ are caused to correspond to each other. The point $P_3$ and the point $E_3$ are caused to correspond to each other. The point $P_4$ and the point $E_4$ are caused to correspond to each other.

By establishing the solving equations in accordance with the equation (10) with respect to the eleven elements $m_{11}$ to $m_{14}$, $m_{21}$ to $m_{24}$, $m_{31}$ to $m_{33}$ using the above-described relations, these eleven elements $m_{11}$ to $m_{14}$, $m_{21}$ to $m_{24}$, $m_{31}$ to $m_{33}$, that is, the matrix M, can be found.

In the example of FIG. 31C, the rectangular spread image as is used as the spread image of the lateral side of the cone. However, as the spread image of the lateral side of the cone, a fan-shaped spread image obtained simply by spreading the lateral side of the cone of FIG. 31A can also be used. In the case where the fan-shaped spread image is used as the spread image of the lateral side of the cone, when characters or the like are to be pasted to the projection image of the lateral side of the cone in parallel to the base thereof, the characters must be drawn along the circumference of the fan-shaped spread image. On the contrary, in the case where the rectangular spread image is used as the spread image of the lateral side of the cone as shown in FIG. 31C, the characters can be pasted to the projection image of the lateral side of the cone in parallel to the base thereof, by drawing the characters in parallel to the $x_e$-axis and then carrying out the paste processing.

On the assumption that the height of the cone of FIG. 31A is equal to the vertical length $L_H$ of the spread image of FIG. 31C, the coordinate of the points $O_1$, $O_2$, $O_3$, $O_4$, $O_5$, $O_6$ is $(0, 0, 0)$, $(r \sin(\theta/2), L_H, -r \cos(\theta/2))$, $(-r \sin(\theta/2)), L_H, -r \cos(\theta/2))$, $(0, L_H, -r)$, $(0, L_H, 0)$, $(0, L_H, r)$, respectively.

Figure 32:
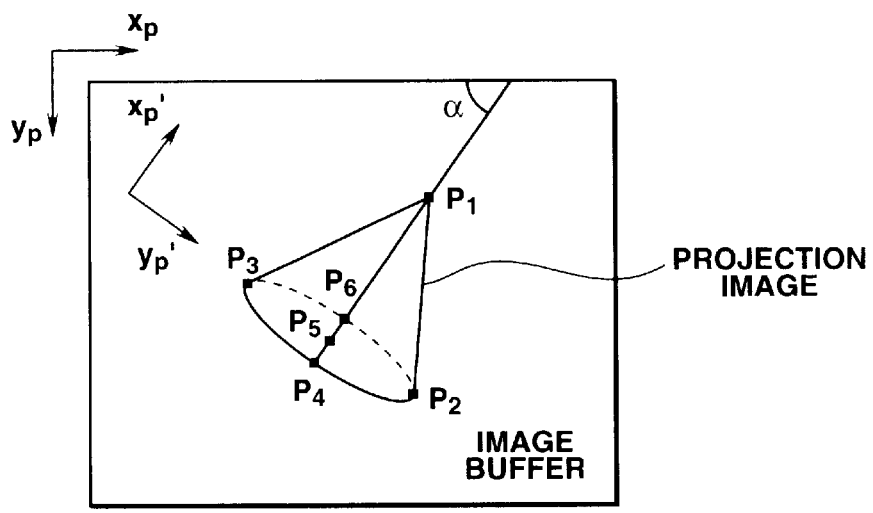
FIG. 32 illustrates a calculation method for a backward conversion formula and a forward conversion formula in the case where the three-dimensional object is a cone.

The matrix M found as described above with respect to the cone is a function of the angle $\theta$ similarly to the case of the column described in FIGS. 21A to 21C and therefore this angle $\theta$ must be found. Moreover, in FIG. 31B, the projection image of the cone is displayed as a two-dimensional image so that the straight line connecting the characteristic points $P_4$ and $P_5$ becomes parallel to the $y_p$-axis. Generally, however, in the projection image of the cone, the straight line connecting the characteristic points $P_4$ and $P_5$ is often inclined with respect to the $y_p$-axis, as shown in FIG. 32.

Thus, the method for finding $\theta$ will now be described, in which the angle formed by the $x_p$-axis and the straight line connecting the characteristic points $P_4$ and $P_5$ is set as $\alpha$.

On the assumption of $y_o = y_e = L_H$ in the above-described equation (35), the equation (35) is equal to the equation (17) expressing $\psi$ with respect to the column. Therefore, in this case, $x_p$ and $y_p$ with respect to the cone are equal to $x_p$ and $y_p$ with respect to the column. Thus, in the case where the angle formed by the $x_p$-axis and the straight line connecting the characteristic points $P_4$ and $P_5$ is $\alpha$, the point P (FIG. 31) in the projection image corresponding to the point O on the circumference of the circle, which is the base of the cone, can be expressed similarly to the case of the column, in the coordinate system prescribed by an $x_p'$-axis and a $y_p'$-axis, which are coordinate axes obtained by rotating the $x_p$-axis and the $y_p$-axis by $\alpha$ counterclockwise.

That is, the $x_p'$-coordinate and the $y_p'$-coordinate of the point P on the projection image corresponding to the point O on the circumference of the base of the cone are expressed by the equation (20). Moreover, if an angle formed by the point P on the projection image corresponding to the point O and the points $P_1$ and $P_4$ is set as $v$ and the coordinate of the point $P_1$ is set as $(x_{p1}', y_{p1}')$, the angle $\nu$ is expressed by the following equation.

$$\nu=\tan^{-1}(|y_p'-y_{p1}'|/|x_p'-x_{p1}'|) \qquad (36)$$

Similar to the case of the column, $\nu$ in the equation (36) is a function of the angle $\phi(=\angle O_4 O_5 O)$ (FIG. 31A) formed by the point O with the points $P_5$ and $P_4$, and it has the extremum when the equation $|\phi|=\theta/2$ holds.

Therefore, by using the equation (36) in place of the equation (21), $\theta$ of the cone in FIG. 31A can be found similarly to the case of the column.

Figure 33:
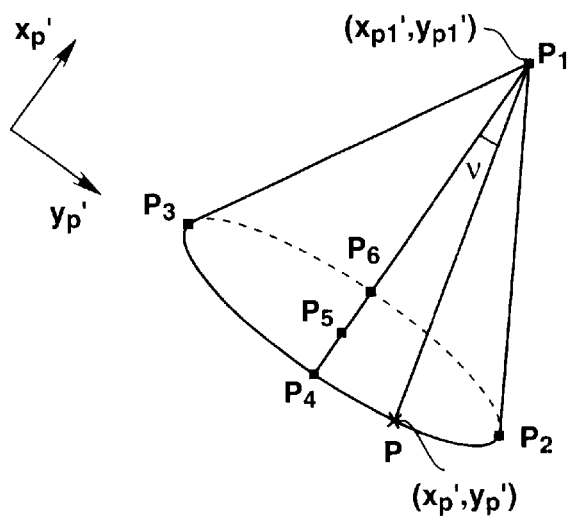
FIG. 33 illustrates an angle v.

In the projection image of the cone shown in FIG. 31B or FIG. 33, if the apex $P_1$ is within the projection image, the entire lateral side is seen. Therefore, $\theta$ in such a case is $2\pi$ (360 degrees).

The methods for calculating $\psi$ and M in the case where several three-dimensional objects of primitive shapes are used are described above. With respect to other three-dimensional objects than those described above, $\psi$ and M can be calculated as long as their shapes can be expressed as functions.

Points to be designated as characteristic points are not limited to those described above. Specifically, though, in FIGS. 20A and 20B, the apexes of the rectangle are designated as the characteristic points of the projection image of the rectangle, which is a surface of the rectangular-parallelepiped, the mid points on the respective sides of the rectangle can also be designated as the characteristic points of the projection image of the rectangle. With respect to the sphere, though the points $P_1$ to $P_7$ corresponding to the points $O_1$ to $O_7$ shown in FIG. 25A are designated as the characteristic points, a point which is not the inner point $O_7$ of the points of intersection between the straight line passing the points $O_5$ and $O_7$ and the sphere may be set as a point $O_8$, and points projected on the two-dimensional image corresponding to the points $O_1$ to $O_6$ and $O_8$ may be designated as the characteristic points of the sphere.

Figure 34A:
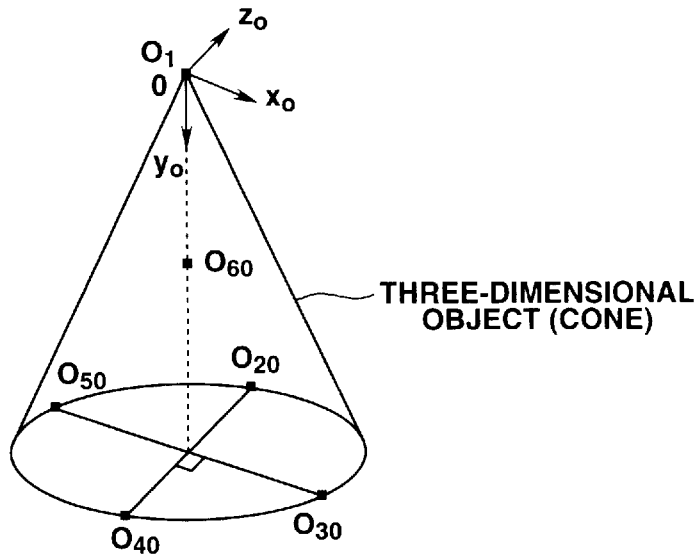
FIGS. 34A and 34B show an example of a characteristic point designated with respect to a cone.
Figure 34B:
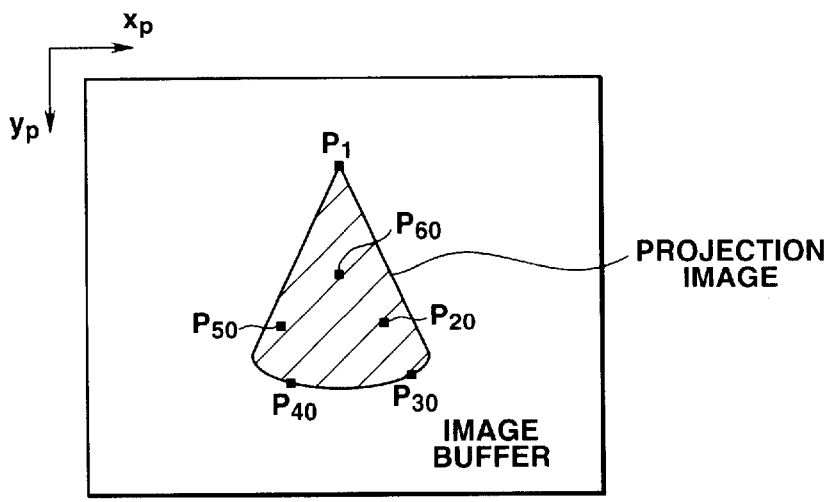

With respect to the cone, points as shown in FIGS. 34A and 24B may be designated as the characteristic points. Specifically, in the three-dimensional space, the mid point of a segment connecting the apex $O_1$ of the cone and the center of the base is set as $O_{60}$, as shown in FIG. 34A. Moreover, points of intersection between the circumference of the base and the $x_o y_o$-plane are set as $O_{30}$ and $O_{50}$, and points of intersection between the circumference of the base and the $y_o x_o$-plane are set as $O_{20}$ and $O_{40}$. The coordinate of the points $O_{20}$, $O_{30}$, $O_{40}$, $O_{50}$, $O_{60}$ is $(r, L_H, 0)$, $(0, L_H, -r)$, $(-r, L_H, 0)$, $(0, L_H, r)$, $(0, L_H/2, 0)$, respectively. Points on the projection image corresponding to the point $O_1$, $O_{20}$, $O_{30}$, $O_{40}$, $O_{50}$, $O_{60}$ are set as points $P_1$, $P_{20}$, $P_{30}$, $P_{40}$, $P_{50}$, $P_{60}$, respectively, as shown in FIG. 34B. These points can be designated as the characteristic points.

As is clear from the above description, it is possible to designate points displayed as the projection image (points that can be seen) or points not displayed as the projection image (points that cannot be seen), as the characteristic points.

The corresponding relation between the points designated as the characteristic points of the projection image and the positions on the spread image stored in the paste buffer must be set in advance.

Next, in the paste processing, basically, the image stored in the paste buffer is pasted to the side of the three-dimensional object specified by the characteristic points designated by the user, of the two-dimensional image stored in the noted buffer, as described above. That is, the pixel value of the image stored in the paste buffer is written over the value in the noted buffer. However, in the case where a new three-dimensional object is to be added to the two-dimensional image stored in the noted buffer by the paste processing, if the pixel value of the image stored in the paste buffer is simply written over the value in the noted buffer, the new three-dimensional object can be added in the front of the three-dimensional object which is already displayed as the two-dimensional image stored in the noted buffer, but the new three-dimensional object cannot be added in the back.

Thus, in the present invention, a matte is utilized to enable addition of the new three-dimensional object in the back of the three-dimensional object which is already displayed as the two-dimensional image stored in the noted buffer.

The matte is a so-called gray-scale image representing the shape of an object displayed as a two-dimensional image. Since its value represents the rate of contribution (referred to as $\alpha$) of the object at each pixel constituting the two-dimensional image, the matte is also referred to as $\alpha$-image. In this example, the matte of the two-dimensional image stored in the noted buffer is generated by carrying out the matte processing at step S15 in FIG. 7. The matte of the two-dimensional image is stored in the image buffer in which the two-dimensional image is stored, as described above.

The pixel value of each pixel constituting the matte is within a range from 0 to 1. The pixel value of a pixel constituting the so-called foreground is 1, and the pixel value of a pixel constituting the so-called background is 0. The pixel value of a pixel constituting a boundary portion between the foreground and the background is a value corresponding to the proportion of the foreground and the background included in the pixel. (The pixel value is closer to 1 as the proportion of the foreground is greater, and the pixel value is closer to 0 as the proportion of the background is greater.)

Figure 35C:
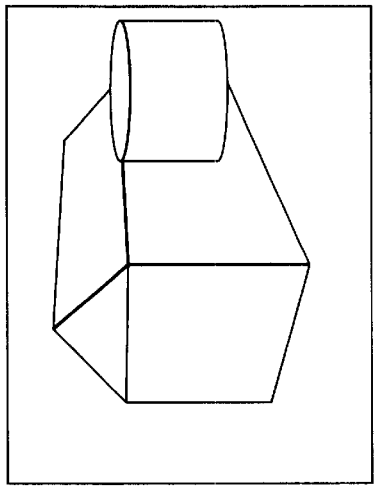
FIGS. 35A to 35D illustrate the matte processing.
Figure 35D:
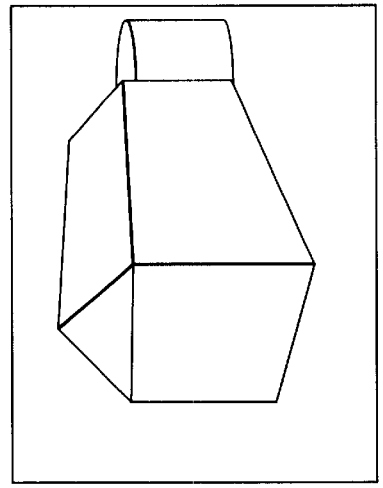
Figure 35A:
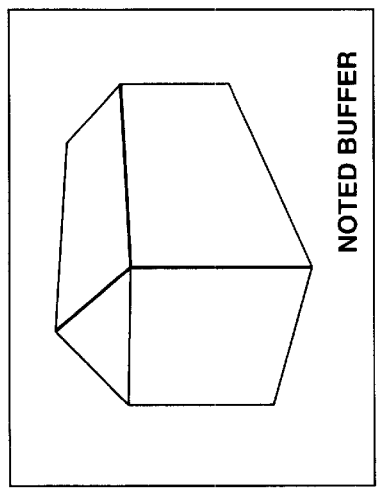
Figure 35B:
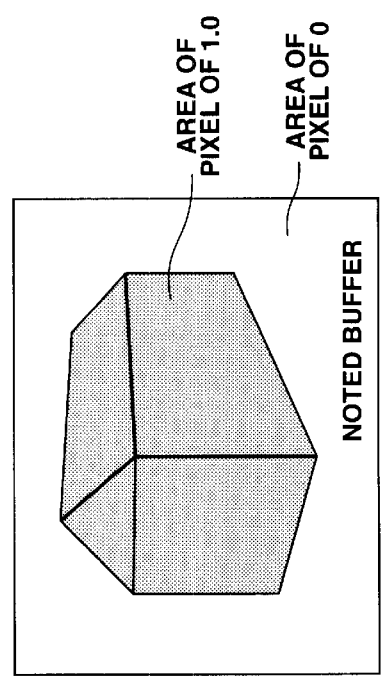

Therefore, for example, in the case where a two-dimensional image displaying a house-shaped three-dimensional object as shown in FIG. 35A is stored in the noted buffer, when the matte processing is carried out using the portion of the house as the foreground and using the other portions as the background, a matte as shown in FIG. 35B is generated in the matte operation processing section 16 and is stored in the noted buffer. In FIG. 35B, the pixel value of the shaded portion is 1 and the pixel value of the unshaded portion is 0.

As a method for generating the matte, a technique disclosed in Eric N. Mortensen, William A. Barrett, "Intelligent Scissors for Image Composition," proceedings of SIGGRAPH 95, pp.191–198, or a technique disclosed by the present Assignee in the JP Publication of Unexamined Patent Application No. Hei 8-331455 and No. Hei 10-143654 can be used.

In the case where the two-dimensional image is stored together with the matte in the noted buffer, whether the matte is valid or invalid can be set by operating the input unit 6.

For example, in the case where the two-dimensional image as shown in FIG. 35A and the matte as shown in FIG. 35B are stored in the noted buffer and where the paste processing is instructed for pasting a column as a new three-dimensional object to the two-dimensional image in the noted buffer, when the matte is invalid, the projection image of the column is simply written over the two-dimensional image, thus generating a two-dimensional image in which the column appears in front of the house, as shown in FIG. 35C.

On the other hand, when the matte is valid, a two-dimensional image C is generated on the basis of an equation C=αA+(1−α)B, where A represents the pixel value of a pixel constituting the two-dimensional image stored in the noted buffer, B represents the pixel value of a pixel constituting the projection image of the column, α represents the pixel value of a pixel constituting the matte, and C represents the two-dimensional image obtained by the paste processing. Therefore, in this case, a two-dimensional image in which the column appears behind the house as shown in FIG. 35D is generated.

By thus setting the matte as being valid and carrying out the paste processing, so-called occlusion can be realized, in which the portion hidden behind the three-dimensional object already displayed as the two-dimensional image is made invisible. Therefore, in this case, it can be said that the matte functions as a flag with respect to whether or not to allow writing of the projection image.

The matte can also be prepared by the user.

Next, the object property/light source change processing at step S16 of FIG. 7 will be described with reference to the flowchart of FIG. 36. In this processing, it is assumed that the matte of the two-dimensional image stored in the noted buffer is already generated and stored in the noted buffer.

In the object property/light source change processing, first, at step S51, the color distribution in the area of the object displayed as the two-dimensional image stored in the noted buffer, represented by the matte similarly stored in the noted buffer, is detected. Specifically, at step S51, the area of the object displayed as the two-dimensional image stored in the noted buffer is recognized from the matte stored in the noted buffer, and the distribution in the RGB space (color distribution) of the RGB value of pixels constituting the area is detected.

After the detection of the color distribution, the processing goes to step S52, and the pixel having the greatest chroma (hereinafter suitably referred to as the maximum chroma pixel) of the pixels constituting the area of the object is detected on the basis of the color distribution detected at step S51.

Figure 37:
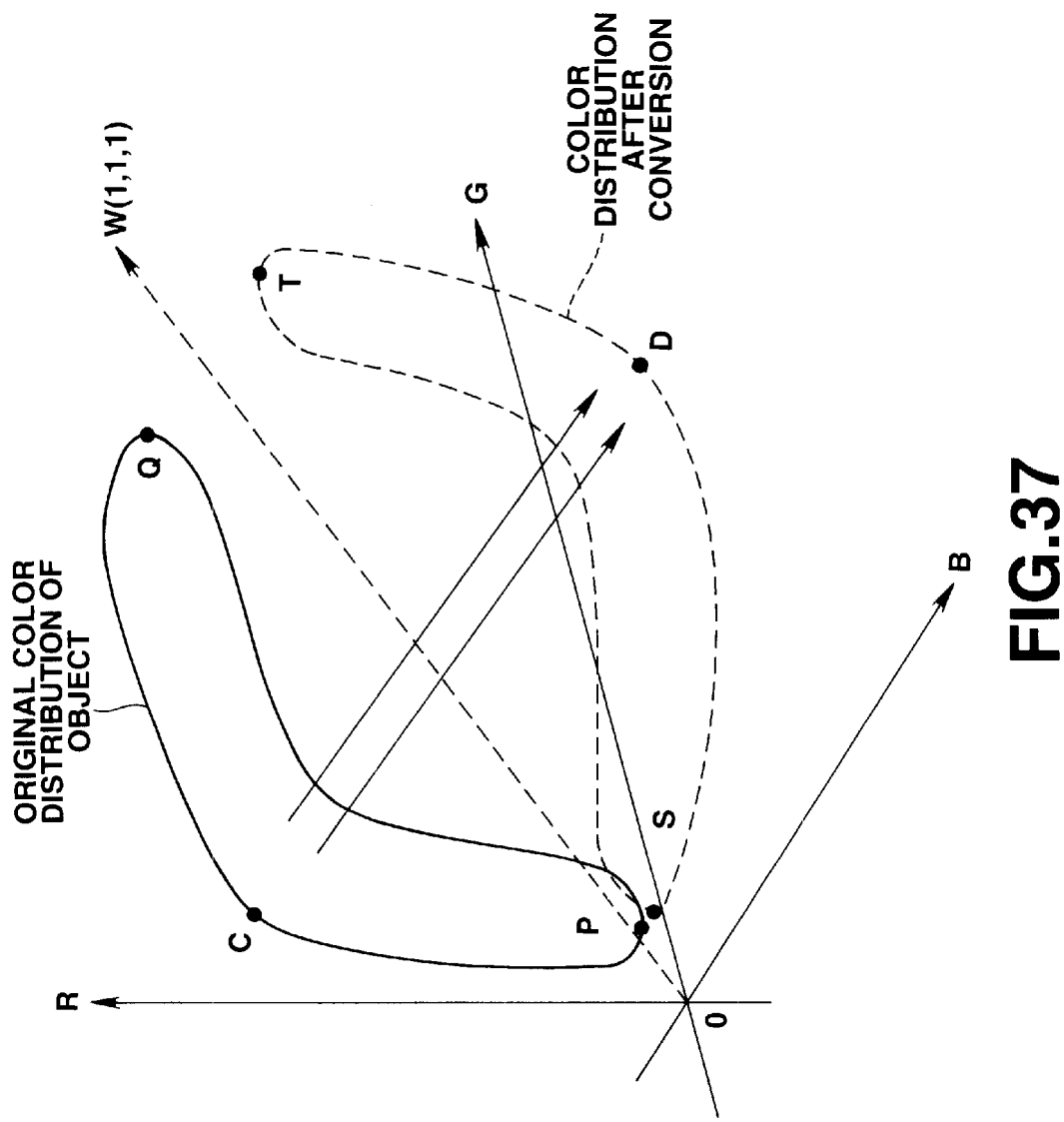
FIG. 37 illustrates the processing of step S53 of FIG. 36.

Specifically, FIG. 37 shows an example of the color distribution of the object in the RGB space (portion surrounded by a solid line in FIG. 37). FIG. 37 shows the color distribution in which the maximum value of R, G, B is normalized to 1. Therefore, in the RGB space of FIG. 37, a point of (R, G, B) equal to (0, 0, 0) represents black and a point of (1, 1, 1) represents white.

In the RGB space, the chroma increases as the point moves away from a straight line connecting the black point and the white point, that is, a straight line connecting the point (0, 0, 0) and the point (1, 1, 1) in FIG. 37. Therefore, at step S52, a pixel having a color located at the farthest point from the straight line connecting the point (0, 0, 0) and the point (1, 1, 1) is detected as the maximum chroma point in the color distribution detected at step S51. In the example of FIG. 37, the pixel of a color indicated by C in FIG. 37 is detected as the maximum chroma pixel.

The color (RGB value) C of the maximum chroma pixel is considered to be the original color of the object displayed as the two-dimensional image stored in the noted buffer.

After that, the processing goes to step S53 and the color distribution detected at step S51 is converted. The pixel value (RGB value) corresponding to the color distribution after conversion is written to the corresponding pixel constituting the two-dimensional image stored in the noted buffer. Then, the processing returns. That is, at step S53, the color C of the maximum chroma pixel is converted to a predetermined color D, and the colors of the other pixels constituting the area of the object are converted in accordance with predetermined rules.

Specifically, in the case where the object property processing for changing the material properties such as the color and material impression of the object is instructed, at step S53, the color C of the maximum chroma pixel is converted to the predetermined color D, and similarly to this conversion, the colors of the other pixels constituting the area of the object are linearly converted.

That is, in FIG. 37, in the case where the color C of the maximum chroma pixel is changed to the color D, a color arranged between the color C and the point (1, 1, 1) representing white in the color distribution of the object is linearly converted to a color arranged between the color D and the point (1, 1, 1) representing white. Also, a color arranged between the color C and the point (0, 0, 0) representing black in the color distribution of the object is linearly converted to a color arranged between the color D and the point (0, 0, 0) representing black. As a result, in FIG. 37, the color distribution of the object is changed from the color distribution indicated by a solid line to the color distribution indicated by a dotted line. In this case, since the color is linearly changed, the brightest color Q in the original color distribution is converted to the brightest color T in the color distribution after conversion. Similarly, the darkest color P in the original color distribution is converted to the darkest color S in the color distribution after conversion.

The color arranged between the color C and the point (1, 1, 1) representing white is a specular reflection component due to specular reflection of a light from a light source in the object, and the color arranged between the color C and the point (0, 0, 0) representing black is a diffused reflection component due to diffused reflection of the light from the light source in the object. By dividing the color distribution of the object into the diffused reflection component and the specular reflection component as described above and linearly converting each of these components, the color of the projection image of the object displayed as the two-dimensional image stored in the noted buffer can be changed, with the original shade maintained. That is, in the above-described case, the color of the object displayed as the two-dimensional image can be changed from the color C to the color D.

Such color change is based on the theory of dichromatic reflection model.

Figure 38B:
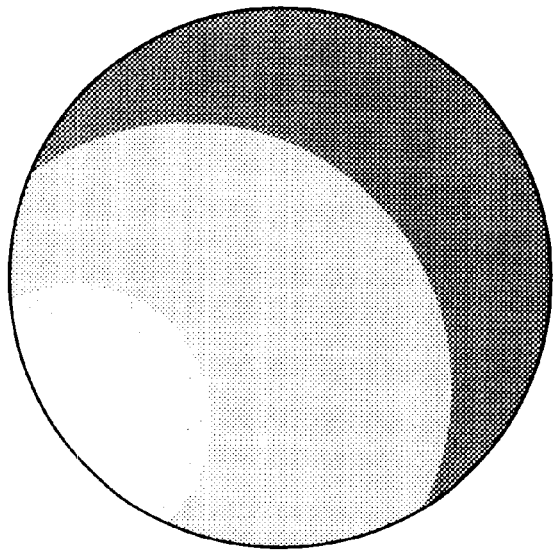
FIGS. 38A and 38B show the result of nonlinear conversion of color distribution of an object.
Figure 38A:
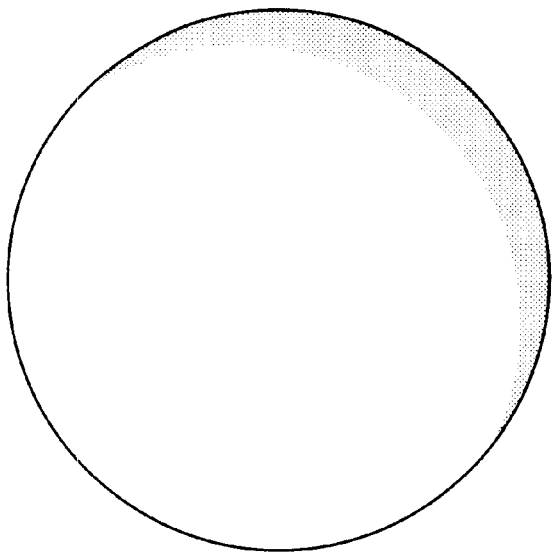

In the above-described case, the diffused reflection component and the specular reflection component are linearly converted, respectively. However, it is also possible to nonlinearly convert the diffused reflection component and the specular reflection component, at step S53. Specifically, for example, in the case where most of the colors arranged between the colors C and Q, which are the specular reflection components, are converted to near the color D while the color Q and its neighboring colors are converted to near the color T in FIG. 37, the resultant object has intensive specular reflection generated at an very small part. In this case, for example, an object which has large diffused reflection and therefore is bright overall, as shown in FIG. 38A, can be changed to an object having intensive specular reflection generated partially, as shown in FIG. 38B.

By thus nonlinearly converting the diffused reflection component and the specular reflection component, the area of specular reflection can be narrowed or expanded, or the intensity of specular reflection can be changed. Thus, the material impression of the object can be changed.

The partially intensive specular reflection as described above is the nature of an object having small surface roughness. Therefore, if the color distribution is changed in such a manner, the surface of the object can be changed to a smooth surface.

Figure 36:
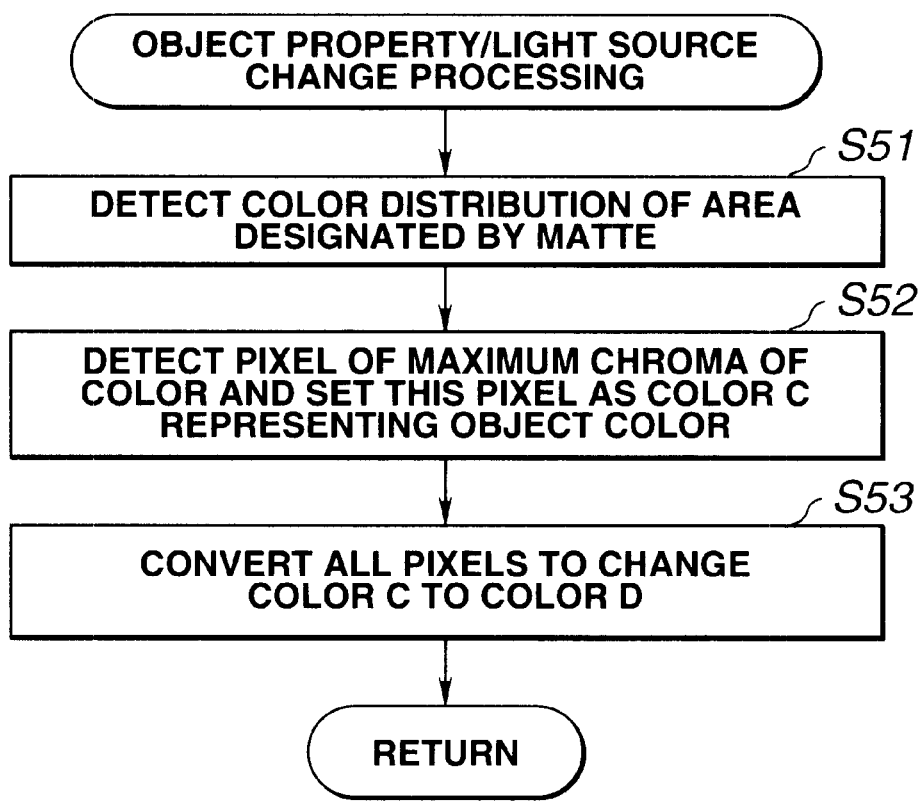
FIG. 36 is a flowchart for explaining details of the processing of step S16 of FIG. 7.

Next, in the case where the light source change processing for changing the light source is instructed, at step S53 of FIG. 36, the colors arranged between the colors C and Q in FIG. 37, which are the specular reflection components, are converted to be distributed from the color C along the color of a new light source. That is, since the brightest color in the color distribution of the object is considered to be the color of the light source, an effect such as if the light source were changed to a new light source can be obtained by converting the colors distributed from the color C along the brightest color Q in FIG. 37 so as to be distributed from the color C along the color of the new light source.

The erase processing carried out at step S17 of FIG. 7 will now be described.

Since the erase processing is adapted for deleting a part of a two-dimensional image stored in the image buffer as described above, it is basically possible to carry out the copy processing in which the image buffer storing therein the two-dimensional image as a target of the erase processing is used as a noted buffer, then store a spread image into the paste buffer, then erase a part of the spread image stored in the paste buffer, and carry out the paste processing to paste a projection image corresponding to the spread image to the original position in the noted buffer.

Figure 39A:
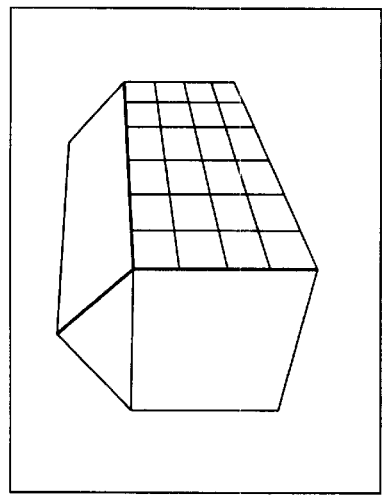
FIGS. 39A to 39D illustrate the erase processing.
Figure 39B:
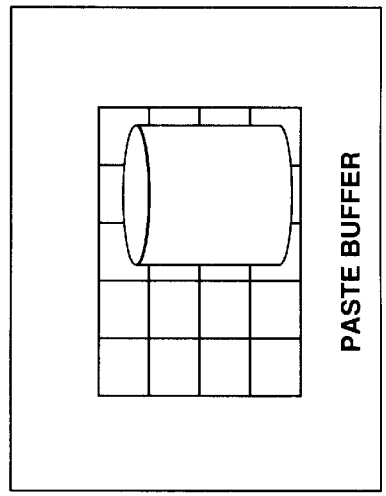

However, in the case where a column buried in a check-patterned wall of a two-dimensional image as shown in FIG. 39A is to be deleted, if the copy processing is carried out to store a spread image of the wall into the paste buffer as shown in FIG. 39B and then the portion of the column is simply deleted to carry out the paste processing, an unnatural two-dimensional image is generated such that there is no pattern in the portion where the column existed.

Thus, in the erase processing, a part of the spread image stored in the paste buffer is deleted and the background is reproduced in the portion where the deletion is carried out.

Figure 39C:
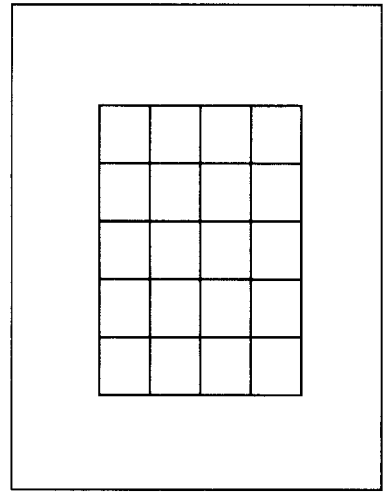
Figure 39D:
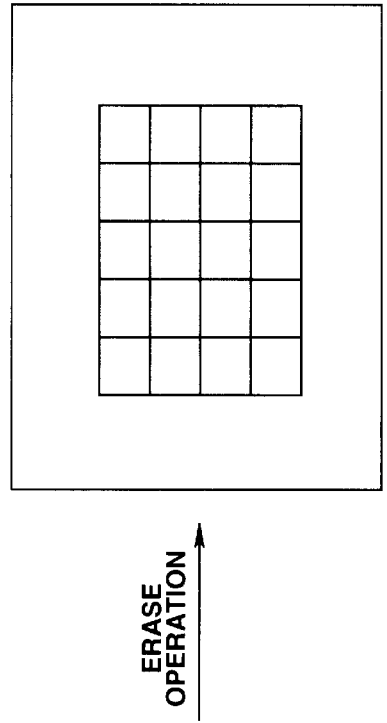

Specifically, in the case where the column buried in the check-patterned wall of the two-dimensional image as shown in FIG. 39A is to be deleted, when the copy processing is carried out to store the spread image of the wall into the paste buffer as shown in FIG. 39B, the portion of the column is deleted and the background is drawn in the portion where the deletion is carried out, in the erase processing. Thus, the spread image in the paste buffer appears so that the check pattern is drawn on the entire image as shown in FIG. 39C.

Therefore, by carrying the paste processing using such a spread image, it is possible to obtain a natural two-dimensional image from which the column is deleted and in which the check pattern is reproduced in the portion where the column existed.

As a method for deleting a part of the image and reproducing the background in the portion where the deletion was carried out as described above, a technique disclosed by the present Assignee in the JP Publication of Unexamined Patent Application No. Hei 9-128529 (corresponding to EP Publication No.0772157) and No. Hei 10-105700 (corresponding to U.S. Pat. No. 5,892,853) can be used.

In the above-described case, in the copy processing, the spread image of only one side of the three-dimensional object displayed as the two-dimensional image stored in the noted buffer is generated and stored in the paste buffer. However, in the copy processing, it is also possible to generate spread images of adjacent two or more sides of the three-dimensional object displayed as the two-dimensional image stored in the noted buffer and store these spread images into the paste buffer.

Figure 40B:
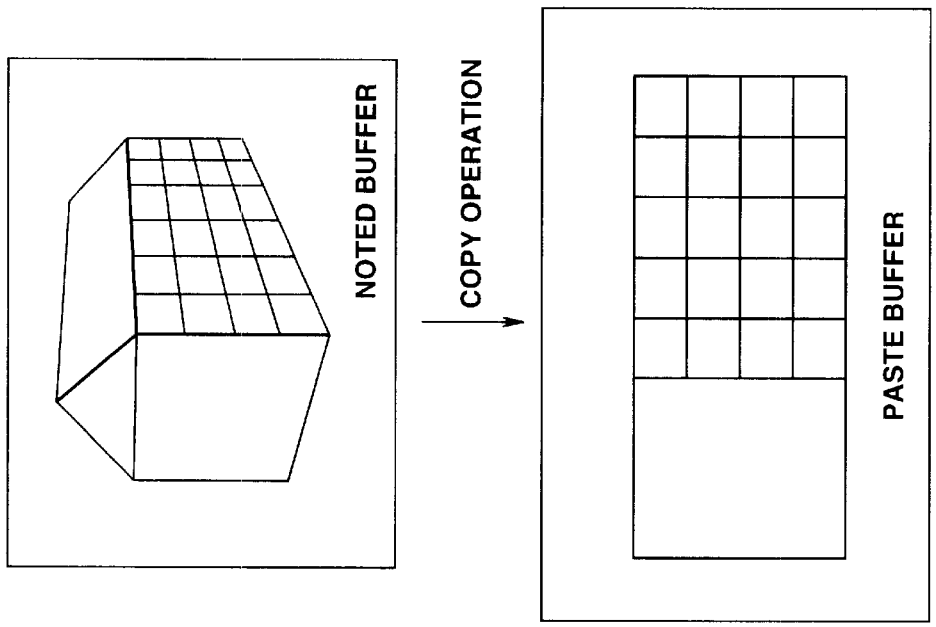
FIGS. 40A and 40B illustrate the copy processing.
Figure 40A:
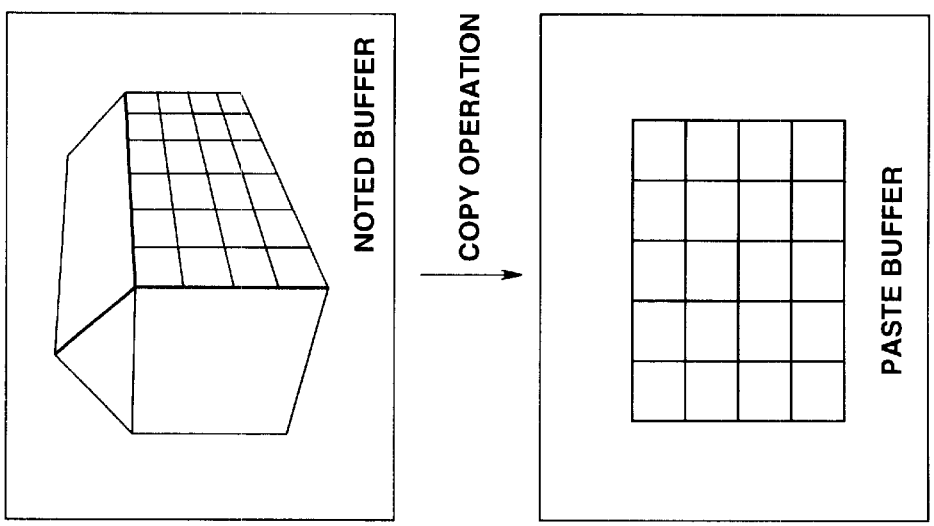

Specifically, for example, in the case where a two-dimensional image displaying a house-shaped three-dimensional object is stored in the noted buffer as shown in FIG. 40A, when continuous characters or pattern is to be added to a check-patterned wall and a patternless wall adjacent thereto, it is troublesome to carry out the copy processing with respect to the check-pattern wall, store its spread image into the paste buffer, draw the characters or pattern, and carry out the paste processing to paste the check-patterned wall with the characters or pattern drawn thereon, and then to carry out the copy processing with respect to the patternless wall, store its spread image into the paste buffer, draw the characters or pattern, and carry out the paste processing to paste the patternless wall with the characters or pattern drawn thereon. Also, by such processing, it is difficult to draw the continuous characters or pattern.

Thus, in the copy processing to which the present invention is applied, the spread image of both the check-patterned wall and the patternless wall adjacent thereto can be generated and stores into the paste buffer, as shown in FIG. 40B. In this case, continuous characters or pattern can be easily drawn on the check-patterned wall and the patternless wall adjacent thereto.

Similarly, in the paste processing, it is possible to paste the spread image stored in the paste buffer to two or more adjacent sides of the three-dimensional object.

Meanwhile, in the above-described automatic correction processing, the contour of an object displayed as a two-dimensional image is detected on the basis of the component in the direction of normal vector of the differential value of the pixel value, and the characteristic points designated by the user are corrected to be located on the contour. However, the technique of detecting the contour of an object on the basis of the component in the direction of normal vector of the differential value of the pixel value can be broadly used for processing which requires detection of the contour of an object, as well as the automatic correction processing.

Thus, a contour extraction device for detecting (extracting) the contour of an object on the basis of the component in the direction of normal vector of the differential value of the pixel value will now be described.

Figure 41:
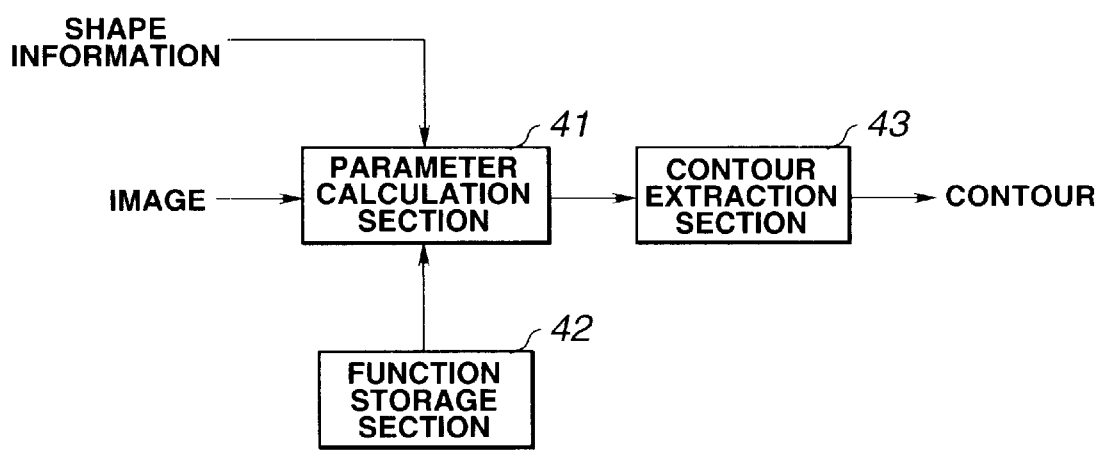
FIG. 41 is a block diagram showing an exemplary structure of an embodiment of a contour extraction device to which the present invention is applied.

FIG. 41 shows an exemplary structure of such a contour extraction device.

A parameter calculation section 41 is supplied with an image displaying an object the contour of which is to be extracted, and shape information which indicates the shape of the object. On the basis of the shape information, the parameter calculation section 41 reads out a function expressed by using one or more parameters from a function storage section 42. That is, the function storage section 42 stores functions expressed by using one or more parameters for defining the contour for respective shapes of the object, and the parameter calculation section 41 reads out a function expressing the contour of the object of the shape corresponding to the shape information, from the functions stored in the function storage section 42.

If the function read out from the function storage section 42 is expressed as "f", the parameter calculation section 41 calculates the energy $E_f$ expressed by the equation (2) with respect to the function "f" and finds a parameter which maximizes the energy $E_f$. If the image supplied to the parameter calculation section 41 is a two-dimensional image, the pixel value or the like is used as $\Delta B(x_p, y_p)$ in the equation (2). If the image supplied to the parameter calculation section 41 is a three-dimensional image (image drawn by using three-dimensional data), volume data or the like used in volume rendering is used as $\Delta B(x_p, y_p)$ in the equation (2).

On finding the parameters of the function "f", the parameter calculation section 41 supplies the parameters together with the function "f" to the contour extraction section 43. The contour extraction section 43 set the parameters from the parameter calculation section 41 to the function "f" similarly from the parameter calculation section 41 and carries out calculation, thus finding a point which satisfies an equation f=0. The contour extraction section 43 then outputs the point as a point constituting the contour of the object.

In the contour extraction device of FIG. 41, even with respect to the contour of an object displayed as an image of other dimension than two-dimensional and three-dimensional images, the contour can be detected, as along as the scalar quantity for expressing the object is defined and the contour can be defined by the equation f=0 by the function "f" expressed by using one or more parameters. In this case, the differential value of the scalar quantity for expressing the object is used as $\Delta B(x_p, y_p)$ in the equation (2).

As described above, the backward conversion formula for converting a side constituting a three-dimensional object in a two-dimensional image to a spread image is calculated on the basis of shape information and characteristic points designated by the user, and the side constituting the three-dimensional object in the two-dimensional image is converted to the spread image on the basis of the backward conversion formula, while the forward conversion formula for converting the spread image to a projection image is calculated on the basis of the shape information and characteristic points designated by the user, and the spread image is converted to the projection image on the basis of the forward conversion formula. The projection is pasted to a portion specified by the characteristic points in the two-dimensional image. Thus, three-dimensional editing or processing can be easily performed on the two-dimensional image.

Therefore, in the image processing device of FIG. 3, for example, in the case where there is an image obtained by shooting a certain object by the video camera 9, it is possible to change the position, shape, texture and the like of the object in the image without shooting the object again. Also, this image processing device can be used by the designer to process the image after shooting the image. Moreover, this image processing device can be used for preparation of data in a virtual reality space, which is often carried out recently, or can be generally used for other image editing works. In this image processing device, an image obtained by shooting a picture and an image drawn by using computer graphics techniques can also be used for processing, as well as an image obtained by shooting a real object.

In the case where the copy processing is carried out with respect to a side constituting a three-dimensional object displayed as a two-dimensional image stored in the noted buffer so as to store the copied image to the paste buffer, then process the storage contents of the paste buffer and subsequently paste the processed storage contents to the side of the original three-dimensional object by the paste processing, the shape information and characteristic points used in the copy processing are directly used in the paste processing. This is because of the following reason. That is, in such as case, since the shape information and characteristic points used in the copy processing are the same as those used in the paste processing, it is redundant to make the user input the same shape information and characteristic points, inputted in the copy processing, again in the paste processing. Also, if the characteristic points are inputted in the copy processing and in the paste processing, respectively, it is considered that the characteristic points used for the copy processing and the characteristic points used for the paste processing might not be accurately coincident with each other even when the automatic correction processing is carried out. In this case, the area on the two-dimensional image where a spread image is generated by the copy processing and the area on the two-dimensional image where a projection image is pasted by the paste processing are not coincident with each other, and the two-dimensional image after the paste processing might become unnatural.

Figure 42A:
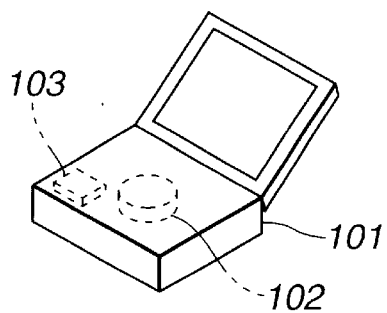
FIGS. 42A to 42C illustrate a medium to which the present invention is applied.
Figure 42B:
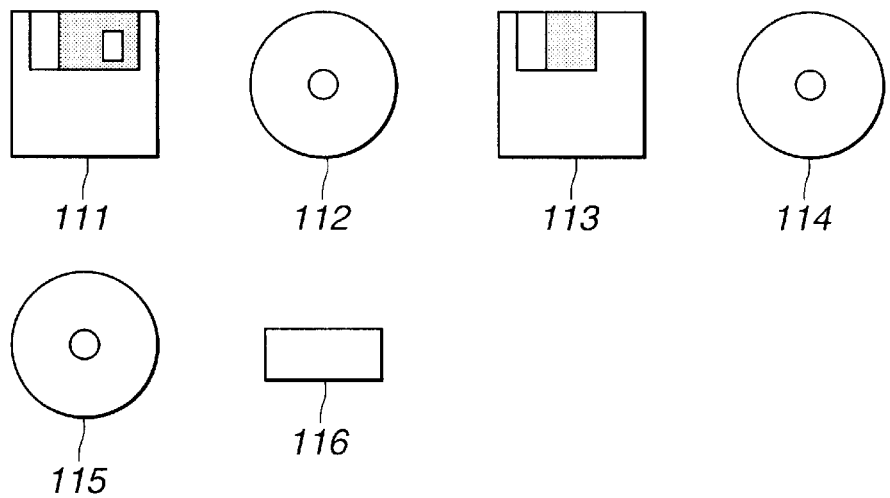
Figure 42C:
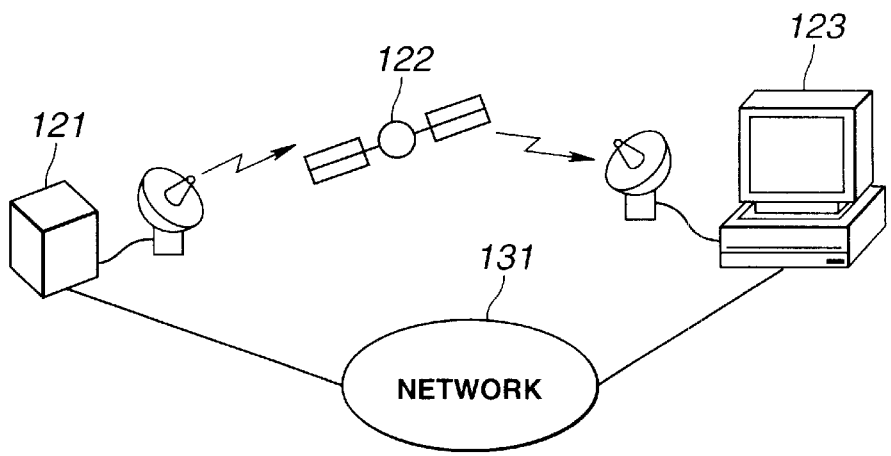

Referring to FIGS. 42A to 42C, a medium will now be described which is used for installing a program for executing the above-described series of processing into a computer and making the program executable by the computer.

The program can be provided to the user in the state of being pre-installed on a hard disk 102 (corresponding to the external storage unit 7 in the processing circuit 1 of FIG. 3) as a recording medium provided inside a computer 101, as shown in FIG. 42A.

Alternatively, the program can be temporarily or permanently stored in a recording medium such as a floppy disk 111, a CD-ROM (compact disc read only memory) 112, an MO (magneto-optical) disc 113, a DVD (digital versatile disc) 114, a magnetic disk 115, or a semiconductor memory 116, so as to be provided as software, as shown in FIG. 42B.

Furthermore, the program can be radio-transferred from a down-load site 121 to a computer 123 via a satellite 122 for digital satellite broadcast, or can be wire-transferred to the computer 123 via a network 131 such as LAN (local area network) or the Internet, so as to be stored onto a hard disk provided inside the computer 123, as shown in FIG. 42C.

The medium in this specification means the broad concept including all of these media.

In this specification, the step of describing the program provided from the medium need not be carried out in time series in accordance with the order described as the flowchart, and includes processing that is carried out in parallel or individually (e.g., parallel processing or processing by object).

In the embodiment of the present invention, the image processing device of FIG. 4 is realized by causing the processing circuit 1 of FIG. 3 to execute the application program stored in the external storage unit 7. However, this image processing device can also be realized by hardware corresponding each block shown in FIG. 4.

INDUSTRIAL APPLICABILITY

As described above, according to the image processing device, the image processing method and the medium of present invention, a first conversion formula for converting a side constituting a first three-dimensional object in a first two-dimensional image to a spread image, which is an image obtained by spreading the side, is calculated on the basis of first shape information and a first characteristic point, and the side constituting the first three-dimensional object in the first two-dimensional image is converted to the spread image on the basis of the first conversion formula and then stored in storage means. Also, a second conversion formula for converting the image stored in the storage means to a projection image, which is an image obtained by projecting a side constituting a second three-dimensional object, is calculated on the basis of second shape information and a second characteristic point, and the image stored in the storage means is converted to the projection image on the basis of the second conversion formula. Then, the projection image is pasted to a portion specified by the second characteristic point in a second two-dimensional image. Thus, three-dimensional editing or the like can be easily performed on a two-dimensional image.

According to the image processing device, the image processing method and the medium of the present invention, a conversion formula for converting a side constituting a three-dimensional object in a two-dimensional image to a spread image is calculated on the basis of shape information and a characteristic point, and the side constituting the three-dimensional object in the two-dimensional image is converted to the spread image on the basis of the conversion formula. Thus, a spread image of a side constituting a three-dimensional object in a two-dimensional image can be easily obtained.

According to another image processing device, image processing method and medium of the present invention, a conversion formula for converting a predetermined image on a two-dimensional plane to a projection image is calculated on the basis of shape information and a characteristic point, and the predetermined image is converted to the projection image on the basis of the conversion formula. Then, the projection image obtained from the predetermined image is pasted to a portion specified by the characteristic point in a two-dimensional image. Thus, a projection image of a three-dimensional object can be easily pasted into a two-dimensional image.

According to the contour extraction device and the contour extraction method of the present invention, a parameter is found, of differential values of scalar quantity at a point on a formula f=0 with a function "f" represented by using one or more parameters for defining the contour of an object in a predetermined space, the parameter maximizing a normal component, which is a component in the direction of a normal vector at that point. Then, the point on the formula f=0 with the function "f" represented by using that parameter is extracted as the contour of the object. Thus, the contour of an object can be extracted with relatively high precision.

What is claimed is:

1. An image processing device for editing a two-dimensional image, comprising:

first operation means for being operated when designating first shape information concerning the shape of a side constituting a first three-dimensional object displayed in a first two-dimensional image and a first characteristic point, which is a point on the first two-dimensional image constituting the side;

first calculation means for calculating a first conversion formula for converting the side constituting the first three-dimensional object in the first two-dimensional image to a spread image, which is an image spread on a two-dimensional plane, on the basis of the first shape information and the first characteristic point;

first conversion means for converting the side constituting the first three-dimensional object in the first two-dimensional image to the spread image on the basis of the first conversion formula;

storage means for storing the spread image;

second operation means for being operated when designating second shape information concerning the shape of a side constituting a second three-dimensional object and a second characteristic point, which is a point on a second two-dimensional image constituting the side;

second calculation means for calculating a second conversion formula for converting the image stored in the storage means to a projection image, which is an image obtained by projecting the side constituting the second three-dimensional object, on the basis of the second shape information and the second characteristic point;

second conversion means for converting the image stored in the storage means to the projection image on the basis of the second conversion formula; and paste means for pasting the projection image to a portion specified by the second characteristic point in the second two-dimensional image.

2. The image processing device as claimed in claim 1, further comprising processing means for processing the image stored in the storage means.

3. The image processing device as claimed in claim 2, wherein the processing means erases a part of the image stored in the storage means or adds another image.

4. The image processing device as claimed in claim 1, further comprising matte generation means for generating a matte representing a predetermined object area displayed as the second two-dimensional image.

5. The image processing device as claimed in claim 4, wherein the paste means pastes the projection image to the second two-dimensional image in accordance with the matte.

6. The image processing device as claimed in claim 4, further comprising:

color distribution detection means for detecting color distribution in the object area represented by the matte; and color distribution conversion means for converting the color distribution.

7. The image processing device as claimed in claim 6, further comprising maximum chroma detection means for detecting a maximum chroma pixel, which is a pixel having the maximum chroma, in the color distribution, wherein the color distribution conversion means linearly converts the color distribution so that the color of the maximum chroma pixel becomes a predetermined color.

8. The image processing device as claimed in claim 6, wherein the color distribution conversion means nonlinearly converts the color distribution.

9. The image processing device as claimed in claim 6, wherein the color distribution conversion means divides the color distribution into a diffused reflection component due to diffused reflection of a light from a light source in the object and a specular reflection component due to specular reflection, and converts the diffused reflection component and the specular reflection component, respectively.

10. The image processing device as claimed in claim 1, wherein the first two-dimensional image and the second two-dimensional image are the same two-dimensional image.

11. The image processing device as claimed in claim 1, wherein the first calculation means calculates an inverse function of a function $M\psi$ as the first conversion formula, where $\psi$ represents a function for mapping the spread image to the side constituting the first three-dimensional object in the three-dimensional space and M represents a function for projecting the first three-dimensional object onto a screen to form the first two-dimensional image.

12. The image processing device as claimed in claim 1, wherein the second calculation means calculates an inverse function of a function $M\psi$ as the second conversion formula, where $\psi$ represents a function for mapping the image stored in the storage means to the side constituting the second three-dimensional object in the three-dimensional space and M represents a function for projecting the second three-dimensional object onto a screen to form the two-dimensional image.

13. The image processing device as claimed in claim 1, wherein the first and second calculation means calculate the first and second conversion formulas, respectively, by using a locally defined two-dimensional coordinate system as the two-dimensional coordinate system of the image stored in the storage means.

14. The image processing device as claimed in claim 1, further comprising correction means for correcting the first and second characteristic points designated by operating the first and second operation means, respectively.

15. An image processing method for editing a two-dimensional image, comprising:
when first shape information and a first characteristic point are designated by first operation means operated for designating the first shape information related to the shape of a side constituting a first three-dimensional object displayed in a first two-dimensional image and the first characteristic point, which is a point on the first two-dimensional image constituting the side;
a first calculation step of calculating a first conversion formula for converting the side constituting the first three-dimensional object in the first two-dimensional image to a spread image, which is an image spread on a two-dimensional plane, on the basis of the first shape information and the first characteristic point;
a first conversion step of converting the side constituting the first three-dimensional object in the first two-dimensional image to the spread image on the basis of the first conversion formula; and
a storage step of storing the spread image into storage means;
when second shape information and a second characteristic point are designated by second operation means operated for designating the second shape information related to the shape of a side constituting a second three-dimensional object and the second characteristic point, which is a point on a second two-dimensional image constituting the side;
a second calculation step of calculating a second conversion formula for converting the image stored in the storage means to a projection image, which is an image obtained by projecting the side constituting the second three-dimensional object, on the basis of the second shape information and the second characteristic point;
a second conversion step of converting the image stored in the storage means to the projection image on the basis of the second conversion formula; and
a paste step of pasting the projection image to a portion specified by the second characteristic point in a second two-dimensional image.

16. The image processing method as claimed in claim 15, further comprising a processing step of processing the image stored in the storage means.

17. The image processing method as claimed in claim 16, wherein at the processing step, a part of the image stored in the storage means is erased or another image is added.

18. The image processing method as claimed in claim 15, further comprising a matte generation step of generating a matte representing a predetermined object area displayed as the second two-dimensional image.

19. The image processing method as claimed in claim 18, wherein at the paste step, the projection image is pasted to the second two-dimensional image in accordance with the matte.

20. The image processing method as claimed in claim 18, further comprising:
a color distribution detection step of detecting color distribution in the object area represented by the matte; and
a color distribution conversion step of converting the color distribution.

21. The image processing method as claimed in claim 20, further comprising a maximum chroma detection step of detecting a maximum chroma pixel, which is a pixel having the maximum chroma, in the color distribution,
wherein at the color distribution conversion step, the color distribution is linearly converted so that the color of the maximum chroma pixel becomes a predetermined color.

22. The image processing method as claimed in claim 20, wherein at the color distribution conversion step, the color distribution is nonlinearly converted.

23. The image processing method as claimed in claim 20, wherein at the color distribution conversion step, the color distribution is divided into a diffused reflection component due to diffused reflection of a light from a light source in the object and a specular reflection component due to specular reflection, and the diffused reflection component and the specular reflection component are converted, respectively.

24. The image processing method as claimed in claim 15, wherein the first two-dimensional image and the second two-dimensional image are the same two-dimensional image.

25. The image processing method as claimed in claim 15, wherein at the first calculation step, an inverse function of a function $M\psi$ is calculated as the first conversion formula, where $\psi$ represents a function for mapping the spread image to the side constituting the first three-dimensional object in the three-dimensional space and M represents a function for projecting the first three-dimensional object onto a screen to form the first two-dimensional image.

26. The image processing method as claimed in claim 15, wherein at the second calculation step, an inverse function of a function $M\psi$ is calculated as the second conversion formula, where $\psi$ represents a function for mapping the image stored in the storage means to the side constituting the second three-dimensional object in the three-dimensional space and M represents a function for projecting the second three-dimensional object onto a screen to form the two-dimensional image.

27. The image processing method as claimed in claim 15, wherein at the first and second calculation steps, the first and second conversion formulas are calculated, respectively, by using a locally defined two-dimensional coordinate system as the two-dimensional coordinate system of the image stored in the storage means.

28. The image processing method as claimed in claim 15, further comprising a correction step of correcting the first and second characteristic points designated by operating the first and second operation means, respectively.

29. A medium for causing a computer to execute a computer program for carrying out image processing to edit a two-dimensional image, the computer program comprising:
when first shape information and a first characteristic point are designated by first operation means operated for designating the first shape information related to the shape of a side constituting a first three-dimensional object displayed in a first two-dimensional image and the first characteristic point, which is a point on the first two-dimensional image constituting the side, a first calculation step of calculating a first conversion formula for converting the side constituting the first three-dimensional object in the first two-dimensional image to a spread image, which is an image spread on a two-dimensional plane, on the basis of the first shape information and the first characteristic point;

a first conversion step of converting the side constituting the first three-dimensional object in the first two-dimensional image to the spread image on the basis of the first conversion formula; and a storage step of storing the spread image into storage means;

when second shape information and a second characteristic point are designated by second operation means operated for designating the second shape information related to the shape of a side constituting a second three-dimensional object and the second characteristic point, which is a point on a second two-dimensional image constituting the side, a second calculation step of calculating a second conversion formula for converting the image stored in the storage means to a projection image, which is an image obtained by projecting the side constituting the second three-dimensional object, on the basis of the second shape information and the second characteristic point;

a second conversion step of converting the image stored in the storage means to the projection image on the basis of the second conversion formula; and a paste step of pasting the projection image to a portion specified by the second characteristic point in a second two-dimensional image.

30. The medium as claimed in claim 29, wherein the computer program further comprises a processing step of processing the image stored in the storage means.

31. The medium as claimed in claim 30, wherein at the processing step, a part of the image stored in the storage means is erased or another image is added.

32. The medium as claimed in claim 29, wherein the computer program further comprises a matte generation step of generating a matte representing a predetermined object area displayed as the second two-dimensional image.

33. The medium as claimed in claim 32, wherein at the paste step, the projection image is pasted to the second two-dimensional image in accordance with the matte.

34. The medium as claimed in claim 32, wherein the computer program further comprises:
a color distribution detection step of detecting color distribution in the object area represented by the matte; and
a color distribution conversion step of converting the color distribution.

35. The medium as claimed in claim 34, wherein the computer program further comprises a maximum chroma detection step of detecting a maximum chroma pixel, which is a pixel having the maximum chroma, in the color distribution, and
wherein at the color distribution conversion step, the color distribution is linearly converted so that the color of the maximum chroma pixel becomes a predetermined color.

36. The medium as claimed in claim 34, wherein at the color distribution conversion step, the color distribution is nonlinearly converted.

37. The medium as claimed in claim 34, wherein at the color distribution conversion step, the color distribution is divided into a diffused reflection component due to diffused reflection of a light from a light source in the object and a specular reflection component due to specular reflection, and the diffused reflection component and the specular reflection component are converted, respectively.

38. The medium as claimed in claim 29, wherein the first two-dimensional image and the second two-dimensional image are the same two-dimensional image.

39. The medium as claimed in claim 29, wherein at the first calculation step, an inverse function of a function $M\psi$ is calculated as the first conversion formula, where $\psi$ represents a function for mapping the spread image to the side constituting the first three-dimensional object in the three-dimensional space and M represents a function for projecting the first three-dimensional object onto a screen to form the first two-dimensional image.

40. The medium as claimed in claim 29, wherein at the second calculation step, an inverse function of a function $M\psi$ is calculated as the second conversion formula, where $\psi$ represents a function for mapping the image stored in the storage means to the side constituting the second three-dimensional object in the three-dimensional space and M represents a function for projecting the second three-dimensional object onto a screen to form the two-dimensional image.

41. The medium as claimed in claim 29, wherein at the first and second calculation steps, the first and second conversion formulas are calculated, respectively, by using a locally defined two-dimensional coordinate system as the two-dimensional coordinate system of the image stored in the storage means.

42. The medium as claimed in claim 29, wherein the computer program further comprises a correction step of correcting the first and second characteristic points designated by operating the first and second operation means, respectively.

43. An image processing device for generating a spread image, which is an image obtained spreading a side constituting a three-dimensional object displayed in a two-dimensional image onto a two-dimensional plane from the two-dimensional image, the device comprising:
operation means for being operated when designating shape information concerning the shape of the side constituting a three-dimensional object and a characteristic point, which is a point on the two-dimensional image constituting the side;
calculation means for calculating a conversion formula for converting the side constituting the three-dimensional object in the two-dimensional image to a spread image on the basis of the shape information and the characteristic point; and
conversion means for converting the side constituting the three-dimensional object in the two-dimensional image to the spread image on the basis of the conversion formula, wherein the three-dimensional object is a column.

44. The image processing device as claimed in claim 43, wherein when the lateral side of the column is designated as the shape information, two end points of a cross line between the lateral side of the column displayed in the two-dimensional image and the base of the column, or points displayed on the two-dimensional image equivalent to points bisecting a portion equivalent to the cross line in the column along the circumference of the base of the column, are designated as the characteristic points.

45. An image processing device for generating a spread image, which is an image obtained spreading a side constituting a three-dimensional object displayed in a two-dimensional image onto a two-dimensional plane from the two-dimensional image, the device comprising:
operation means for being operated when designating shape information concerning the shape of the side constituting a three-dimensional object and a characteristic point, which is a point on the two-dimensional image constituting the side;

calculation means for calculating a conversion formula for converting the side constituting the three-dimensional object in the two-dimensional image to a spread image on the basis of the shape information and the characteristic point; and conversion means for converting the side constituting the three-dimensional object in the two-dimensional image to the spread image on the basis of the conversion formula, wherein the three-dimensional object is a sphere.

46. The image processing device as claimed in claim 45, wherein when the sphere is designated as the shape information, where three-dimensional coordinate with respect to the sphere having center thereof as the origin and including an x-axis, a y-axis and a z-axis orthogonal to one another is considered, the center of the sphere displayed in the two-dimensional image, a point displayed in the two-dimensional image equivalent to a pole, which is a point of intersection between the sphere and the y-axis, in the three-dimensional coordinate, two end points of a portion displayed in the two-dimensional image equivalent to a part of an equator, which is a cross line between the sphere and an xz-plane, in the three-dimensional coordinate, a point displayed in the two-dimensional image equivalent to a point bisecting a portion between two points on the equator equivalent to the two end points along the equator, or two end points of a portion displayed in the two-dimensional image equivalent to a part of a cross line between the sphere and a yz-plane in the three-dimensional coordinate, are designated as the characteristic points.

47. An image processing device for generating a spread image, which is an image obtained spreading a side constituting a three-dimensional object displayed in a two-dimensional image onto a two-dimensional plane from the two-dimensional image, the device comprising:

operation means for being operated when designating shape information concerning the shape of the side constituting a three-dimensional object and a characteristic point, which is a point on the two-dimensional image constituting the side;

calculation means for calculating a conversion formula for converting the side constituting the three-dimensional object in the two-dimensional image to a spread image on the basis of the shape information and the characteristic point; and conversion means for converting the side constituting the three-dimensional object in the two-dimensional image to the spread image on the basis of the conversion formula, wherein the three-dimensional object is a cone.

48. The image processing device as claimed in claim 47, wherein when the lateral side of the cone is designated as the shape information, two end points of a cross line between the lateral side of the cone displayed in the two-dimensional image and the base of the cone, a point displayed in the two-dimensional image equivalent to a point bisecting a portion equivalent to the cross line in the cone along the circumference of the base of the cone, a point displayed in the two-dimensional image equivalent the center of a fan-shape obtained by spreading the lateral side of the cone, or a point displayed in the two-dimensional image equivalent to the center of the base of the cone, is designated as the characteristic point.

49. An image processing device for generating a spread image, which is an image obtained spreading a side constituting a three-dimensional object displayed in a two-dimensional image onto a two-dimensional plane from the two-dimensional image, the device comprising:

operation means for being operated when designating shape information concerning the shape of the side constituting a three-dimensional object and a characteristic point, which is a point on the two-dimensional image constituting the side;

calculation means for calculating a conversion formula for converting the side constituting the three-dimensional object in the two-dimensional image to a spread image on the basis of the shape information and the characteristic point;

conversion means for converting the side constituting the three-dimensional object in the two-dimensional image to the spread image on the basis of the conversion formula; and correction means for correcting the characteristic points designed by operating the operation means.

50. The image processing device as claimed in claim 49, wherein when the contour of the three-dimensional object displayed in the two-dimensional image is defined by an equation f=0 by a function "f" expressed by using one or more parameters, the correction means finds the parameter maximizing a normal direction component, which is a component in the direction of a normal vector at a pixel, of a differential value of the pixel value of the pixel constituting a line expressed by the equation f=0, and corrects the characteristic points so as to be located on the line expressed by the equation f=0 by the function "f" expressed by using that parameter.

51. The image processing device as claimed in claim 50, wherein the parameter maximizing the normal direction component is found by finding the normal direction component while changing the parameter.

52. The image processing device as claimed in claim 50, wherein the equation f=0 by the function "f" represents a straight line and the parameter is the coordinate at two points on the straight line.

53. An image processing method for generating a spread image, which is an image obtained spreading a side constituting a three-dimensional object displayed in a two-dimensional image onto a two-dimensional plane from the two-dimensional image, the method comprising:

when shape information and a characteristic points are designated by operation means operated for designating shape the information concerning the shape of the side constituting the three-dimensional object and the characteristic point, which is a point on the two-dimensional image constituting the side, a calculation step of calculating the side constituting the three-dimensional object in the two-dimensional image to a spread image on the basis of the shape information and the characteristic point; and a conversion step of converting the side constituting the three-dimensional object in the two-dimensional image to the spread image on the basis of the conversion formula, wherein the three-dimensional object is a column.

54. The image processing method as claimed in claim 53, wherein when the lateral side of the column is designated as the shape information, two end points of a cross line between the lateral side of the column displayed in the two-dimensional image and the base of the column, or points displayed on the two-dimensional image equivalent to points bisecting a portion equivalent to the cross line in the column along the circumference of the base of the column, are designated as the characteristic points.

55. An image processing method for generating a spread image, which is an image obtained spreading a side constituting a three-dimensional object displayed in a two-dimensional image onto a two-dimensional plane from the two-dimensional image, the method comprising:

when shape information and a characteristic points are designated by operation means operated for designating shape the information concerning the shape of the side constituting the three-dimensional object and the characteristic point, which is a point on the two-dimensional image constituting the side, a calculation step of calculating the side constituting the three-dimensional object in the two-dimensional image to a spread image on the basis of the shape information and the characteristic point; and a conversion step of converting the side constituting the three-dimension object in the two-dimensional image to the spread image on the basis of the conversion formula, wherein the three-dimensional object is a sphere.

56. The image processing method as claimed in claim 55, wherein when the sphere is designated as the shape information, where three-dimensional coordinate with respect to the sphere having center thereof as the origin and including an x-axis, a y-axis and a z-axis orthogonal to one another is considered, the center of the sphere displayed in the two-dimensional image, a point displayed in the two-dimensional image equivalent to a pole, which is a point of intersection between the sphere and the y-axis, in the three-dimensional coordinate, two end points of a portion displayed in the two-dimensional image equivalent to a part of an equator, which is a cross line between the sphere and an xz-plane, in the three-dimensional coordinate, a point displayed in the two-dimensional image equivalent to a point bisecting a portion between two points on the equator equivalent to the two end points along the equator, or two end points of a portion displayed in the two-dimensional image equivalent to a part of a cross line between the sphere and a yz-plane in the three-dimensional coordinate, are designated as the characteristic points.

57. An image processing method for generating a spread image, which is an image obtained spreading a side constituting a three-dimensional object displayed in a two-dimensional image onto a two-dimensional plane from the two-dimensional image, the method comprising:

when shape information and a characteristic points are designated by operation means operated for designating shape the information concerning the shape of the side constituting the three-dimensional object and the characteristic point, which is a point on the two-dimensional image constituting the side, a calculation step of calculating the side constituting the three-dimensional object in the two-dimensional image to a spread image on the basis of the shape information and the characteristic point; and a conversion step of converting the side constituting the three-dimensional object in the two-dimensional image to the spread image on the basis of the conversion formula, wherein the three-dimensional object is a cone.

58. The image processing method as claimed in claim 57, wherein when the lateral side of the cone is designated as the shape information, two end points of a cross line between the lateral side of the cone displayed in the two-dimensional image and the base of the cone, a point displayed in the two-dimensional image equivalent to a point bisecting a portion equivalent to the cross line in the cone along the circumference of the base of the cone, a point displayed in the two-dimensional image equivalent the center of a fan-shape obtained by spreading the lateral side of the cone, or a point displayed in the two-dimensional image equivalent to the center of the base of the cone, is designated as the characteristic point.

59. An image processing method for generating a spread image, which is an image obtained spreading a side constituting a three-dimensional object displayed in a two-dimensional image onto a two-dimensional plane from the two-dimensional image, the method comprising:

when shape information and a characteristic points are designated by operation means operated for designating shape the information concerning the shape of the side constituting the three-dimensional object and the characteristic point, which is a point on the two-dimensional image constituting the side, a calculation step of calculating the side constituting the three-dimensional object in the two-dimensional image to a spread image on the basis of the shape information and the characteristic point, a conversion step of converting the side constituting the three-dimensional object in the two-dimensional image to the spread image on the basis of the conversion formula; and a correction step for correcting the characteristic points designed by operating the operation means.

60. The image processing method as claimed in claim 59, wherein when the contour of the three-dimensional object displayed in the two-dimensional image is defined by an equation f=0 by a function "f" expressed by using one or more parameters, at the correction step, the parameter maximizing a normal direction component is found, which is a component in the direction of a normal vector at a pixel, of a differential value of the pixel value of the pixel constituting a line expressed by the equation f=0, and the characteristic points are corrected so as to be located on the line expressed by the equation f=0 by the function "f" expressed by using that parameter.

61. The image processing method as claimed in claim 60, wherein the parameter maximizing the normal direction component is found by finding the normal direction component while changing the parameter.

62. The image processing method as claimed in claim 60, wherein the equation f=0 by the function "f" represents a straight line and the parameter is the coordinate at two points on the straight line.

63. A medium for causing a computer to execute a computer program for carrying out image processing to generate a spread image, which is an image obtained by spreading a side constituting a three-dimensional object displayed in a two-dimensional image, onto a two-dimensional plane from the two-dimensional image, the computer program comprising:

when shape information and a characteristic points are designated by operation means operated for designating shape the information concerning the shape of the side constituting the three-dimensional object and the characteristic point, which is a point on the two-dimensional image constituting the side, a calculation step of calculating the side constituting the three-dimensional object in the two-dimensional image to a spread image on the basis of the shape information and the characteristic point; and a conversion step of converting the side constituting the three-dimensional object in the two-dimensional image to the spread image on the basis of the conversion formula, wherein the three-dimensional object is a column.

64. The medium as claimed in claim 63, wherein when the lateral side of the column is designated as the shape information, two end points of a cross line between the lateral side of the column displayed in the two-dimensional image and the base of the column, or points displayed on the two-dimensional image equivalent to points bisecting a portion equivalent to the cross line in the column along the circumference of the base of the column, are designated as the characteristic points.

65. A medium for causing a computer to execute a computer program for carrying out image processing to generate a spread image, which is an image obtained by spreading a side constituting a three-dimensional object displayed in a two-dimensional image, onto a two-dimensional plane from the two-dimensional image, the computer program comprising:

when shape information and a characteristic points are designated by operation means operated for designating shape the information concerning the shape of the side constituting the three-dimensional object and the characteristic point, which is a point on the two-dimensional image constituting the side, a calculation step of calculating the side constituting the three-dimensional object in the two-dimensional image to a spread image on the basis of the shape information and the characteristic point; and a conversion step of converting the side constituting the three-dimensional object in the two-dimensional image to the spread image on the basis of the conversion formula, wherein the three-dimensional object is a sphere.

66. The medium as claimed in claim 65, wherein when the sphere is designated as the shape information, where three-dimensional coordinate with respect to the sphere having center thereof as the origin and including an x-axis, a y-axis and a z-axis orthogonal to one another is considered, the center of the sphere displayed in the two-dimensional image, a point displayed in the two-dimensional image equivalent to a pole, which is a point of intersection between the sphere and the y-axis, in the three-dimensional coordinate, two end points of a portion displayed in the two-dimensional image equivalent to a part of an equator, which is a cross line between the sphere and an xz-plane, in the three-dimensional coordinate, a point displayed in the two-dimensional image equivalent to a point bisecting a portion between two points on the equator equivalent to the two end points along the equator, or two end points of a portion displayed in the two-dimensional image equivalent to a part of a cross line between the sphere and a yz-plane in the three-dimensional coordinate, are designated as the characteristic points.

67. A medium for causing a computer to execute a computer program for carrying out image processing to generate a spread image, which is an image obtained by spreading a side constituting a three-dimensional object displayed in a two-dimensional image, onto a two-dimensional plane from the two-dimensional image, the computer program comprising:

when shape information and a characteristic points are designated by operation means operated for designating shape the information concerning the shape of the side constituting the three-dimensional object and the characteristic point, which is a point on the two-dimensional image constituting the side, a calculation step of calculating the side constituting the three-dimensional object in the two-dimensional image to a spread image on the basis of the shape information and the characteristic point; and a conversion step of converting the side constituting the three-dimensional object in the two-dimensional image, to the spread image on the basis of the conversion formula, wherein the three-dimensional object is a cone.

68. The medium as claimed in claim 67, wherein when the lateral side of the cone is designated as the shape information, two end points of a cross line between the lateral side of the cone displayed in the two-dimensional image and the base of the cone, a point displayed in the two-dimensional image equivalent to a point bisecting a portion equivalent to the cross line in the cone along the circumference of the base of the cone, a point displayed in the two-dimensional image equivalent the center of a fan-shape obtained by spreading the lateral side of the cone, or a point displayed in the two-dimensional image equivalent to the center of the base of the cone, is designated as the characteristic point.

69. A medium for causing a computer to execute a computer program for carrying out image processing to generate a spread image, which is an image obtained by spreading a side constituting a three-dimensional object displayed in a two-dimensional image, onto a two-dimensional plane from the two-dimensional image, the computer program comprising:

when shape information and a characteristic points are designated by operation means operated for designating shape the information concerning the shape of the side constituting the three-dimensional object and the characteristic point, which is a point on the two-dimensional image constituting the side, a calculation step of calculating the side constituting the three-dimensional object in the two-dimensional image to a spread image on the basis of the shape information and the characteristic point;

a conversion step of converting the side constituting the three-dimensional object in the two-dimensional image to the spread image on the basis of the conversion formula; and a correction step of correcting the characteristic points designed by operating the operation means.

70. The medium as claimed in claim 69, wherein when the contour of the three-dimensional object displayed in the two-dimensional image is defined by an equation f=0 by a function "f" expressed by using one or more parameters, at the correction step, the parameter maximizing a normal direction component is found, which is a component in the direction of a normal vector at a pixel, of a differential value of the pixel value of the pixel constituting a line expressed by the equation f=0, and the characteristic points are corrected so as to be located on the line expressed by the equation f=0 by the function "f" expressed by using that parameter.

71. The medium as claimed in claim 70, wherein the parameter maximizing the normal direction component is found by finding the normal direction component while changing the parameter.

72. The median as claimed in claim 70, wherein the equation f=0 by the function "f" represents a straight line and the parameter is the coordinate at two points on the straight line.

73. An image processing device for pasting a projection image to a two-dimensional image, the projection image being obtained by projecting a side constituting a three-dimensional object, the device comprising:

operation means for being operated when designating shape information concerning the shape of the side constituting the three-dimensional object and a characteristic point, which is a point on the two-dimensional image constituting the side;

calculation means for calculating a conversion formula for converting a predetermined image on a two-dimensional plane to a projection image on the basis of the shape information and the characteristic point;

conversion means for converting the predetermined image to the projection image on the basis of the conversion formula; and paste means for pasting the projection image obtained from the predetermined image to a portion specified by the characteristic point in the two-dimensional image, wherein the three-dimensional object is a column and wherein the three-dimensional object is displayed in the two-dimensional image.

74. The image processing device as claimed in claim 73, wherein when the lateral side of the column is designated as the shape information, two end points of a cross line between the lateral side of the column displayed in the two-dimensional image and the base of the column, or points displayed on the two-dimensional image equivalent to points bisecting a portion equivalent to the cross line in the column along the circumference of the base of the column, are designated as the characteristic points.

75. An image processing device for pasting a projection image to a two-dimensional image, the projection image being obtained by projecting a side constituting a three-dimensional object, the device comprising:

operation means for being operated when designating shape information concerning the shape of the side constituting the three-dimensional object and a characteristic point, which is a point on the two-dimensional image constituting the side;

calculation means for calculating a conversion formula for converting a predetermined image on a two-dimensional plane to a projection image on the basis of the shape information and the characteristic point;

conversion means for converting the predetermined image to the projection image on the basis of the conversion formula; and paste means for pasting the projection image obtained from the predetermined image to a portion specified by the characteristic point in the two-dimensional image, wherein the three-dimensional object is a sphere and wherein the three-dimensional object is displayed in the two-dimensional image.

76. The image processing device as claimed in claim 75, wherein when the sphere is designated as the shape information, where three-dimensional coordinate with respect to the sphere having center thereof as the origin and including an x-axis, a y-axis and a z-axis orthogonal to one another is considered, the center of the sphere displayed in the two-dimensional image, a point displayed in the two-dimensional image equivalent to a pole, which is a point of intersection between the sphere and the y-axis, in the three-dimensional coordinate, two end points of a portion displayed in the two-dimensional image equivalent to a part of an equator, which is a cross line between the sphere and an xz-plane, in the three-dimensional coordinate, a point displayed in the two-dimensional image equivalent to a point bisecting a portion between two points on the equator equivalent to the two end points along the equator, or two end points of a portion displayed in the two-dimensional image equivalent to a part of a cross line between the sphere and a yz-plane in the three-dimensional coordinate, are designated as the characteristic points.

77. An image processing device for pasting a projection image to a two-dimensional image, the projection image being obtained by projecting a side constituting a three-dimensional object, the device comprising:

operation means for being operated when designating shape information concerning the shape of the side constituting the three-dimensional object and a characteristic point, which is a point on the two-dimensional image constituting the side;

calculation means for calculating a conversion formula for converting a predetermined image on a two-dimensional plane to a projection image on the basis of the shape information and the characteristic point;

conversion means for converting the predetermined image to the projection image on the basis of the conversion formula; and paste means for pasting the projection image obtained from the predetermined image to a portion specified by the characteristic point in the two-dimensional image, wherein the three-dimensional object is a cone and wherein the three-dimensional object is displayed in the two-dimensional image.

78. The image processing device as claimed in claim 77, wherein when the lateral side of the cone is designated as the shape information, two end points of a cross line between the lateral side of the cone displayed in the two-dimensional image and the base of the cone, a point displayed in the two-dimensional image equivalent to a point bisecting a portion equivalent to the cross line in the cone along the circumference of the base of the cone, a point displayed in the two-dimensional image equivalent the center of a fan-shape obtained by spreading the lateral side of the cone, or a point displayed in the two-dimensional image equivalent to the center of the base of the cone, is designated as the characteristic point.

79. An image processing device for pasting a projection image to a two-dimensional image, the projection image being obtained by projecting a side constituting a three-dimensional object, the device comprising:

operation means for being operated when designating shape information-concerning the shape of the side constituting the three-dimensional object and a characteristic point, which is a point on the two-dimensional image constituting the side;

calculation means for calculating a conversion formula for converting a predetermined image on a two-dimensional plane to a projection image on the basis of the shape information and the characteristic point;

conversion means for converting the predetermined image to the projection image on the basis of the conversion formula;

paste means for pasting the projection image obtained from the predetermined image to a portion specified by the characteristic point in the two-dimensional image; and correction means for correcting the characteristic points designed by operating the operation means, wherein the three-dimensional object is displayed in the two-dimensional image.

80. The image processing device as claimed in claim 79, wherein when the contour of the three-dimensional object displayed in the two-dimensional image is defined by an equation f=0 by a function "f" expressed by using one or more parameters, the correction means finds the parameter maximizing a normal direction component, which is a component in the direction of a normal vector at a pixel, of a differential value of the pixel value of the pixel constituting a line expressed by the equation f=0, and corrects the characteristic points so as to be located on the line expressed by the equation f=0 by the function "f" expressed by using that parameter.

81. The image processing device as claimed in claim 80, wherein the parameter maximizing the normal direction component is found by finding the normal direction component while changing the parameter.

82. The image processing device as claimed in claim 80, wherein the equation f=0 by the function "f" represents a straight line and the parameter is the coordinate at two points on the straight line.

83. An image processing method for pasting a projection image to a two-dimensional image, the projection-image being obtained by projecting a side constituting a three-dimensional object, the method comprising:

when the shape information and a characteristic point are designated by operation means operated for designating the shape information concerning the shape of the side constituting the three-dimensional object and the characteristic point, which is a point on the two-dimensional image constituting the side, a calculation step of calculating a conversion formula for converting a predetermined image on a two-dimensional plane to a projection image on the basis of the shape information and the characteristic point;

a conversion step of converting the predetermined image to the projection image on the basis of the conversion formula; and a paste step of pasting the projection image obtained from the predetermined image to a portion specified by the characteristic point in a two-dimensional image, wherein the three-dimensional object is a column and wherein the three-dimensional object is displayed in the two-dimensional image.

84. The image processing method as claimed in claim 83, wherein when the lateral side of the column is designated as the shape information, two end points of a cross line between the lateral side of the column displayed in the two-dimensional image and the base of the column, or points displayed on the two-dimensional image equivalent to points bisecting a portion equivalent to the cross line in the column along the circumference of the base of the column, are designated as the characteristic points.

85. An image processing method for pasting a projection image to a two-dimensional image, the projection image being obtained by projecting a side constituting a three-dimensional object, the method comprising:

when the shape information and a characteristic point are designated by operation means operated for designating the shape information concerning the shape of the side constituting the three-dimensional object and the characteristic point, which is a point on the two-dimensional image constituting the side, a calculation step of calculating a conversion formula for converting a predetermined image on a two-dimensional plane to a projection image on the basis of the shape information and the characteristic point;

a conversion step of converting the predetermined image to the projection image on the basis of the conversion formula; and a paste step of pasting the projection image obtained from the predetermined image to a portion specified by the characteristic point in a two-dimensional image, wherein the three-dimensional object is a sphere and wherein the three-dimensional object is displayed in the two-dimensional image.

86. The image processing method as claimed in claim 85, wherein when the sphere is designated as the shape information, where three-dimensional coordinate with respect to the sphere having center thereof as the origin and including an x-axis, a y-axis and a z-axis orthogonal to one another is considered, the center of the sphere displayed in the two-dimensional image, a point displayed in the two-dimensional image equivalent to a pole, which is a point of intersection between the sphere and the y-axis, in the three-dimensional coordinate, two end points of a portion displayed in the two-dimensional image equivalent to a part of an equator, which is a cross line between the sphere and an xz-plane, in the three-dimensional coordinate, a point displayed in the two-dimensional image equivalent to a point bisecting a portion between two points on the equator equivalent to the two end points along the equator, or two end points of a portion displayed in the two-dimensional image equivalent to a part of a cross line between the sphere and a yz-plane in the three-dimensional coordinate, are designated as the characteristic points.

87. An image processing method for pasting a projection image to a two-dimensional image, the projection image being obtained by projecting a side constituting a three-dimensional object, the method comprising:

when the shape information and a characteristic point are designated by operation means operated for designating the shape information concerning the shape of the side constituting the three-dimensional object and the characteristic point, which is a point on the two-dimensional image constituting the side, a calculation step of calculating a conversion formula for converting a predetermined image on a two-dimensional plane to a projection image on the basis of the shape information and the characteristic point;

a conversion step of converting the predetermined image to the projection image on the basis of the conversion formula; and a paste step of pasting the projection image obtained from the predetermined image to a portion specified by the characteristic point in a two-dimensional image, wherein the three-dimensional object is a cone and wherein the three-dimensional object is displayed in the two-dimensional image.

88. The image processing method as claimed in claim 87, wherein when the lateral side of the cone is designated as the shape information, two end points of a cross line between the lateral side of the cone displayed in the two-dimensional image and the base of the cone, a point displayed in the two-dimensional image equivalent to a point bisecting a portion equivalent to the cross line in the cone along the circumference of the base of the cone, a point displayed in the two-dimensional image equivalent the center of a fan-shape obtained by spreading the lateral side of the cone, or a point displayed in the two-dimensional image equivalent to the center of the base of the cone, is designated as the characteristic point.

89. An image processing method for pasting a projection image to a two-dimensional image, the projection image being obtained by projecting a side constituting a three-dimensional object, the method comprising:

when the shape information and a characteristic point are designated by operation means operated for designating the shape information concerning the shape of the side constituting the three-dimensional object and the characteristic point, which is a point on the two-dimensional image constituting the side, a calculation step of calculating a conversion formula for converting a predetermined image on a two-dimensional plane to a projection image on the bases of the shape information and the characteristic point;

a conversion step of converting the predetermined image to the projection image on the basis of the conversion formula;

a paste step of pasting the projection image obtained from the predetermined image to a portion specified by the characteristic point in a two-dimensional image, and a correction step of correcting the characteristic points designed by operating the operation means, wherein the three-dimensional object is displayed in the two-dimensional image.

90. The image processing method as claimed in claim 89, wherein when the contour of the three-dimensional object displayed in the two-dimensional image is defined by an equation f=0 by a function "f" expressed by using one or more parameters, at the correction step, the parameter maximizing a normal direction component is found, which is a component in the direction of a normal vector at a pixel, of a differential value of the pixel value of the pixel constituting a line expressed by the equation f=0, and the characteristic points are corrected so as to be located on the line expressed by the equation f=0 by the function "f" expressed by using that parameter.

91. The image processing method as claimed in claim 90, wherein the parameter maximizing the normal direction component is found by finding the normal direction component while changing the parameter.

92. The image processing method as claimed in claim 90, wherein the equation f=0 by the function "f" represents a straight line and the parameter is the coordinate at two points on the straight line.

93. A medium for causing a computer to execute a computer program for carrying out image processing to paste a projection image to a two-dimensional image, the projection image being obtained by projecting a side constituting a thee-dimensional object, the computer program comprising:

when the shape information and a characteristic point are designated by operation means operated for designating the shape information concerning the shape of the side constituting the three-dimensional object and the characteristic point, which is a point on the two-dimensional image constituting the side, a calculation step of calculating a conversion formula for converting a predetermined image on a two-dimensional plane to a projection image on the basis of the shape information and the characteristic point;

a conversion step of converting the predetermined image to the projection image on the basis of the conversion formula; and a paste step of pasting the projection image obtained from the predetermined image to a portion specified by the characteristic point in a two-dimensional image, wherein the three-dimensional object is a column and wherein the three-dimensional object is displayed in the two-dimensional image.

94. The medium as claimed in claim 93, wherein when the lateral side of the column is designated as the shape information, two end points of a cross line between the lateral side of the column displayed in the two-dimensional image and the base of the column, or points displayed on the two-dimensional image equivalent to points bisecting a portion equivalent to the cross line in the column along the circumference of the base of the column, are designated as the characteristic points.

95. A medium for causing a computer to execute a computer program for carrying out image processing to paste a projection image to a two-dimensional image, the projection image being obtained by projecting a side constituting a three-dimensional object, the computer program comprising:

when the shape information and a characteristic point are designated by operation means operated for designating the shape information concerning the shape of the side constituting the three-dimensional object and the characteristic point, which is a point on the two-dimensional image constituting the side, a calculation step of calculating a conversion formula for converting a predetermined image on a two-dimensional plane to a projection image on the basis of the shape information and the characteristic point;

a conversion step of converting the predetermined image to the projection image on n basis of the conversion formula; and a paste step of pasting the projection image obtained from the predetermined image to a portion specified by the characteristic point in a two-dimensional image, wherein the three-dimensional object is a sphere and wherein the three-dimensional object is displayed in the two-dimensional image.

96. The medium as claimed in claim 95, wherein when the sphere is designated as the shape information, where three-dimensional coordinate with respect to the sphere having center thereof as the origin and including an x-axis, a y-axis and a z-axis orthogonal to one another is considered, the center of the sphere displayed in the two-dimensional image, a point displayed in the two-dimensional image equivalent to a pole, which is a point of intersection between the sphere and the y-axis, in the three-dimensional coordinate, two end points of a portion displayed in the two-dimensional image equivalent to a part of an equator, which is a cross line between the sphere and an xz-plane, in the three-dimensional coordinate, a point displayed in the two-dimensional image equivalent to a point bisecting a portion between two points on the equator equivalent to the two end points along the equator, or two end points of a portion displayed in the two-dimensional image equivalent to a part of a cross line between the sphere and a yz-plane in the three-dimensional coordinate, are designated as the characteristic points.

97. A medium for causing a computer to execute a computer program for carrying out image processing to paste a projection image to a two-dimensional image, the projection image being obtained by projecting a side constituting a three-dimensional object, the computer program comprising:

when the shape information and a characteristic point are designated by operation means operated for designating the shape information concerning the shape of the side constituting the three-dimensional object and the characteristic point, which is a point on the two-dimensional image constituting the side, a calculation step of calculating a conversion formula for converting a predetermined image on a two-dimensional plane to a projection image on the basis of the shape information and the characteristic point;

a conversion step of converting the predetermined image to the projection image on the basis of the conversion formula; and a paste step of pasting the projection image obtained from the predetermined image to a portion specified by the characteristic point in a two-dimensional image, wherein the three-dimensional object is a cone and wherein the three-dimensional object is displayed in the two-dimensional image.

98. The medium as claimed in claim 97, wherein when the lateral side of the cone is designated as the shape information, two end points of a cross line between the lateral side of the cone displayed in the two-dimensional image and the base of the cone, a point displayed in the two-dimensional image equivalent to a point bisecting a portion equivalent to the cross line in the cone along the circumference of the base of the cone, a point displayed in the two-dimensional image equivalent the center of a fan-shape obtained by spreading the lateral side of the cone, or a point displayed in the two-dimensional image equivalent to the center of the base of the cone, is designated as the characteristic point.

99. A medium for causing a computer to execute a computer program for carrying out image processing to paste a projection image to a two-dimensional image, the projection image being obtained by projecting a side constituting a three-dimensional object, the computer program comprising:

when the shape information and a characteristic point are designated by operation means operated for designating the shape information concerning the shape of the side constituting the three-dimensional object and the characteristic point, which is a point on the two-dimensional image constituting the side, a calculation step of calculating a conversion formula for converting a predetermined image on a two-dimensional plane to a projection image on the basis of the shape information and the characteristic point;

a conversion step of converting the predetermined image to the projection image on the basis of the conversion formula;

a paste step of pasting the projection image obtained from the predetermined image to a portion specified by the characteristic point in a two-dimensional image, and a correction step of correcting the characteristic points designed by operating the operation means, wherein the three-dimensional object is displayed in the two-dimensional image.

100. The medium as claimed in claim 99, wherein when the contour of the three-dimensional object displayed in the two-dimensional image is defined by an equation f=0 by a function "f" expressed by using one or more parameters, at the correction step, the parameter maximizing a normal direction component is found, which is a component in the direction of a normal vector at a pixel, of a differential value of the pixel value of the pixel constituting a line expressed by the equation f=0, and the characteristic points are corrected so as to be located on the line expressed by the equation f=0 by the function "f" expressed by using that parameter.

101. The medium as claimed in claim 100, wherein the parameter maximizing the normal direction component is found by finding the normal direction component while changing the parameter.

102. The medium as claimed in claim 100, wherein the equation f=0 by the function "f" represents a straight line and the parameter is the coordinate at two points on the straight line.

\* \* \* \* \*